United States Patent
Bryer et al.

(10) Patent No.: US 10,445,758 B1
(45) Date of Patent: Oct. 15, 2019

(54) PROVIDING REWARDS BASED ON DRIVING BEHAVIORS DETECTED BY A MOBILE COMPUTING DEVICE

(71) Applicant: Allstate Insurance Company, Northbrook, IL (US)

(72) Inventors: Nathan M. Bryer, Arlington Heights, IL (US); Sarah Inciong, Dundee, IL (US); Daniel Kraft, Libertyville, IL (US); Matthew James Manzella, Glen Ellyn, IL (US); Yuval Saban, Oak Park, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 14/188,046

(22) Filed: Feb. 24, 2014

Related U.S. Application Data

(60) Provisional application No. 61/937,238, filed on Feb. 7, 2014, provisional application No. 61/793,637, filed on Mar. 15, 2013.

(51) Int. Cl.
*G06Q 30/02* (2012.01)
*G06Q 40/08* (2012.01)

(52) U.S. Cl.
CPC ......... *G06Q 30/0207* (2013.01); *G06Q 40/08* (2013.01)

(58) Field of Classification Search
CPC .................................................. G06Q 30/0207
USPC .......................................................... 705/4
See application file for complete search history.

(56) References Cited

U.S. PATENT DOCUMENTS

| | | |
|---|---|---|
| 5,430,432 A | 7/1995 | Camhi et al. |
| 5,546,305 A | 8/1996 | Kondo |
| 5,758,299 A | 5/1998 | Sandborg et al. |
| 6,060,989 A | 5/2000 | Gehlot |
| 6,061,610 A | 5/2000 | Boer |
| 6,098,048 A | 8/2000 | Dashefsky et al. |
| 6,262,657 B1 | 7/2001 | Okuda et al. |
| 6,295,492 B1 | 9/2001 | Lang et al. |

(Continued)

FOREIGN PATENT DOCUMENTS

| | | | |
|---|---|---|---|
| WO | WO 2008110739 A1 * | 9/2008 | ............... G09B 5/06 |
| WO | 2013074867 A2 | 5/2013 | |
| WO | 2013117119 A1 | 8/2013 | |

OTHER PUBLICATIONS

Jul. 16, 2015—U.S. Non-Final Office Action—U.S. Appl. No. 14/211,186.

(Continued)

*Primary Examiner* — Alexander G Kalinowski
*Assistant Examiner* — Paul R Kloberg
(74) *Attorney, Agent, or Firm* — Banner & Witcoff, Ltd.

(57) ABSTRACT

System and methods for encouraging safe driving are provided. A mobile computing device may be configured to include a trip monitoring application. The trip monitoring application may automatically detect when a trip in a vehicle has begun. The trip monitoring application may collect trip information during the trip and derive additional trip information upon termination of the trip. A cash reward amount may be calculated based at least in part on the additional trip information derived from the trip information collected during the trip. The cash reward amount may be provided to an individual associated with the mobile computing device.

20 Claims, 22 Drawing Sheets

(56) References Cited

U.S. PATENT DOCUMENTS

| | | | |
|---|---|---|---|
| 6,330,499 B1 | 12/2001 | Chou et al. | |
| 6,459,896 B1 | 10/2002 | Liebenow | |
| 6,509,868 B2 | 1/2003 | Flick | |
| 6,577,943 B2 | 6/2003 | Nakao et al. | |
| 6,594,579 B1 | 7/2003 | Lowrey et al. | |
| 6,611,740 B2 | 8/2003 | Lowrey et al. | |
| 6,643,578 B2 | 11/2003 | Levine | |
| 6,647,361 B1 | 11/2003 | Laird et al. | |
| 6,681,003 B2 | 1/2004 | Linder et al. | |
| 6,691,015 B1 | 2/2004 | Levine | |
| 6,697,617 B2 | 2/2004 | Liebenow | |
| 6,701,234 B1 | 3/2004 | Vogelsang | |
| 6,721,644 B2 | 4/2004 | Levine | |
| 6,732,031 B1 | 5/2004 | Lightner et al. | |
| 6,765,499 B2 | 7/2004 | Flick | |
| 6,798,356 B2 | 9/2004 | Flick | |
| 6,879,249 B2 | 4/2005 | Takahashi | |
| 6,909,947 B2 * | 6/2005 | Douros | G07C 5/0808 701/34.4 |
| 6,925,425 B2 * | 8/2005 | Remboski | G07C 5/0808 340/540 |
| 6,946,966 B2 | 9/2005 | Koenig | |
| 6,950,789 B2 | 9/2005 | Laird et al. | |
| 6,963,289 B2 | 11/2005 | Aljadeff et al. | |
| 6,988,033 B1 | 1/2006 | Lowrey et al. | |
| 6,993,393 B2 | 1/2006 | Von Arx et al. | |
| 7,027,808 B2 | 4/2006 | Wesby | |
| 7,082,359 B2 | 7/2006 | Breed | |
| 7,092,803 B2 | 8/2006 | Kapolka et al. | |
| 7,113,127 B1 | 9/2006 | Banet et al. | |
| 7,119,669 B2 | 10/2006 | Lundsgaard et al. | |
| 7,155,259 B2 | 12/2006 | Bauchot et al. | |
| 7,155,321 B2 | 12/2006 | Bromley et al. | |
| 7,174,243 B1 | 2/2007 | Lightner et al. | |
| 7,218,213 B2 | 5/2007 | Katagiri et al. | |
| 7,305,293 B2 | 12/2007 | Flick | |
| 7,313,476 B2 * | 12/2007 | Nichols | G01C 21/20 340/989 |
| 7,333,007 B2 | 2/2008 | Lengning et al. | |
| 7,477,968 B1 | 1/2009 | Lowrey et al. | |
| 7,558,564 B2 | 7/2009 | Wesby | |
| 7,565,230 B2 * | 7/2009 | Gardner | G07C 5/0808 180/272 |
| 7,592,920 B2 | 9/2009 | Kopf et al. | |
| 7,671,727 B2 | 3/2010 | Flick | |
| 7,705,738 B2 | 4/2010 | Fukaya et al. | |
| 7,715,843 B2 | 5/2010 | Gao et al. | |
| 7,715,961 B1 | 5/2010 | Kargupta | |
| 7,747,365 B1 | 6/2010 | Lowrey et al. | |
| 7,818,187 B2 | 10/2010 | Wahlbin et al. | |
| 7,839,292 B2 | 11/2010 | Wang et al. | |
| 7,895,063 B2 | 2/2011 | Wahlbin et al. | |
| 7,941,220 B2 | 5/2011 | Tobacman | |
| 7,957,775 B2 | 6/2011 | Allen, Jr. et al. | |
| 8,014,789 B2 | 9/2011 | Breed | |
| 8,090,598 B2 * | 1/2012 | Bauer | G06Q 40/02 705/4 |
| 8,116,760 B2 | 2/2012 | Gu | |
| 8,135,798 B2 | 3/2012 | Welingkar et al. | |
| 8,140,265 B2 | 3/2012 | Grush | |
| 8,140,358 B1 | 3/2012 | Ling et al. | |
| 8,180,655 B1 | 5/2012 | Hopkins, III | |
| 8,214,100 B2 | 7/2012 | Lowrey et al. | |
| 8,260,491 B2 | 9/2012 | Brighenti et al. | |
| 8,269,617 B2 | 9/2012 | Cook et al. | |
| 8,311,858 B2 | 11/2012 | Everett et al. | |
| 8,330,593 B2 | 12/2012 | Golenski | |
| 8,423,239 B2 | 4/2013 | Blumer et al. | |
| 8,442,508 B2 | 5/2013 | Harter et al. | |
| 8,447,459 B2 | 5/2013 | Lowrey et al. | |
| 8,452,486 B2 | 5/2013 | Banet et al. | |
| 8,463,488 B1 | 6/2013 | Hart | |
| 8,466,781 B2 | 6/2013 | Miller et al. | |
| 8,478,514 B2 | 7/2013 | Kargupta | |
| 8,484,113 B2 | 7/2013 | Collopy et al. | |
| 8,510,200 B2 | 8/2013 | Pearlman et al. | |
| 8,527,135 B2 | 9/2013 | Lowrey et al. | |
| 8,577,703 B2 | 11/2013 | McClellan et al. | |
| 8,595,034 B2 | 11/2013 | Bauer et al. | |
| 8,598,977 B2 | 12/2013 | Maalouf et al. | |
| 8,620,692 B2 | 12/2013 | Collopy et al. | |
| 8,630,768 B2 | 1/2014 | McClellan et al. | |
| 8,633,985 B2 | 1/2014 | Haynes et al. | |
| 8,635,091 B2 | 1/2014 | Amigo et al. | |
| 8,731,974 B2 | 5/2014 | Pandhi et al. | |
| 9,296,299 B2 | 3/2016 | Ricci | |
| 9,311,271 B2 | 4/2016 | Wright | |
| 2007/0239322 A1 | 10/2007 | McQuade et al. | |
| 2007/0257781 A1 | 11/2007 | Denson | |
| 2008/0147280 A1 | 6/2008 | Breed | |
| 2009/0024419 A1 | 1/2009 | McClellan et al. | |
| 2009/0254241 A1 | 10/2009 | Basir | |
| 2010/0037088 A1 * | 2/2010 | Krivopaltsev | H04L 41/0681 714/4.1 |
| 2010/0106603 A1 * | 4/2010 | Dey | G01C 21/3484 705/14.63 |
| 2010/0131300 A1 | 5/2010 | Collopy et al. | |
| 2010/0131303 A1 * | 5/2010 | Collopy | G06Q 30/0224 705/4 |
| 2010/0157061 A1 | 6/2010 | Katsman et al. | |
| 2011/0060496 A1 * | 3/2011 | Nielsen | G06Q 10/0631 701/31.4 |
| 2011/0077028 A1 | 3/2011 | Wilkes, III et al. | |
| 2011/0161116 A1 * | 6/2011 | Peak | G06Q 40/08 705/4 |
| 2011/0281564 A1 | 11/2011 | Armitage et al. | |
| 2011/0307188 A1 * | 12/2011 | Peng | G06Q 10/0639 702/33 |
| 2012/0072243 A1 | 3/2012 | Collins et al. | |
| 2012/0109418 A1 | 5/2012 | Lorber | |
| 2012/0109692 A1 * | 5/2012 | Collins | G06Q 40/08 705/4 |
| 2012/0119936 A1 | 5/2012 | Miller et al. | |
| 2012/0123806 A1 | 5/2012 | Schumann, Jr. et al. | |
| 2012/0150412 A1 | 6/2012 | Yoon et al. | |
| 2012/0197486 A1 | 8/2012 | Elliott | |
| 2012/0197669 A1 | 8/2012 | Kote et al. | |
| 2012/0209632 A1 | 8/2012 | Kaminski et al. | |
| 2012/0282908 A1 | 11/2012 | Nicolini | |
| 2012/0283894 A1 | 11/2012 | Naboulsi | |
| 2012/0290150 A1 | 11/2012 | Doughty et al. | |
| 2012/0303392 A1 | 11/2012 | Depura et al. | |
| 2013/0006674 A1 | 1/2013 | Bowne et al. | |
| 2013/0006675 A1 | 1/2013 | Bowne et al. | |
| 2013/0046510 A1 | 2/2013 | Bowne et al. | |
| 2013/0073112 A1 | 3/2013 | Phelan et al. | |
| 2013/0090821 A1 | 4/2013 | Abboud et al. | |
| 2013/0116919 A1 | 5/2013 | Furuhata et al. | |
| 2013/0138267 A1 | 5/2013 | Hignite et al. | |
| 2013/0151288 A1 | 6/2013 | Bowne et al. | |
| 2013/0166098 A1 | 6/2013 | Lavie et al. | |
| 2013/0166326 A1 | 6/2013 | Lavie et al. | |
| 2013/0179027 A1 | 7/2013 | Mitchell | |
| 2013/0179198 A1 | 7/2013 | Bowne et al. | |
| 2013/0190967 A1 | 7/2013 | Hassib et al. | |
| 2013/0204645 A1 | 8/2013 | Lehman et al. | |
| 2013/0211660 A1 | 8/2013 | Mitchell | |
| 2013/0226397 A1 | 8/2013 | Kuphal et al. | |
| 2013/0289819 A1 | 10/2013 | Hassib et al. | |
| 2013/0297418 A1 | 11/2013 | Collopy et al. | |
| 2013/0311209 A1 | 11/2013 | Kaminski et al. | |
| 2013/0316310 A1 | 11/2013 | Musicant et al. | |
| 2013/0332004 A1 | 12/2013 | Gompert et al. | |
| 2014/0226010 A1 | 8/2014 | Molin et al. | |
| 2014/0358430 A1 | 12/2014 | Xu et al. | |
| 2017/0148350 A1 | 5/2017 | Stankoulov | |

OTHER PUBLICATIONS

Jan. 4, 2016—U.S. Final Office Action—U.S. Appl. No. 14/211,186.
Apr. 8, 2016—U.S. Non-Final Office Action—U.S. Appl. No. 14/211,186.

(56) References Cited

OTHER PUBLICATIONS

"Allstate DriveWise Review After 30 Days," by Allstate, Saving Money by Dunrite675; Dec. 24, 2012; 4 pages.
"Mamabear Parental Monitoring App Review," by Yoursphere; Oct. 2, 2012; 6 pages.
Sep. 9, 2016—U.S. Final Office Action—U.S. Appl. No. 14/211,186.
Feb. 24, 2017—U.S. Non-Final Office Action—U.S. Appl. No. 14/211,186.
Jul. 24, 2017—U.S. Final Office Action—U.S. Appl. No. 14/211,186.
Feb. 15, 2018—U.S. Notice of Allowance—U.S. Appl. No. 14/211,186.
"What Is Telematics", FleetMatics, Oct. 16, 2011, 2 pages (Year: 2011).
May 31, 2018—U.S. Non-Final Office Action—U.S. Appl. No. 14/211,186.
Safe Turns; North American; May 2008; 15 pgs (Year: 2008).
Dustin's Software Development Cogitations and Speculations; Marx Dustin; Apr. 2010; 9 pgs. (Year: 2010).
Beat Your Ticket; Improper Turning; Oct. 13, 2011; 5 pgs. (Year: 2011).
Beat Your Ticket; Michael Pines; May 30, 2009; 2 pgs. (Year: 2009).
Oct. 29, 2018—U.S. Final Office Action—U.S. Appl. No. 14/211,186.

\* cited by examiner

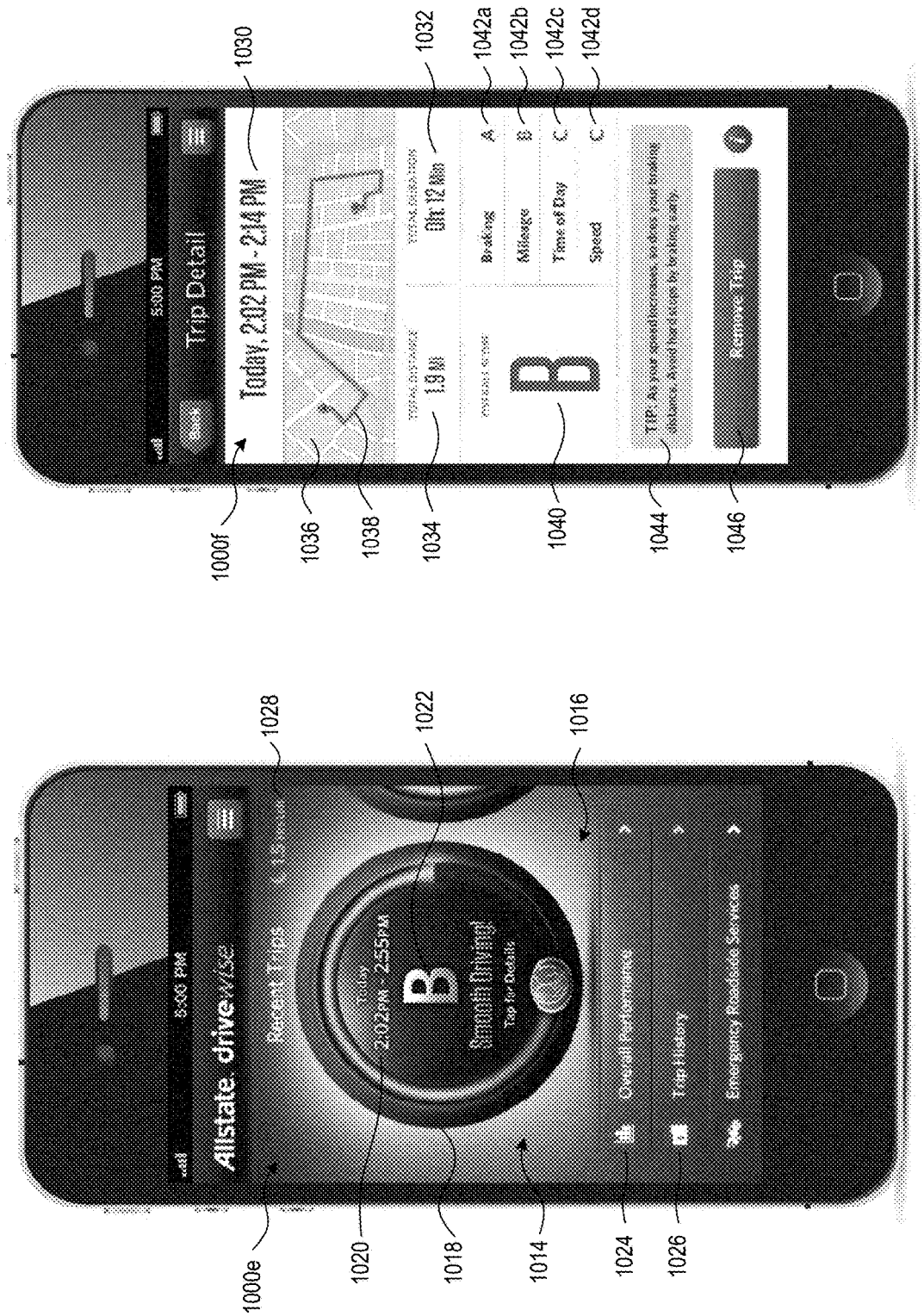

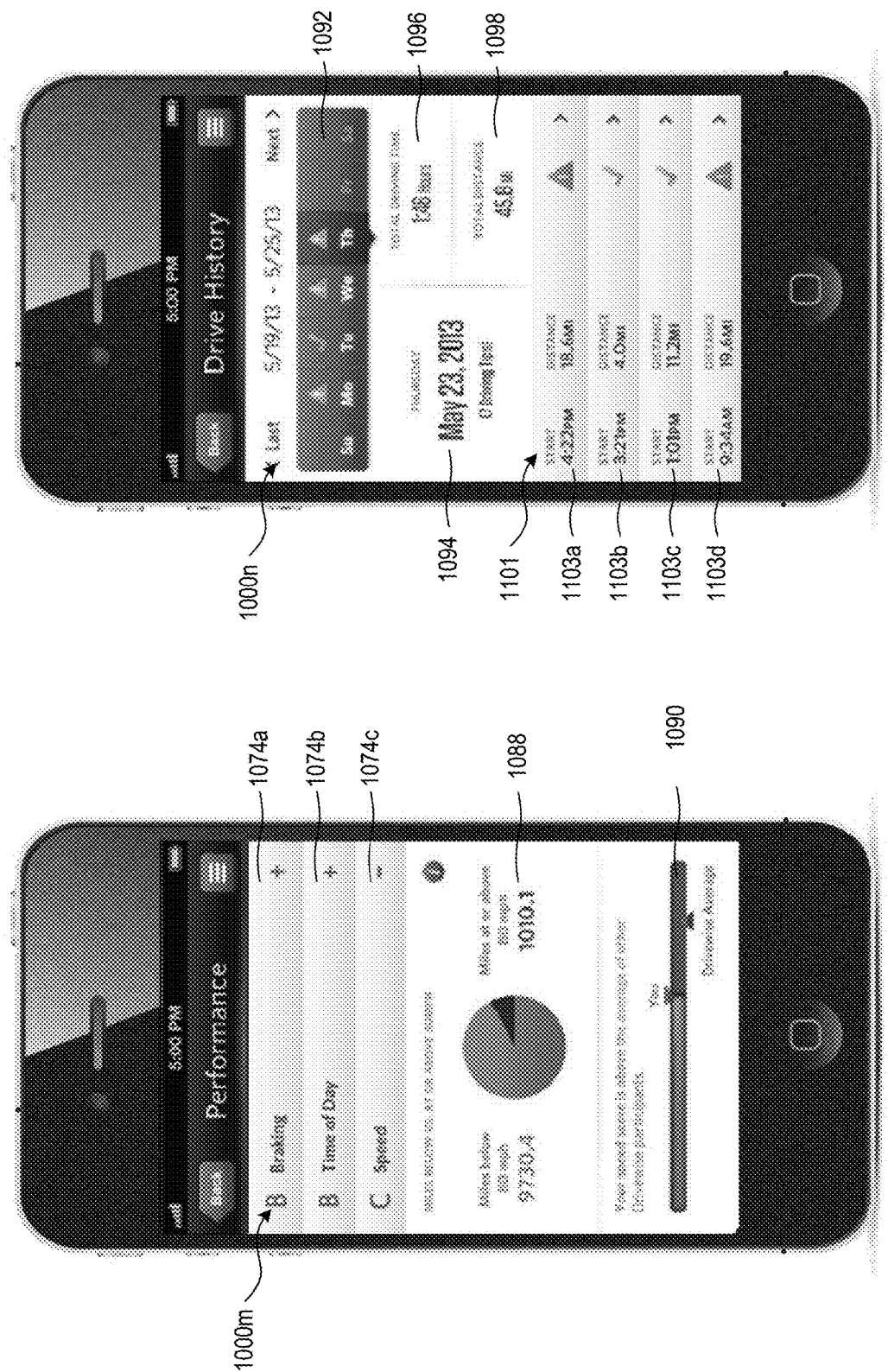

PROVIDING REWARDS BASED ON DRIVING BEHAVIORS DETECTED BY A MOBILE COMPUTING DEVICE

CROSS-REFERENCE TO RELATED APPLICATION

This application is related to U.S. Provisional Patent Application No. 61/793,637 entitled "Encouraging Safe Driving by Providing Cash Rewards" and filed on Mar. 15, 2013 and U.S. Provisional Patent Application No. 61/937,238 entitled "Providing Rewards Based on Driving Behaviors Detected by a Mobile Computing Device" and filed on Feb. 7, 2014, each of which are incorporated by reference herein in its entirety.

BACKGROUND

Telematics includes the use of technology to communicate information from one location to another. Telematics has been used for various applications, including for the exchange of information with electronic sensors. As telematics technology has progressed, various communication methodologies have been incorporated into automobiles and other types of vehicles.

Telematics systems such as on-board diagnostics (OBD) systems may be used in automobiles and other vehicles. OBD systems may provide information from the vehicle's on-board computers and sensors, allowing users to monitor a wide variety of information relating to the vehicle systems, such as engine RPM, emissions control, coolant temperature, vehicle speed, timing advance, throttle position, and oxygen sensing, and many other types of data. Telematics devices installed within vehicles may be configured to access the vehicle computers and sensor data, and transmit the data to a display within the vehicle, a personal computer or mobile device, or to a centralized data processing system. Data obtained from OBD systems has been used for a variety of purposes, including maintenance, diagnosis, and analysis.

Insurance companies have recently shown interest in using telematics system to monitor and analyze driving performance of individuals insured by the insurance companies. In this way, insurance companies may provide benefits to drivers that engage in safe (i.e., positive) driving habits. In some conventional approaches, insurance companies may provide benefits based on mileage. The theory behind this approach assumes that when a driver drives less, the driver is less likely to be involved in an accident and thus represent a lower risk. Accordingly, insurance companies may seek to encourage drivers not to drive in conventional practice. As an example, insurance companies may provide benefits based on mileage awarding the most benefits to drivers that drive least.

BRIEF SUMMARY

The following presents a simplified summary in order to provide a basic understanding of some aspects of the disclosure. The summary is not an extensive overview of the disclosure and is not intended to identify key or critical elements or to delineate the scope of protection sought. The following summary merely presents some concepts of the disclosure in a simplified form as an introduction to the more detailed description provided below.

A first aspect described herein provides a method of encouraging safe driving behaviors. A mobile computing device may be configured to include a trip monitoring application. The trip monitoring application may automatically detect when a trip in a vehicle has begun. The trip monitoring application may collect trip information during the trip and derive additional trip information upon termination of the trip. A cash reward amount may be calculated based at least in part on the additional trip information derived from the trip information collected during the trip. The cash reward amount may be provided to an individual associated with the mobile computing device.

A second aspect described herein provides a system for encouraging safe driving behaviors. A trip monitoring application may be configured to be installed at a mobile computing device. The trip monitoring application may be configured to, in operation, automatically detect when a trip in a vehicle has begun, collect trip information during the trip, and derive additional trip information based on the trip information collected upon termination of the trip. A performance scoring module may be configured to, in operation, determine a performance score based, at least in part, on the additional information derived from the trip information collected during the trip. A reward calculation module may be configured to, in operation, calculate a cash reward amount based, at least in part, on the performance score.

A third aspect described herein provides another system for encouraging safe driving behaviors. The system may include a trip monitoring application a computing apparatus located remotely relative to the trip monitoring application and in signal communication with the trip monitoring application. The trip monitoring application may be configured to, in operation, a) automatically detect when a trip in a vehicle has begun; b) collect trip information during the trip wherein the trip information includes acceleration information from an accelerometer of the mobile computing device and location information from a GPS module of the mobile computing device; c) derive additional trip information based on the trip information collected wherein the additional trip information includes i) a total number of miles traveled during the trip in at least one predetermined time-of-day range, ii) a total number of instances of deceleration above a predetermined deceleration threshold, and iii) a total number of miles traveled above a predetermined speed threshold; d) determine a trip score for the trip upon termination of the trip wherein the trip score is based, at least in part, on the additional trip information derived from the trip information collected; e) determine a set of driving performance metric scores based on at least a portion of the additional trip information derived from the trip information collected during the trip; and f) display a trip summary at a user interface on the mobile computing device wherein the trip summary includes i) the trip score, ii) the set of driving performance metric scores, iii) a total distance traveled during the trip, iv) a total duration of the trip, v) a start time and an end time for the trip, vi) a date the trip occurred, and vii) a map illustrating the route taken during the trip. The computing apparatus may include a performance scoring module configured to, in operation, determine a performance score based, at least in part, on the additional information derived from the trip information collected during the trip. The computing apparatus may also include a reward calculation module configured to, in operation, identify a reward percentage associated with the performance score, obtain an insurance premium of an insurance policy associated with the mobile computing device, and apply the reward percentage to the insurance premium to obtain a cash reward amount.

The details of these and other embodiments of the disclosure are set forth in the accompanying drawings and description below. Other features and advantages of aspects of the disclosure will be apparent from the description and drawings.

DESCRIPTION OF DRAWINGS

A more complete understanding of the present disclosures and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

1. Computing Environment

Figure 1:
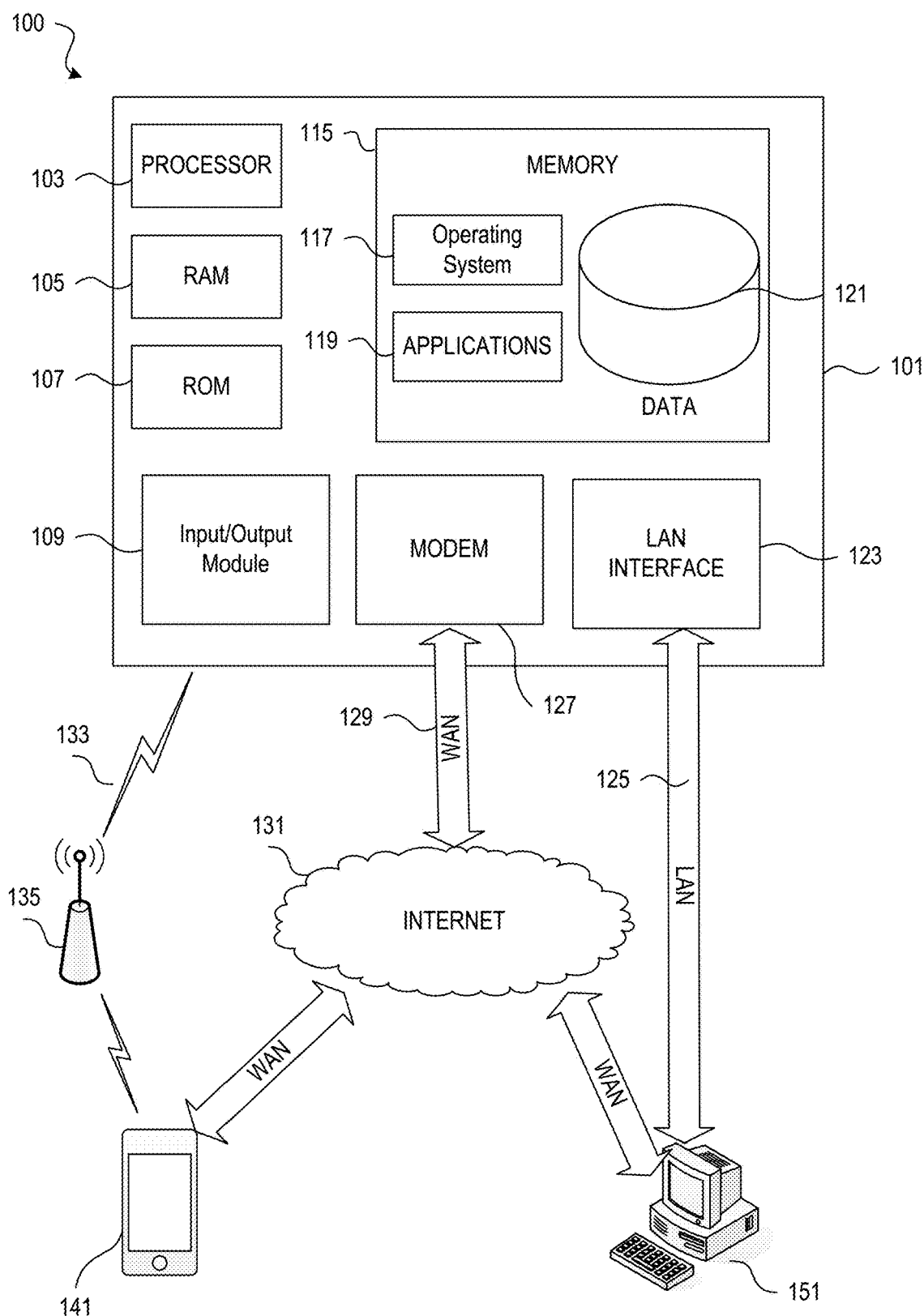
FIG. 1 is an example of an implementation of a network environment and computing systems that may be used to implement aspects of the disclosure.

FIG. 1 illustrates a block diagram of a computing device (or system) 101 in communication system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as a driving analysis server or system, configured as described herein for receiving and analyzing vehicle driving data and calculating driver scores based on various driving factors.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the driving analysis and reward system 101 to execute a series of computer-readable instructions to receive driving data from a vehicle, identify a driving event based on the driving data, receive image data, video data, and/or object proximity data associated with the driving event, and perform an analysis of the driving event based on image data, video data, and/or object proximity data.

The driving analysis and reward system 101 may operate in a networked environment 100 supporting connections to one or more remote computers, such as terminals 141 and 151. The terminals 141 and 151 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the driving analysis and reward system 101. The network connections depicted in FIG. 1 include a local area network (LAN) 125 and a wide area network (WAN) 129, and a wireless telecommunications network 133, but may also include other networks. When used in a LAN networking environment, the driving analysis and reward system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis and reward system components described herein may be configured to communicate using any of these network protocols or technologies.

Additionally, one or more application programs 119 used by the driving analysis server/system 101 may include computer executable instructions (e.g., driving analysis programs and driver score algorithms) for receiving vehicle driving data, identifying driving events, retrieving additional image data, video data, and/or object proximity data associated with the driving events, analyzing the driving events and the additional associated data, performing driving data analyses or driver score computations for one or more vehicles or drivers, and performing other related functions as described herein.

2. Driving Analysis and Reward System

Aspects of the disclosure relate to methods, computer-readable media, and apparatuses for analyzing driving data, calculating or adjusting a driver score based on the analyzed driving data, and providing driver rewards based on the driver score. Driving data may include vehicle operation data, vehicle condition data, and driving condition data. Vehicle operation data, as used in this description, refers to how a driver operates a vehicle with respect to, e.g., accelerating, braking (i.e., decelerating), turning, signaling, and other driving-related operations performed by the driver at the vehicle. Vehicle condition data, as used in this description, refers to the current state of the vehicle as well as various vehicle systems and components as indicated by one or more sensors installed within or attached to the vehicle. Vehicle condition data may include data identifying, for example, headlight usage, turn signal usage, windshield wiper usage, radio usage, seatbelt usage. Vehicle condition data may also include diagnostic data for the vehicle provided by the vehicle sensors as discussed above. Driving condition data, as used in this description, refers to the environment in which the driver operates the vehicle. Driving condition data may include data identifying, for example, traffic conditions (e.g., rush hour, non-rush hour, etc.), weather conditions (e.g., rain, snow, ice, fog, etc.), road type (e.g., highway, surface, rural), road condition (e.g., wet, dry, smooth, rough, etc.), traffic laws (e.g., speed limits, traffic lights, stop signs, passing allowed, no passing allowed, right turn on red, no turn on red, etc.), traffic zones (e.g., school zones, construction zones), time of day (e.g., morning, afternoon, night), day of week (e.g., weekday, weekend), time of year (e.g., summer, winter, holiday, etc.), and so forth. Vehicle operation data, vehicle condition data, and driving condition data may be collectively referred to as driving data. A driver score may be based on a set of driving factors. A driving factor may be a numerical value that corresponds to the driving data collected during operation of the vehicle. Driving factors are described in further detail below.

A driving data collection device may be installed at, attached to, and/or in signal communication with a vehicle and/or various systems and/or components of the vehicle. One example of a driving data collection device may be a telematics device installed at or attached to the vehicle. The telematics device may be configured to collect driving data during operation of the vehicle and transmit the driving data to a vehicle operation computer system or a driving analysis and reward system. Another example of a driving data collection device may be a mobile communication device ("mobile device") such as, e.g., a mobile telephone. A driving analysis application installed at a mobile device may also be configured to collect driving data during operation of the vehicle and transmit the driving data to a vehicle operation computer system or a driving analysis and reward system. Multiple driving data collection devices may be employed to collect driving data from the vehicle. For example, a telematics device may collect driving data from the vehicle and transmit the driving data to a driving analysis application installed at a mobile device. Other configurations and arrangements for driving data collection devices will be appreciated with the benefit of this disclosure.

Vehicle operation data may include data collected by internal sensors, computers, and cameras installed at or attached to the vehicle such as, e.g., the vehicle's speed, rates of acceleration, braking, or steering, impacts to the vehicle, usage of vehicle controls, and other vehicle operation data. Based on the vehicle operation data, a driving analysis and reward system may be configured to identify one or more safe driving events, e.g., controlled acceleration, braking, and turning. The driving analysis and reward system may also be configured to determine compliance with traffic signals and traffic laws and/or favorable road conditions, weather conditions, and traffic conditions based on the vehicle operation data, vehicle condition data, and driving condition data. Additional image data, video data, and/or object proximity data may be received from one or more data sources in order to analyze the potentially low-risk or safe driving event. A driver score may be calculated or adjusted for one or more vehicles or drivers based on the analysis of the image, video, or proximity data. In accordance with further aspects of the present disclosure, the image, video, or proximity data from the vehicle's internal cameras and sensors, internal cameras and sensors of other nearby vehicles, or image and video data from traffic cameras or other data sources may be used when analyzing the driving event. Data metrics may be calculated based on the image, video, and proximity data, and may be compared to one or more thresholds to assess the driving events or driving conditions.

As used herein, a driver score (or driving score) may refer to a measurement of driving abilities, safe driving habits, and other driver information. A driver score may be a rating generated by an insurance company, financial instruction, or other organization, based on the driver's age, vision, medical history, driving record, and/or other account data relating to the driver. For example, an insurance company server 101 may periodically calculate driver scores for one or more of the insurance company's customers, and may use the driver scores to perform insurance analyses and determinations (e.g., determine driver rewards). As discussed below, the driver score may be adjusted based on the real-time data collected by vehicle sensors, telematics devices, a mobile communication device, and other systems for measuring driving performance. For example, if a driver engages in safe and responsible driving habits—e.g., consistently drives within posted speed limits, wears a seatbelt, and keeps the vehicle in good repair—the driver score may be positively adjusted (e.g., increased). It should be understood that a driver score, as used herein, may be associated with an individual, group of individuals, or a vehicle. For instance, a family, group of friends or co-workers, or other group that shares a vehicle, may have a single driver score that is shared by the group. Additionally, a vehicle may have an associated driver score that is based on one or more primary drivers of the vehicle and can be affected by the driving behavior of any the vehicle's drivers. In other examples, a vehicle may be configured to identify different drivers, and each driver of the vehicle may have a separate driver score.

As also used herein, a driving achievement (or driving achievement) may refer to a goal that specifies a target driving behavior and conditions that must be satisfied for the achievement to be deemed successfully completed. Completion of the driving achievement may similarly be determined by an insurance company, financial institution, or other organization based on the driving data collected during operation of the vehicle. The driver score may be based, at least in part, on completion of one or more driving achievements. For example, if a driver successfully completes five driving achievements, then the driver score may be positively adjusted. Driving scores and driving achievements are described further below.

A driving analysis and reward system may determine a driver reward based on one or more driver scores, one or more driving achievements, or combinations of driver scores and driving achievements. The reward may be a reward earned for good driving, e.g., a hardcopy check for cash money made out to the driver. In this way, the driving analysis and reward system encourages drivers to drive, which may be contrary to industry practice. As noted above, it may be common practice in the vehicle insurance industry to discourage drivers from driving in order to lower the risk associated with a vehicle. Risk associated with a vehicle may be minimal where the vehicle is not driven at all. Accordingly, conventional approaches may provide benefits for reducing the amount of time spent driving or the amount of miles driven (i.e., mileage) thereby discouraging drivers from driving. In contrast, the driving analysis and reward system provided in this disclosure provides rewards for safe driving in order to lower the risk associated with a vehicle thereby encouraging drivers to drive.

Other features and advantages of the disclosure will be apparent from the additional description provided herein.

Figure 2:
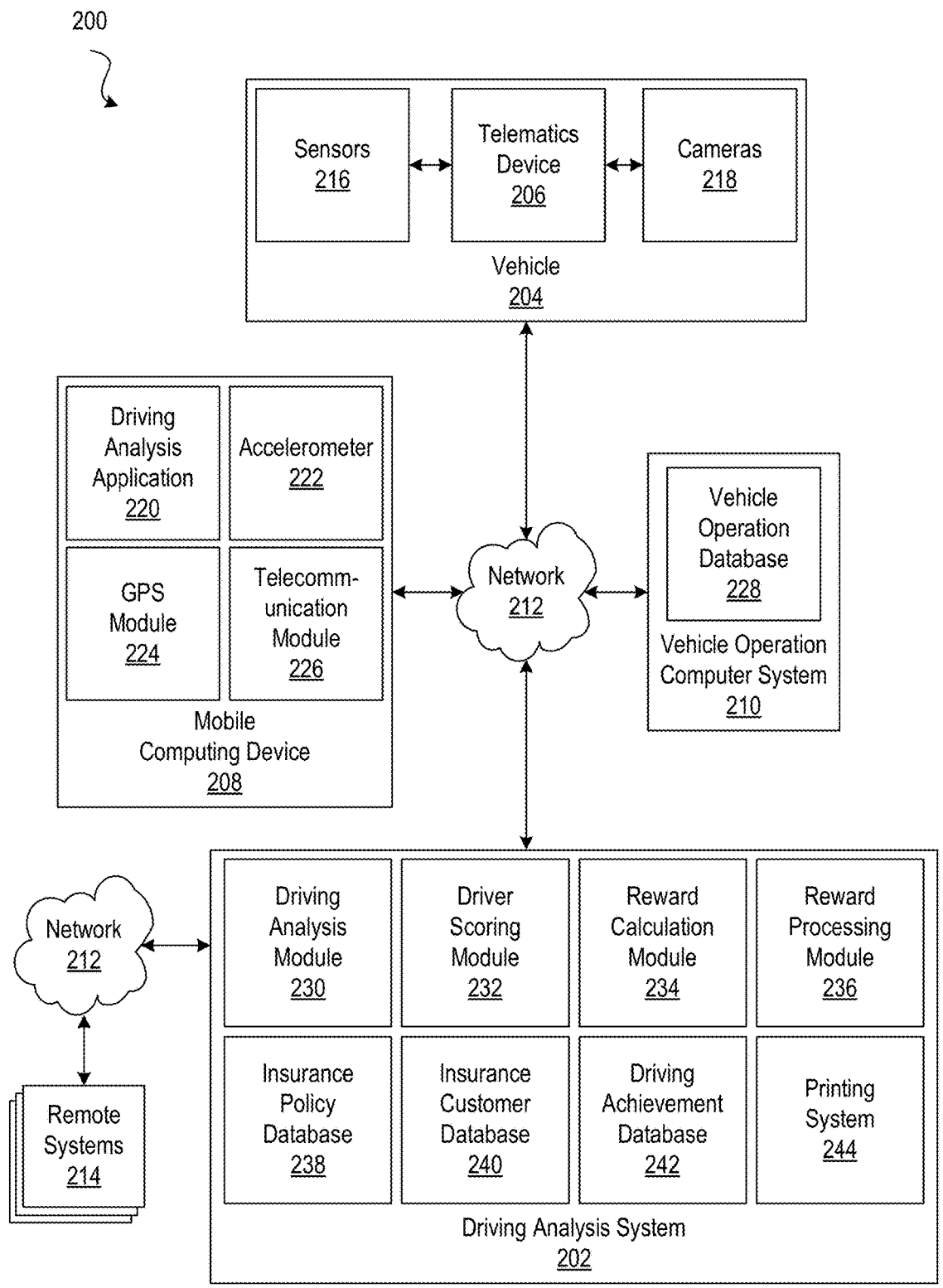
FIG. 2 is an example of an implementation of a driving analysis and reward system that encourages safe driving by providing cash rewards.

Referring to FIG. 2, an example of an implementation of a driving analysis and reward system 200 is shown. A driving analysis and reward system 202 may analyze driving data obtained during operation of a vehicle 204. The driving data may be generated at the vehicle 204 itself, at a telematics device 206 attached to the vehicle, at a mobile computing device 208 in signal communication with the driving analysis and reward system 202, or at a remote system 210 in signal communication with the driving analysis and reward system. The device or system that collects or otherwise obtains the driving data may be referred to as a trip monitoring device or a trip monitoring system. The remote system 210 may be a vehicle operation computer system may also be in signal communication with the vehicle 204 or the mobile computing device 208. The vehicle 204, mobile computing device 208, vehicle operation computer system 210, and the driving analysis and reward system 202 may be in signal communication via a telecommunication network 212, e.g., a LAN, WAN, and the like. The vehicle 204 and mobile computing device 208 may also be in signal communication directly by exchanging wireless signals, for example, via Bluetooth or other wireless communication protocol.

The vehicle operation computer system 210 may receive the driving data generated at the vehicle 204 or at the mobile computing device 208. The vehicle operation computer system 210 may store the driving data received. The driving analysis and reward system 202 may process the driving data to identify low-risk or safe driving events occurring at the vehicle 204, to determine whether the driver is engaging in safe driving behaviors during operation of the vehicle, and to determine whether the driver has successfully completed one or more driving achievements.

The driving analysis and reward system 202 may also be in signal communication with one or more systems 214 that are located remotely relative to the driving analysis and reward system. The driving analysis and reward system 202 may also be in signal communication with the remote systems 214 via a telecommunication network 212. Example of remote system 214 include, a traffic system that provides traffic information, a weather system that provides weather information, and other types of systems that provide information relevant to the analysis of the driving data, the determination of a driver score, and the determination of a driver reward. Such other remote systems 214 may provide information relating to, for example, traffic laws, traffic zones, and the like.

2.1. Vehicle

The driving analysis and reward system 202 shown in FIG. 2 receives driving data relating to operation of a vehicle 204, such as an automobile, motorcycle, or other vehicle for which an analysis of driving data may be performed and for which a driver score may be calculated. The vehicle 204 may include various sensors 216 such as vehicle operation sensors capable of detecting and recording various conditions at the vehicle and operational parameters of the vehicle. For example, vehicle operation sensors may detect and store data corresponding to the vehicle's speed, distances driven, rates of acceleration, rates of deceleration, and turning. The vehicle operation sensors may also detect and store data received from the vehicle's internal systems, such as headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 216 may detect and store the external driving conditions, for example, external temperature, rain, snow, light levels, and sun position for driver visibility. Additional sensors 216 may also detect and store data relating to compliance with traffic laws and the observance of traffic signals and signs. Additional sensors 216 may further detect and store data relating to the maintenance of the vehicle 204, such as the engine status, oil level, engine coolant temperature, odometer reading, the level of fuel in the fuel tank, engine revolutions per minute (RPMs), tire pressure, or combinations thereof.

The vehicle sensors 216 may also include proximity sensors, and the vehicle 204 may additionally include one or more cameras 218 and proximity sensors capable of recording additional conditions inside or outside of the vehicle. Cameras 218 may include internal cameras that detect conditions such as the number of the passengers in the vehicle, and potential sources of driver distraction within the vehicle (e.g., pets, phone usage, unsecured objects in the vehicle). Cameras 218 may also include external cameras and proximity sensors may detect other nearby vehicles, traffic levels, road conditions, traffic obstructions, animals, cyclists, pedestrians, and other conditions that may factor into an analysis of driving data.

The sensors 216 and the cameras 218 may store data within the vehicle 204, and/or may transmit the data to one or more external computer systems (e.g., the vehicle operation computer system 210 and/or the driving analysis and reward system 202). As shown in FIG. 2, the sensors 216 and the cameras 218 may be configured to transmit data to the vehicle operation computer system 210 via a telematics device 206. In other examples, one or more of the sensors 216 and/or the cameras 218 may be configured to transmit data directly without using a telematics device 206. For example, the telematics device 206 may be configured to receive and transmit data from vehicle operation sensors, while one or more proximity sensors or cameras 218 may be configured to directly transmit data to the vehicle operation computer system 210 or the driving analysis and reward system 202 without using the telematics device 206. Thus, the telematics device 206 may be optional in certain embodiments where one or more sensors 216 or cameras 218 within the vehicle 204 may be configured to independently capture, store, and transmit vehicle operation and driving data.

The telematics device 206 may be a computing device containing many or all of the hardware/software components as the computing device 101 depicted in FIG. 1. As discussed above, the telematics device 206 may receive vehicle operation and driving data from sensors 216 and cameras 218, and may transmit the data to one or more external computer systems (e.g., the vehicle operation computer system 210 and/or the driving analysis and reward system 202) over a wireless transmission network 212. The telematics device 206 may also be configured to detect or determine additional types of data relating to real-time driving and the condition of the vehicle 204. In certain embodiments, the telematics device 206 may contain or may be integral with one or more of the sensors 216 and cameras 218 discussed above, and/or with one or more additional sensors discussed below.

Additionally, the telematics device 206 may be configured to collect data regarding the number of passengers and the types of passengers (e.g. adults, children, teenagers, pets, etc.) in the vehicle. The telematics device 206 may also be configured to collect data relating to a driver's movements or the condition of a driver. For example, the telematics device 206 may include or communicate with sensors 216 that monitor a driver's movements, such as the driver's eye position and/or head position, etc. Additionally, the telematics device 206 may collect data regarding the physical or mental state of the driver, such as fatigue or intoxication. The condition of the driver may be determined through the movements of the driver or through sensors 216, for example, sensors that detect the content of alcohol in the air or blood alcohol content of the driver, such as a breathalyzer.

The telematics device 206 also may collect information regarding the driver's route choice, whether the driver follows a given route, and to classify the type of trip (e.g. commute, errand, new route, etc.). In certain embodiments, the telematics device 206 may be configured to communicate with the sensors 216 and/or cameras 218 to determine when and how often the vehicle stays in a single lane or changes lanes. To determine the vehicle's route, lane position, and other data, the telematics device 206 may include or may receive data from a mobile communication device 208, a Global Positioning System (GPS), locational sensors positioned inside a vehicle 204, or locational sensors or devices remote from the vehicle.

The telematics device 206 also may store the type of the vehicle 204, for example, the make, model, trim (or sub-model), year, and/or engine specifications. The vehicle 204 type may be programmed into the telematics device 206 by a user or customer, determined by accessing a remote computer system 214, such as an insurance company or financial institution server, or may be determined from the vehicle itself (e.g., by accessing the vehicle's computer systems).

In some example implementations, the telematics device 206 may include non-volatile memory, a processor, and a means for wireless transmission such as a GSM modem (Global System for Mobile Communications). The telematics device 206 may also include a three-axis (triaxial) accelerometer that measures acceleration along three different axes at a predetermine frequency, e.g., 4 Hertz (Hz). The driving analysis and reward system 202 may use the acceleration data generated by the accelerometer to identify acceleration, deceleration, and turning events at the vehicle 204. The acceleration data may be indicative of right/left acceleration, forward/backward acceleration, and up/down acceleration. The telematics device 206 may provide the acceleration data continually in real-time (or near real-time) during operation of the vehicle 240 or, additionally or alternatively, at the end of the trip in the vehicle (e.g., when the vehicle is shut off). The telematics device 206 may include a power source (e.g., an internal battery) or rely on power from the vehicle 204 to operate. The telematics device 206 may also rely on power from the vehicle 204 to recharge an internal power source.

In some example implementations, the telematics device 206 may be configured for attachment to an OBDII port at the vehicle 240 and configured to receive vehicle operation information via the OBDII port. Information received at the telematics device 206 via the OBDII port may include, for example, vehicle speed, the vehicle identification number (VIN), the current odometer value, parameter identifiers (PIDs). The telematics device 206 may receive the vehicle speed at one second intervals during operation of the vehicle 204. The telematics device 206 may also receive date and time information via the communication means (e.g., the GSM modem).

The telematics device 206 may store received information in the non-volatile memory and process the information using the processor. The telematics device 206 may process the information, e.g., at the end of a trip. For instance, the telematics device 206 may process the vehicle information to identify one or more windows (e.g., 10 second windows) during which controlled acceleration, controlled deceleration, or controlled turning occurred. Summary driving information may be derived from the driving information collected at the telematics device and 206 may include, for example: the number of seconds driven in various speed bands, e.g., 0-10 miles per hour (mph), 11-20 mph, 21-30 mph, and so forth; the total number of miles driven per time of day and the day of the week; the total number of controlled acceleration events; the total number of controlled braking events; the total number of controlled turning events; the total number of miles driven below a predetermined speed; the total number of miles driven above a predetermined speed; the average speed for the trip; and the maximum speed for the trip. The driving analysis and reward system 202 may receive and process the summary driving information during the driving analysis, driver scoring, and reward calculation processes.

The telematics device 206 may generate one or more driving records containing at least some of the driving information and transmit the driving records to the driving analysis and reward system 202. In some example implementations, the telematics device 206 may transmit the driving records to the vehicle operation computer system 210 for storage, and the driving analysis and reward system 202 may retrieve the driving records from the vehicle operation computer system. The telematics device 206 may transmit the driving records in real-time (or near real-time) and/or at the end of the trip (e.g., when the vehicle shuts off).

An organization such as an insurance company may provide the telematics device 206 to an individual for installation at the individual's vehicle 204. It will be appreciated, however, that in some example embodiments, the telematics device 206 may be integrated into the vehicle 204 and interconnected with the internal systems of the vehicle rather than configured for attachment to an OBDII port at the vehicle.

2.2. Mobile Computing Device

The mobile computing device 208 may additionally or alternatively be employed to generate and collect driving data during operation of the vehicle 204. The mobile computing device 208 may be, for example, a mobile telephone, a tablet computer, or other mobile computing device. The mobile computing device 208 may include some or all of the hardware/software components as the computing device 101 depicted in FIG. 1. As seen in FIG. 2, the mobile computing device 208 may also include a driving analysis application 220, an accelerometer 222, a GPS (Global Positioning System) module 224, and a telecommunication module 226.

The accelerometer 222 of the mobile computing device 208 may also be a triaxial accelerometer to measure acceleration along three different axes. The acceleration data generated by the accelerometer 222 of the mobile computing device 208 may likewise be indicative of right/left acceleration, forward/backward acceleration, and up/down acceleration. The driving analysis and reward system 202 may likewise use the acceleration data generated by the accelerometer 222 of the mobile computing device 208 to identify acceleration, deceleration, and turning events at the vehicle 204. The GPS module 224 of the mobile computing device 208 may receive geographic location information (e.g., latitude/longitude coordinates) from a Global Positioning System corresponding to a geographic location of the mobile computing device 208. The telecommunication module 226 of the mobile computing device 208 may enable the mobile computing device to communicate via a telecommunications network 212 such as a cellular network, the Internet, and the like.

The driving analysis application 220 of the mobile computing device 208 may reside at a memory of the mobile computing device as set of computer-executable instructions. A processor at the mobile computing device 208 may retrieve and execute the instructions during operation of the driving analysis application 220. The driving analysis application 220 may be configured to perform functions similar to those of the telematics device 206 discussed above. For example, the driving analysis application 220 may be configured to measure acceleration during operation of vehicle 204, process information to derive summary driving information, and provide driving data to a vehicle operation computer system 210 or driving analysis and reward system 202 at periodic intervals or at the end of a trip. The driving analysis application 220 at the mobile computing device 208 may also be in signal communication (e.g., via Bluetooth) with a telematics device 206 installed at or attached to the vehicle 204. In this way, the driving analysis application 220 may also receive information provided by the vehicle sensors 216 and/or cameras 218. The driving analysis application 220 may also collect geographic location information from the GPS module 224 and information from the telecommunication module 226 (e.g., date and time information). The driving analysis application 220 may provide this information to a vehicle operation computer system 210 for storage and/or a driving analysis and reward system 202 for analysis.

An organization such as an insurance company may provide the driving analysis application 220 to customers or otherwise make the driving analysis application available for download. Once installed at the mobile computing device 208, the driving analysis application 220 may be configured to launch automatically upon startup of the mobile computing device 208 and run in the background, i.e., run as a background process. The driving analysis application 220 may also be configured to run in the foreground to receive user input from a user of the mobile computing device 208. A user of the mobile computing device 208 may, for example, manually activate or deactivate the driving analysis application 220 as desired, e.g., when the user is not driving a vehicle 204. For example, if the user is walking, biking, or riding in a vehicle 204 as a passenger, the user may turn off the driving analysis application 220 such that the application does not measure acceleration, deceleration, turning, and so forth. The application 220 may also be configured to automatically distinguish situations where the user is driving a vehicle 204 and where the user is not driving a vehicle, e.g., when the user is walking or simply riding in a vehicle. For example, when the user is walking a discernible pattern of acceleration data may be generated by the accelerometer, and the driving analysis application 220 may attempt to match such a pattern to observed acceleration data in order to determine whether the user is walking. In another example, the driving analysis application 220 may be able to automatically detect that the user is a passenger in a vehicle 204 (e.g., based on information from cameras 218 or other sensors 216 indicating the location of the mobile computing device 208 within the vehicle). In other examples, the driving analysis application 220 may be configured to start monitoring once a threshold speed is observed (e.g., 20 mph).

The driving analysis application 220 may also be configured to exchange communications with the driving analysis and reward system 202. In some example, for instance, the driving analysis and reward system 202 may provide communications to the driving analysis application 220 at the mobile computing device 208 instructing the mobile computing device to start monitoring vehicle operation or refrain from monitoring vehicle operation. As discussed further below, the driving analysis and reward system 202 may not provide rewards unless each individual covered by an insurance policy has installed the driving analysis application 220 at a respective mobile computing device 208. In this example, the driving analysis and reward system 202 may instruct the driving analysis application 220 to refrain from monitoring vehicle operation in response to a determination that each individual covered by an insurance policy has not installed the driving analysis application. It will be appreciated that the term "driving analysis application" is simply used for convenience to describe an application configured to, in operation, perform functions related to detecting trips and collecting trip-related data to monitor the trip while the trip is in progress. Accordingly additional and alternative terms may be used to refer to the driving analysis application 220.

2.3. Vehicle Operation Computer System

As noted above, a vehicle operation computer system 210 may receive and store the driving data generated at the vehicle 240 or the mobile computing device 208. The vehicle operation computer system 210 may be a computing device separate from the vehicle 204 and separate from the mobile computing device 208, containing some or all of the hardware/software components as the computing device depicted in FIG. 1. The vehicle operation computer system 210 may be configured to receive and store the vehicle operation data discussed above from vehicle 204 or mobile computing device 208. The vehicle operation computer system 210 may receive driving data associated with multiple vehicles. In the example shown in FIG. 2, the vehicle operation computer system 210 includes a vehicle operation database 228 that may be configured to store the driving data and/or vehicle collected from the sensors 216, cameras 218, telematics device 206, and/or mobile computing device 208. The vehicle operation database 28 may store operational sensor data, proximity sensor data, camera data (e.g., image, audio, and/or video), location data, time data, driving data, and other data associated with operation of the vehicle 204.

Data stored in the vehicle operation database may be organized in any of several different manners. For example, a table in the vehicle operation database may contain all of the data associated with a specific vehicle, similar to a vehicle event log. Other tables in the vehicle operation database may respectively store data associated with other vehicles. For instance, tables may store specific driving behaviors (e.g., speed, acceleration, braking, turning, proximity to other vehicles, use of seat belts, turn signals or other vehicle controls, etc.) for one or more vehicles at various locations, such as neighborhoods, roads, or intersections. Vehicle data may also be organized by time, so that the driving events, driving behaviors, driving conditions, and other driving information associated with one or more vehicles may be stored or grouped by time (e.g., morning, afternoon, late night, rush hour, weekends, etc.) as well as location.

2.4. Driving Analysis and Reward System

The driving analysis and reward system 202 may contain some or all of the hardware/software components as the computing device depicted in FIG. 1. The driving analysis and reward system 202 may include hardware, software, and network components to receive driving data and vehicle data from the vehicle operation computer system 210, directly from a vehicle 204, directly from a telematics device 206, and/or directly from a mobile computing device 208. The driving analysis and reward system 202 and the vehicle operation computer system 210 may be implemented as a single server/system, or may be separate servers/systems. In some examples, the driving analysis and reward system 202 may be a central server configured to receive driving data and vehicle data from multiple remotely located vehicle operation computer systems 210.

As seen in FIG. 2, the driving analysis and reward system 202 may include various modules and repositories used to analyze driving data, determine a driver score, calculate a reward, and processing the reward. In this example, the driving analysis and reward system 202 includes a driving analysis module 230 that analyzes driving data; a driving scoring module 232 that determines a driving score based on the analysis of driving data; a reward calculation module 234 that calculates a reward based on the driving score; and a reward processing module 236 that furnishes the reward to a driver. The driving analysis and reward system 202 may also include various data repositories including, for example: an insurance policy database 238, an insurance customer database 240, and a driving achievement database 242. As noted above, a driver reward may be a hard copy check for cash money. Accordingly, the driving analysis and reward system 202 may thus include a printing system 244 for generating the hard copy check. The printing system 244 may include, e.g., a printer that configured to print hard copy checks. The modules and repositories of the driving analysis and reward system 202 may be directly connected or indirectly interconnected via a telecommunication network 212 such as, e.g., a LAN or WAN.

The modules 230-236 may be implemented in hardware and/or software configured to perform a set of specific functions within the driving analysis and reward system 202. For example, the driving analysis module 230 may include one or more driving event analysis algorithms and the driver scoring module 232 may include one or more driver scoring algorithms, which may be executed by one or more software applications running on generic or specialized hardware within the driving analysis and reward system 202. The driving analysis module 230 may use the driving data received to perform driving event analyses for a vehicle 204. The driver scoring module 230 may use the results of the driving analysis to calculate or adjust a driver score. Further descriptions and examples of the algorithms, functions, and analyses that may be executed by the driving analysis module 230 and the driver scoring module 232 are described further below. Additionally, analysis of driving events and calculation of driver scores may be further described in U.S. Provisional Patent Application No. 61/739,451 entitled "DRIVING EVENT DATA ANALYSIS" filed on Dec. 19, 2012, which is incorporated by reference herein in its entirety.

The reward calculation module 234 may similarly include one or more reward calculation algorithms that may be executed by one or more software applications running on generic or specialized hardware within the driving analysis and reward system 202. The reward calculation module 234 may use a driver score generated by the driver scoring module 232 to calculate a reward. As noted above the reward may be a hard copy check for cash money. Accordingly, the reward calculation module 234 may determine an amount of money to award a driver based on the driver score. The reward calculation module 234 may be in signal communication with the printer of the printing system 244 to initiate printing of the hard copy check for the determined amount of money. Further descriptions and examples of algorithms, functions, and calculations that may be executed by the reward calculation module 234 are described further below.

The insurance policy database 238 may store information regarding one or more insurance policies provided by an insurance company. The information stored in the insurance policy database 238 may include insurance policy information (e.g., effective date, term, coverage, premiums, deductibles, etc.) as well as information regarding vehicles covered by the insurance policy (e.g., make, model, year, color, VIN, etc.). The insurance customer database 240 may store information regarding one or more insurance customers that an insurance company insures. The information stored in the insurance customer database 240 may include biographic information, demographic information, and contact information for insurance customers (e.g., name, gender, age, mailing address, home phone number, mobile phone number, email address, etc.). The insurance policy database 238 and/or the insurance customer database 240 may maintain relationships between insurance policy information stored at the insurance policy database and insurance customer information stored at the insurance customer database, e.g., the insurance customers covered by a particular insurance policy.

The driving achievement database 242 may store information defining one or more driving achievements. The driving achievement database 242 may also store records of successfully completed driving achievements. The driving achievement database 242 may maintain relationships between the completed driving achievement records and the insurance customer information at the insurance customer database 240 for the driver that successfully completed the driving achievement. As noted above a driving achievement may specify one or more conditions relating to operating the vehicle 204. Driving achievements categories may be associated with driving achievements. Driving achievement categories may include, for example, a driving speed achievement, an acceleration achievement, a deceleration achievement, a turning achievement, a signaling achievement, a proximity achievement, a vehicle maintenance achievement, and so forth. It will be appreciated that other types of driving achievements may be selectively employed and defined at the driving achievement database 242. It will also be appreciated that an organization such as an insurance company may update the driving achievement database 242 in order to add new driving achievements or modify existing driving achievements. In this way, drivers may be continually challenged to engage in safe driving by attempting to complete new driving achievements as they arise. The driving score for a driver may be based, at least in part, on successful completion of one or more driving events and/or driving achievements.

It will be appreciated that a variety of different driving achievements may be defined for a variety of different driving achievement categories. An example of a speed achievement may be three hours of highway driving within 5 mph of the speed limit. An example of an acceleration achievement may be completing a trip with only controlled acceleration events. An example of a deceleration achievement may be completing a trip with only controlled braking events. An example of a turning achievement may be completing a trip with only soft turns. An example of a signaling achievement may be activating a turn signal at least a hundred feet before initiating each turn of the trip. A proximity achievement may be maintaining at least three hundred feet between cars during highway driving at speeds above 55 mph. A vehicle maintenance achievement may be maintaining recommended tire pressure for a period of six months. Driving achievements may also be defined for particular driving conditions. As an example, a speed/weather achievement may be driving at least 10 mph below the speed limit during periods of inclement or severe weather (e.g., rain, snow, fog, etc.). As another example, a proximity/traffic achievement may be maintaining at least one car length between cars when traveling on the highway in stop-and-go traffic. It will be appreciated that some driving achievements may be successfully completed more than once, e.g., activating a turn signal for every turn during a trip. Additional or alternative driving achievements may be selectively defined and implemented to encourage safe driving behaviors when operating a vehicle. Additional descriptions and examples of driving achievements are described below.

2.4.1. Driving Analysis Module

The driving analysis module 230 of the driving analysis and reward system 202 may analyze the driving data received from the driving analysis application 220 at the mobile computing device 208, the telematics device 206, the vehicle operation computer system 210, and/or a remote system 214. The driving scoring module 232 may utilize the results of the driving analysis in order to determine a driving score for a driver.

The driving analysis module 230 may be configured to analyze the driving data to identify various driving events and driving behaviors that occurred during operation of the vehicle 204 as well as various driving conditions observed during operation of the vehicle. Driving events may include, for example, acceleration events, deceleration (braking) events, turning events, lane change events, stopping events, backing up events, and the like. Driving behaviors may include, for example, observed speed, average speed, maximum speed, proximity between vehicles, turn signal usage, headlight usage, windshield wiper usage, seatbelt usage, and the like. Driving conditions may include, for example, traffic conditions, weather conditions, road conditions, road type, school zones, construction zones, traffic laws, traffic signals, vehicle health, and the like. As noted above, in some examples, the telematics device 206 and/or the driving analysis application 220 at the mobile computing device 208 may perform some of the analysis of the driving data and provide indications of driving events, behaviors, and conditions as summary driving data (e.g., average speed, maximum speed, etc.).

The driving analysis module 230 may further be configured to determine whether a driving event, behavior, or condition represents a safe driving event, behavior, or condition respectively. Some examples may include determining whether an acceleration event is a controlled acceleration event, determining whether a braking event is a controlled braking event, and determining whether a turning event was a controlled turn (i.e., a "soft turn"). A controlled acceleration event may correspond to acceleration that occurs at less than 8 mph over a period of one second; a controlled braking event may correspond to deceleration that occurs at less than 8 mph over a period of one second; and a controlled turn may be a turn in which less than 1.025 g-forces are observed.

Other examples may include: i) determining that the trip occurred during inclement weather based on information obtained from a remote weather system and assessing whether the driver activated the headlights and windshield wipers during the trip; ii) determining that the vehicle traveled through a school zone during the trip based on information obtained from a remote road map system and assessing whether the driver reduced the vehicle speed when traveling through the school zone; iii) identifying one or more stops signs along the route traversed by the vehicle based on information obtained from a remote road map system and assessing the percentage of stops were full and complete stops versus rolling stops; iv) determining that the vehicle was in heavy traffic during the trip based on information obtained from a remote traffic system and assessing whether the driver maintained a safe distance between cars while in traffic; v) determining that the trip occurred in twilight or darkness based on data from ambient light sensors at the vehicle and assessing whether the driver activated the headlights; vi) determining that the driver executed a lane change during the trip and assessing whether the driver activated the vehicle turn signal when changing lanes; and vii) determining the various speed limits along the route traversed by the vehicle based on information obtained from a remote road map system and assessing the percentage of time the driver maintained the speed limit. It can be seen from these examples that many different driving events, behaviors, and conditions are possible. Those skilled in the art will appreciate with the benefit of this disclosure that the driving analysis module 230 may be selectively configured to identify and assess such additional or alternative driving events, behaviors, and conditions.

As a result of the driving analysis, the driving analysis module 230 may produce one or more driving analysis results. The driving analysis results may be, for example, a numerical value, a Boolean value, an alphabetic value or string, an alphanumeric string, and/or any other type of value suitable for quantifying or categorizing driving events, behaviors, and conditions. With respect to braking events, for example, the driving analysis results may indicate using a numeric value the total number of controlled braking events and/or the percentage of controlled braking events per total number of braking events. With respect to turn signal usage, as another example, the driving analysis results may indicate using a Boolean value (e.g., true/false, yes/no, I/O, etc.) whether the driver activated the turn signal when changing lanes.

The driving analysis module 230 may provide the driving analysis results to the driver scoring module so that the driver scoring module may determine a driver score.

2.4.2. Driver Scoring Module

The driver scoring module 232 of the driving analysis and reward system 202 may calculate a driver score for a driver based, at least in part, on the driving analysis results produced by the driving analysis module 230. The driver score may be based on a set of numeric driving factors, and the driving scoring module 230 may utilize the driving analysis results to determine respective values for the driving factors. Driving factors may correspond to the driving events, behaviors, and conditions described above. Driving factors may also include the number of driving achievements successfully completed during the trip. For example, the driving scoring module 232 may aggregate a controlled acceleration factor, a controlled braking factor, and a controlled turning factor to determine a numeric driving score.

The driving scoring module may utilize a driver scoring equation to aggregate the driving factors and produce a driving score. One example of a driving scoring equation may be:

driver_score=driving_factor$_1$×driving_factor$_2$× . . . ×driving_factor$_n$ where driving_factor$_1$-driving_factor$_n$ are the numeric values of a subset of potential driving factors.

It will be appreciated that the driving scoring module 232 may be configured to employ one or more driving equations that respectively include different driving factors. It will also be appreciated that additional or alternative mathematical operations may be selectively employed to aggregate the driving factors.

For example, one driver scoring equation may include driving factors corresponding to speed, controlled acceleration events, controlled braking events, and controlled turning events, e.g.:

driver_score=speed_factor×acceleration_factor×braking_factor×turning_factor while another driver scoring equation may further include driving factors corresponding to headlight usage and turn signal usage, e.g.:

driver_score=speed_factor×acceleration_factor×braking_factor×turning_factor×headlight_factor×turn_signal_factor In this way, the driver scoring module may be selectively configured to employ driver score equations that include factors relevant to the driving data and do not include factors relevant to the driving data. In some examples, however, the driver scoring module 232 may employ a driver scoring equation that includes the full set of potential driving factors but is configured such that driving factors that are not relevant to the driving data do not affect the driving score. In the examples set forth above, if a driving factor has a numeric value of 1.0, it will be recognized that the driving factor will not affect the driving score since the equation uses multiplication operations to aggregate the driving factors. Alternative values may be selectively employed where alternative mathematical operations are employed (e.g., a value of 0.0 for a driving factor where the equation includes addition operations).

Driving factors may also be weighted in order to emphasize or deemphasize various driving factors of the equation. Accordingly, a driving factor (df) may be associated with a weight value (w), and the driver scoring equation may include these weight values, e.g.:

driver_score=($w_1$×$df_1$)×($w_2$×$df_2$)× . . . ($w_n$×$df_n$)

where $w_1$-$w_n$ are the values for the weights respectively associated with the driving factors $df_1$-$df_n$.

As noted above, the driver scoring module 232 may utilize the driving analysis results to determine respective values for the driving factors. In some examples, the value of a driving factor may correlate with the value of the driving analysis result.

The tables listed below illustrate example correlations between various driving analysis results and the values of the driving factor. The driving analysis results are listed in the left column and the corresponding values for the driving factor are listed in the right column.

TABLE 1

PERCENTAGE OF CONTROLLED BRAKING EVENTS

| CONTROLLED BRAKING EVENTS PER TOTAL BRAKING EVENTS | BRAKING FACTOR |
|---|---|
| <0.25 | 1.00 |
| 0.25 to <0.50 | 1.01 |
| 0.50 to <0.75 | 1.02 |
| 0.75 to <1.00 | 1.03 |
| 1.00 | 1.04 |

TABLE 2

PERCENTAGE OF TIME WITHIN 5 MPH OF SPEED LIMIT

| PERCENTAGE OF TIME | SPEED FACTOR |
|---|---|
| <0.10 | 1.000 |
| 0.10 TO <0.50 | 1.010 |
| 0.50 TO <0.75 | 1.025 |
| 0.75 TO <1.00 | 1.045 |
| 1.00 | 1.050 |

TABLE 3

HEADLIGHT USAGE

| HEADLIGHT USAGE | HEADLIGHT FACTOR |
|---|---|
| FALSE | 1.000 |
| TRUE | 1.010 |

TABLE 4

NO. DRIVING ACHIEVEMENTS COMPLETED

| NO. DRIVING ACHIEVEMENTS COMPLETED | ACHIEVEMENT FACTOR |
|---|---|
| 0 | 1.000 |
| 1 | 1.005 |
| 2 | 1.015 |
| 3 | 1.025 |
| 4 | 1.035 |
| 5 | 1.050 |

From these example tables, the relationship between the driving analysis results and the values for the driving factors may be appreciated. As previously stated, additional or alternative types of driving analysis results may be related to and correlate with additional or alternative driving factors respectively.

In some examples, a driving score may be normalized, e.g., to a normalized driving score between 100 and 1000. In some instances, the driver score may represent a level of risk associated with the driver where a driver score of 100 represents the lowest level of risk and the driver score of 1000 represents the highest level of risk. In this example, the driver analysis and reward system 202 may provide a reward to a driver with a relatively low driver score representing a relatively low level of risk. In other instances, the driver score may alternatively represent a safety level of the driver's driving style where a driver score of 100 represents the least safe driving style and a driver score of 1000 represents the safest driving style.

The driver scoring module 232 may store the driving score for a driver in one of the data repositories at the driving analysis and reward system 202. In some examples, the driver scoring module 232 may update a single driver score associated with a driver. In other examples, the driver scoring module 232 may add a new driver score to a list of historic driver scores associated with the driver. The driver scoring module 232 may also store in one of the data repositories the driving analysis results and the driving factors used to determine the driver score. In this way, the driver analysis and reward system 202 may provide a summary of the driving data and driving factors that resulted in a particular score associated with the driver. The driving analysis and reward system 202 may additionally include recommendations regarding the steps a driver may take to improve the driver score in the future, e.g., by executing more controlled accelerations, braking, and turns; by using turn signals more often; and/or by reducing average speed while driving.

In some examples, the driver analysis and reward system 202 may only provide one reward per insurance policy (e.g., one hard copy check) even though multiple drivers may be covered by a single insurance policy. Accordingly, the driver scoring module 232 may be configured to aggregate driving scores for each individual driver covered by a policy. In this way, the driver scoring module 232 may determine an overall driving score for the policy, and the reward calculation module 234 may determine whether to provide a reward based on the overall driving score.

In some examples, the driver scoring module 232 may determine the overall driving score by averaging the individual driving scores for each individual covered by the insurance policy, e.g.:

$$\text{overall\_driver\_score} = (\text{driver\_score}_1 + \text{driver\_score}_2 + \ldots + \text{driver\_score}_n) \div \text{total\_drivers}$$

where $\text{driver\_score}_1$-$\text{driver\_score}_n$ are the individual driver scores for the individuals covered by the insurance policy and total_drivers is the total number of drivers covered by the insurance policy.

In other examples, the driver scoring module may apply weighting values (w) to the individual driver scores (ds) in order to weigh some individuals more heavily than others, e.g.:

$$\text{overall\_driver\_score} = [(w_1 \times ds_1) + (w_2 \times ds_2) + \ldots (w_n \times ds_n)] \div \text{total\_drivers}$$

where $ds_1$-$ds_n$ are the individual driver scores for the individuals covered by the insurance policy, $w_1$-$w_n$ are the weights respectively associated with the individual driving scores, and total_drivers is the total number of drivers insured by the insurance policy.

The driver scoring module 232 may apply weights to the individual driver scores where it is desired to encourage safe driving from one of the individuals more than another. For instance, where one of the drivers insured by the insurance policy is a teenager, the driver scoring module may apply a weight to the driver score associated with the teenager. In this way, the overall driving score may depend more heavily on the driving score associated with the teenager, and the teenager may thereby be encouraged to engage in safe driving behaviors.

As noted above, when a low mileage factor may increase the likelihood of a driver reward, drivers may be incentivized or encouraged not to drive. The driver analysis and reward system 202 described herein may be configured to encourage drivers to drive and to drive well. Therefore the driver scoring module 232 may not utilize a low mileage factor when determining a driver score. The driver scoring module 232 may, however, utilize mileage in conjunction with other driving factors, e.g., the number or percentage of miles driven within 5 mph of the speed limit.

Having determined a driver score of an individual (or an overall driver score for a group of individuals), the reward calculation module 234 of the driving analysis and reward system may calculate or otherwise determine a reward based on the driver score (or overall driver score).

2.4.3. Reward Calculation Module

The driving analysis and reward system 202 may include a reward calculation module 234 that calculates or otherwise determines a reward based on a driver score associated with an insurance policy. As noted above the driver score may be an overall driver score derived from individual driver scores respectively associated with individuals covered by the insurance policy. The reward calculation module 234 may be configured to calculate a driver reward at periodic intervals, e.g., monthly, quarterly, annually, or at the beginning of a policy renewal period.

In some examples, the reward calculation module 234 may be configured to first determine whether or not to provide a driver award. If the reward calculation module 234 decides to provide a driver award, then the reward calculation module may then determine an amount for the driver reward. The reward calculation module 234 may employ a driver score threshold that a driver score must meet or exceed before a driver reward is provided. If a driver score falls below the driver score threshold, the reward calculation module 234 may decide not to provide a driver reward. If the driver score equals or exceeds the driver score threshold, the reward calculation module may decide to provide the driver reward. Using the example above, a driver score may range between about 100 (least safe driving style) and about 1000 (safest driving style). In this example, the reward calculation module 234 may employ a driver score threshold of 600 such that driver scores below 600 do not receive driver rewards and driver scores at or above 600 do receive driver rewards.

Having determined to provide a driver reward, the reward calculation module 234 may then determine the amount of the reward. In some examples, the amount of the driver reward may be fixed regardless of the driver score, while in other examples the amount of the reward may depend on the driver score. In some examples the amount of the driver reward may be an arbitrary value (e.g., $20.00), while in other examples the amount of the driver award may be based on some other value (e.g., an insurance premium). As an example, where a driver reward is provided monthly, the amount of the driver reward may be based on a monthly insurance premium (e.g., a percentage of the monthly insurance premium). As another example, where a driver reward is provided annually, the amount of the driver reward may be based on an annual insurance premium (e.g., a percentage of the annual insurance premium).

The table set forth below illustrates an example of how the driver reward may depend on the driver score.

TABLE 5

POTENTIAL REWARD AMOUNTS BASED ON DRIVING SCORE

| DRIVER SCORE | PERCENTAGE OF PREMIUM | FIXED AMOUNT |
| --- | --- | --- |
| <600 | no reward | no reward |
| 600 to <700 | 9% | $20.00 |
| 700 to <800 | 18% | $30.00 |
| 800 to <900 | 27% | $50.00 |
| 900 to 1000 | 36% | $75.00 |

In some examples, the driving analysis and reward system 202 may additionally or alternatively provide rewards in response to successful completion of one or more driving achievements. Accordingly, the reward calculation module 234 may also be configured to determine that a driver has successfully completed one or more driving achievements and calculate a reward for the driver. In some examples, the driving analysis and reward system 202 may not provide the driver reward unless each individual insured on the insurance policy has successfully completed one or more driving achievements. In fact, one example of a driving achievement may be the successful completion of a set of driving achievements by each individual insured by an insurance policy.

Accordingly, the reward calculation module 234 may be configured to periodically assess how many driving achievements a driver has successfully completed (e.g., monthly, quarterly, annually, at the beginning of a policy renewal period, etc.). As noted above the driving analysis and reward system 202 may maintain records of successfully completed driving achievements for a driver. The reward calculation module 234 may thus query the data repository that stores the driving achievement records for any new driving achievement records created since the previous determination. The reward calculation module 234 may thus determine whether to provide a reward for driving achievements successfully completed since the previous determination. In some examples, different driving achievements may be weighted such that certain driving achievements contribute more towards the determination of whether to provide a driver reward.

The table set forth below illustrates an example of how a driver reward may be based on a total number of successfully completed driving events.

TABLE 6

POTENTIAL AMOUNTS FOR DRIVING REWARD BASED ON DRIVING SCORE

| NO. DRIVING ACHIEVEMENTS COMPLETED | PERCENTAGE OF PREMIUM | FIXED AMOUNT |
| --- | --- | --- |
| 0 | no reward | no reward |
| 5-9 | 9% | $20.00 |
| 10-20 | 18% | $30.00 |
| 21-35 | 27% | $50.00 |
| 36+ | 36% | $75.00 |

In some examples, the driving achievements may be used in conjunction with badge-based rewards. Completing a set of driving achievements may earn a driver a badge, and the driving analysis and reward system 202 may provide the awards described above once a driver has collected a certain number of badges. Badges may correspond to a set of driving achievements that may or may not be related. As an example, a driver may earn a controlled acceleration badge for successfully completing a set of controlled acceleration driving achievements. As another example, a driver may earn a safe speed badge by completing a set of speed-related driving achievements. Badges may also group driving achievements according to the level of skill, time, or effort needed to successfully complete the driving achievements. The driving achievement database may, for example, include a "beginner-level" set of driving achievements, an "intermediate-level" set of driving achievements, and an "advanced-level" set of driving achievements. Driver rewards may be provided for collecting such badges in accordance with the various approaches set forth above. The driving analysis and reward system 202 may also be configured to announce on one or more social networks when a driver successfully completes a driving achievement or is awarded a badge, e.g., "Driver A successfully earned the Advanced Safe Driving Badge earning him $75.00 as a reward!"

Having calculated or otherwise determined a driver reward to provide a driver, the reward calculation module 234 may forward the reward amount to a reward processing module 236 for processing and fulfillment.

2.5. Reward Processing Module

The driving analysis and reward system 202 may include a reward processing module 236 to automatically process and fulfill a driver reward. As noted above, the driver reward may be a hard copy check for cash money. Accordingly, the reward processing module 236 may receive the reward amount from the reward calculation module 234 and initiate preparation of the hard copy check. In some examples, the reward amount may be issued as an electronic check, and the reward processing module 236 may initiate generation of the electronic check.

The reward processing module 236 may be in signal communication with a printing system 244 in order to generate and prepare the hard copy check. The printing system 244 may include, for example, a printer. The reward processing system 236 may retrieve the customer information for the driver from the insurance customer database 240 (e.g., name, mailing address, etc.) and provide the customer information to the printing system 244 along with the reward amount. The printing system 244 may then prepare and print a hardcopy check for the reward amount made out to the customer. The printing system 244 may also be configured to prepare a mailing addressed to the customer that includes the hardcopy check. The mailing may then be mailed to the customer.

Upon receipt of the mailing, the customer may open the mailing, retrieve the check, and deposit the check into a personal bank account thereby completing the process of rewarding the driver for driving safely. The mailing may include other items in addition to the hardcopy check. For example, the mailing may include a summary of the driving data that determined the amount of the reward. The driving summary may also include recommendations for safe driving behaviors that would improve the driver score for the driver and lead to larger reward amounts. The summary may additionally include indications of additional or higher reward amounts that would have been earned had the driver engaged in the recommended driving behaviors. The mailing also may include hard copy marketing or advertising information. In addition, the mailing may include hard copy coupons or reward cards from consumer retailers, vehicle repair or maintenance facilities or other entities that provide products or services to vehicle owners or users.

The reward processing module 234 may also be configured to notify a driver when the driver has earned a driver reward. The reward processing module 234 may notify the driver via, e.g., email, text message, automated phone call, and the like. It will be appreciated with the benefit of this disclosure, that having been notified to expect the reward, the driver is highly likely to open the mailing received. With the knowledge that the driver is likely to open the mailing in order to retrieve the reward, opportunities arise for including additional materials in the mailing that will reach the driver. For example, an organization may include in the mailing marketing materials, policy renewal forms, coupons, bonus offers, affinity rewards for corporate partners, and the like. Additional or alternative materials may be selectively included in the mailing depending on the goals of the organization.

Where the driving analysis and reward system 202 provides the driver reward as an electronic check, the reward processing module 234 may be in signal communication with a remote banking system. The reward processing module 234 may exchange one or more signals with the remote banking system to generate the electronic check for the driver. The reward processing module 234 may, for example, access the customer information for the driver from the insurance customer database 240 (e.g., name, bank account information, etc.), and provide the customer information to the remote banking system such that the electronic check may be provide to the driver.

3. Driving Analysis and Reward Overview

Figure 3:
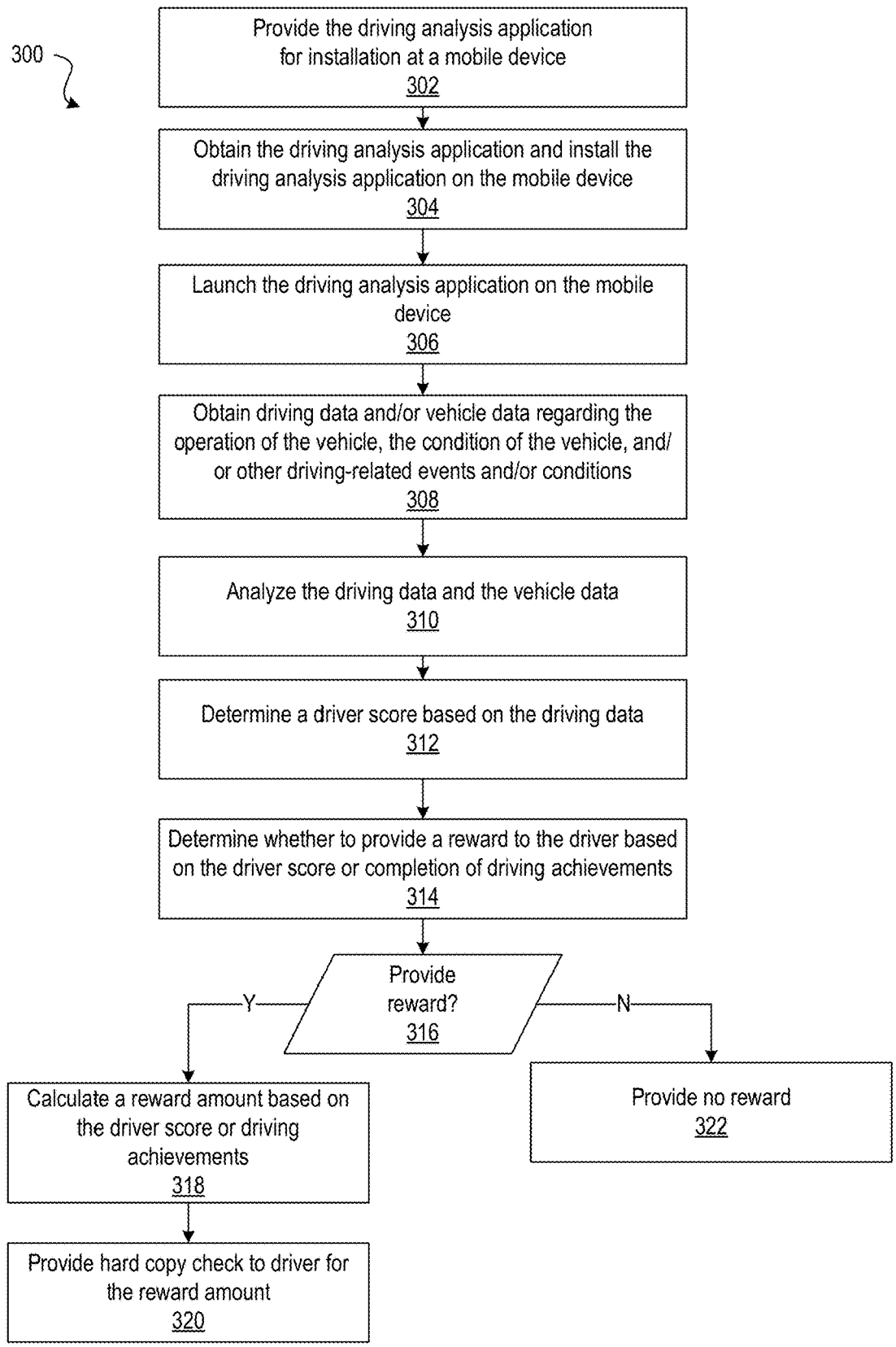
FIG. 3 is a flowchart of example method steps for providing driver rewards.

Referring to FIG. 3, a flowchart 300 of example method steps for analyzing driving data and providing an award based on the driving data is shown. An organization may provide or otherwise make available a driving analysis application configured for installation and operation at a mobile computing device (block 302). A driver may obtain (e.g., download) the driving analysis application and install it on a mobile computing device such as a "smart" mobile telephone (block 304). The user may launch the driving analysis application at the mobile computing device (block 306). As noted above the driving analysis application may launch automatically upon startup of the mobile device and run as a background process.

During vehicle operation driving data may be obtained, collected, compiled, etc. relating to the operation of the vehicle, the condition of the vehicle, the condition of the driving environment, and/or data relating to other driving events and/or conditions (block 308). As noted above, the driving data may be obtained by the driving analysis application at the mobile computing device, by a telematics device installed at or attached to the vehicle, and/or by various sensors and cameras installed at, attached to, and/or remotely located relative to the vehicle. The driving data may be collected at a central location (e.g., the driving analysis application at the mobile device or a vehicle operation computer system) and subsequently provided to a driving analysis and reward system.

The driving analysis and reward system may analyze the driving data (block 310) and determine a driver score based on the driving data (block 312). The driving analysis and reward system may determine whether to provide a driver reward to the driver based on the driver score or based on successful completion of driving achievements (block 314). If the driving analysis and reward system determines to provide a driver reward (block 316:Y), the driving analysis and reward system may calculate a reward amount based on the driver score or the completed driving achievements (block 318). The driver reward may be a cash reward, and the driving analysis and reward system may issue a check (e.g., a hard copy check or an electronic check) to the driver for the amount of cash (block 320). If the driving analysis and reward system determines not to provide a driver reward (block 316:N), then no reward may be provided (block 322), for example, the driver score does not exceed a score threshold.

4. Driving Analysis Application

Figure 4:
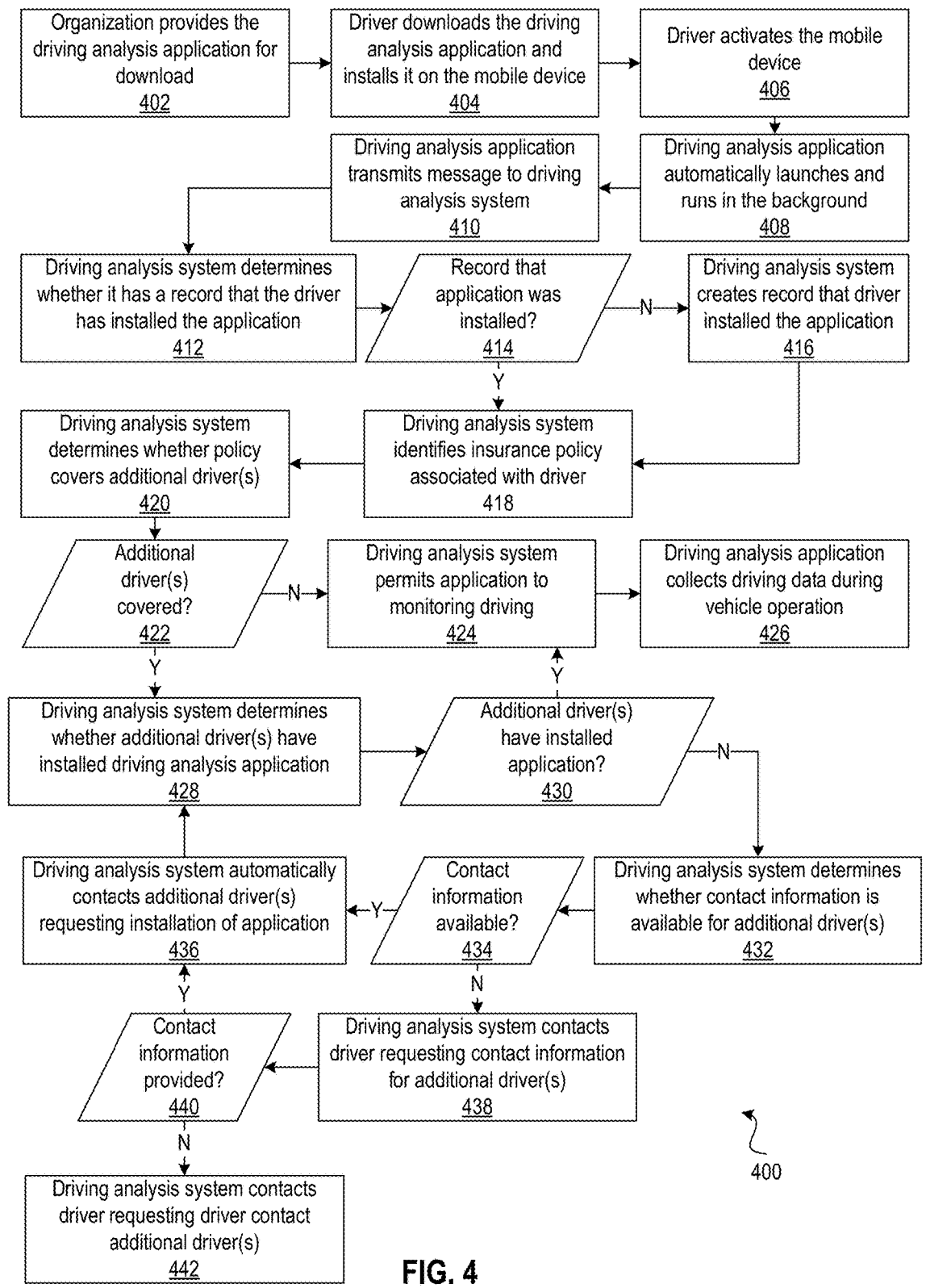
FIG. 4 is a flowchart of example method steps for obtaining a driving analysis application configured for operation at a mobile computing device.

Referring to FIG. 4, a flowchart 400 of example method steps for obtaining a driving analysis application configured for operation at a mobile computing device is shown. The example steps set forth below may be performed to ensure that each individual named on an insurance policy has equipped their respective mobile computing device with a driving analysis application before the driving analysis application may be used to monitor trips and collect trip-related data. As noted above, an organization may make a driving analysis application available for download (block 402), which a driver may obtain and install at a mobile device (block 404). Upon activation of the mobile device (block 406) the driving analysis application may automatically launch and run at the mobile computing device (block 408), e.g., in the background as a background process.

The driving analysis application may be configured to transmit a message to the driving analysis and reward system upon launch indicating that the driving analysis application is executing at the mobile computing device (block 410). The message may also include information identifying the driver (e.g., name, mobile phone number, customer number, etc.) In response to receipt of the message, the driving analysis and reward system may determine whether an installation record exists for the driver indicating that the driver has installed the application (block 412). If an installation record for the driver does not exist (block 414:N), then the driving analysis and reward system may create a record indicating that the driver has installed the driving analysis application at the mobile device (block 416). Once an installation record for the driver exists (block 414:Y), then the driving analysis and reward system may identify an insurance policy that provides insurance coverage for the driver (block 418). The driving analysis and reward system may identify an insurance policy associated with the driver based on the identifying information included in the message received from the driving analysis application.

Having identified an insurance policy associated with the driver, the driving analysis and reward system may determine whether the insurance policy provides insurance coverage for additional individuals (block 420). If the insurance policy does not cover additional drivers (block 422:N), then the driving analysis and reward system may permit the driving analysis application to monitor operation of a vehicle when driven (block 424). For example, the driving analysis and reward system may transmit a message to the driving analysis application indicating the application is authorized to monitor operation of a vehicle, and the driving analysis application may collect vehicle data during vehicle operation (block 426).

If the driving analysis and reward system determines that the insurance policy covers additional drivers (block 422:Y), then the driving analysis and reward system may determine whether each additional driver has installed the driving analysis application at a respective mobile computing device (block 428). The driving analysis and reward system may similarly determine whether installation records exist for the additional drivers. If the driving analysis and reward system determines that the additional drivers have installed the driving analysis application (block 430:Y), e.g., if installation records exist for the additional drivers, then the driving analysis and reward system may permit the driving analysis application to monitor operation of the vehicle (block 424).

If the driving analysis and reward system determines that one or more of the additional drivers have not installed the driving analysis application (block 430:N), i.e., if installation records do not exist for the additional drivers, then the driving analysis and reward system may determine whether contact information is available for the additional drivers (block 432). The driving analysis and reward system may query the customer database for the contact information of the additional drivers. If the contact information for the additional drivers is available (block 434:Y), then the driving analysis and reward system may automatically contact the additional drivers (block 436), e.g., via email, text message, etc., and request that the additional drivers install the driving analysis application at their mobile device (block 436). The driving analysis and reward system may, for example, provide a link to a location where the driving analysis application may be obtained.

If the contact information for the additional drivers is not available (block 434:N), then the driving analysis and reward system may contact the initial driver requesting that the initial driver provide the contact information (e.g., email address, phone number) to the driving analysis and reward system (block 438). If the driver provides the contact information for the additional drivers (block 440:Y), then the driving analysis application may automatically contact the additional drivers as described above (block 436). If the driver does not provide the contact information for the additional drivers (block 440:N), then the driving analysis and reward system may request that the driver contact the additional drivers and ask the additional drivers to install the driving analysis application (block 442).

Figure 5:
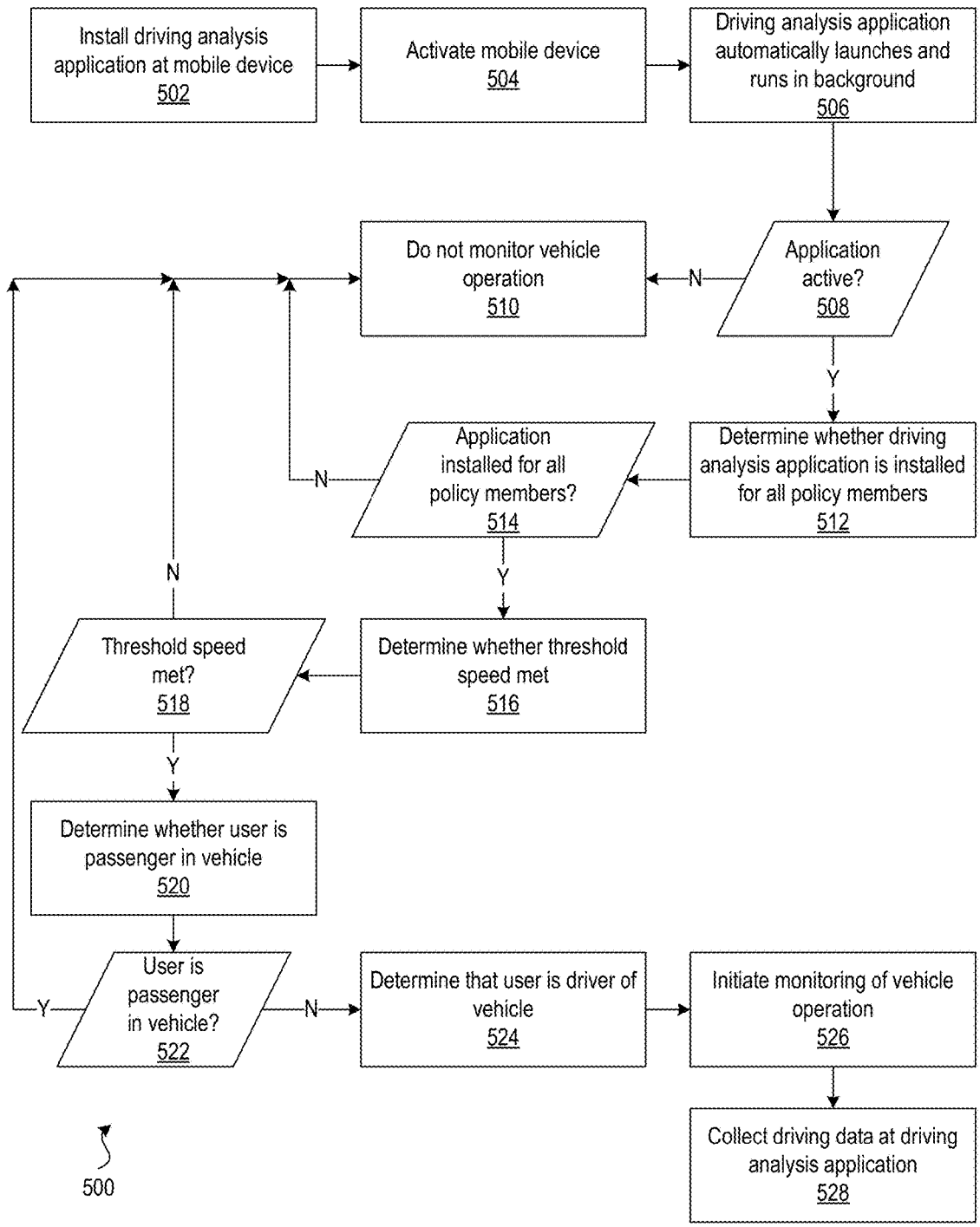
FIG. 5 is a flowchart of example method steps for launching the driver reward application at the mobile computing device.

Referring to FIG. 5, a flowchart 500 of example method steps for launching the driver reward application at a mobile computing device is shown. As described above the driving analysis application may be installed (block 502), the mobile computing device may be activated (block 504), and the driving analysis application may be launched at the mobile computing device (block 506). A user may provide input toggling activation of the driving analysis application. If the driving analysis application is not active at the mobile computing device (block 508:N), then operation of the vehicle may not be monitored with the driving analysis application (block 510).

If the driving analysis application is active (block 508:Y), the driving analysis application may determine whether an insurance policy covers additional drivers (block 512) and whether those additional drivers have installed the driving analysis application as discussed above. If the additional drivers have not installed the driving analysis application (block 514:N), then the driving analysis application may not monitor vehicle operation (block 510) as described above for some example implementations. If the additional drivers have installed the driving analysis application (block 514:Y), the driving analysis application may determine whether a speed threshold has been met (block 516), e.g., 20 mph. If a threshold speed has not been met (block 518:N), then the driving analysis application may determine that the user is not traveling in a vehicle and may not monitor vehicle operation (block 510).

If the threshold speed has been met (block 518:Y), then the driving analysis application may determine that the user is traveling in a vehicle but may determine whether the user is a passenger in a vehicle (block 520). The driving analysis application may determine whether the user is a passenger in a vehicle based, e.g., on information provided by sensors and cameras at the vehicle indicating the location of the mobile device within the vehicle. If the driving analysis application determines that the user is a passenger in the vehicle (block 522:Y), the driving analysis application may not monitor vehicle operation (block 510). If the driving analysis application determines that the user is not a passenger in the vehicle (block 522:N), then the driving analysis application may determine that the user is driving the vehicle (block 524) and initiate monitoring of the vehicle (block 526). The driving analysis application may collect driving data during operation of the vehicle (block 528) as discussed above.

5. Driving Analysis and Scoring

Figure 6:
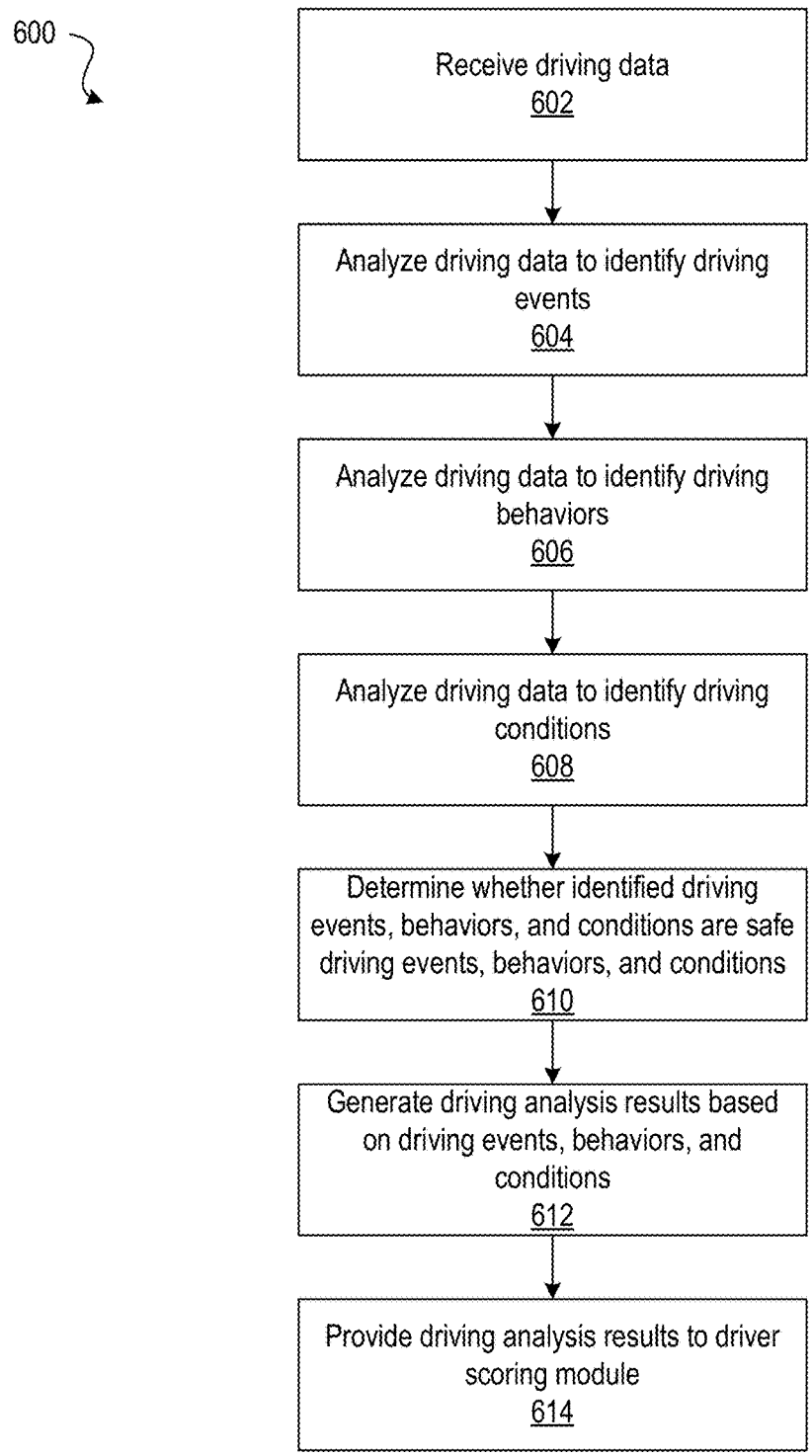
FIG. 6 is a flowchart of example method steps for analyzing driving data.

Referring to FIG. 6, a flowchart 600 of example method steps for analyzing driving data is shown. Driving data may be obtained during operation of the vehicle, and the driving analysis module may receive driving data (block 602) from, e.g., a driving analysis application at a mobile computing device, the telematics device at the vehicle, the vehicle operation computer system, and/or one or more remote systems as described above. The driving analysis module may analyze the driving data to identify one or more driving events (block 604), to identify one or more driving behaviors (block 606), and/or to identify one or more driving conditions (block 608) as described above. The driving analysis module may also determine whether the driving events, behaviors, and conditions are safe driving events, behaviors, and conditions (block 610). The driving analysis module may generate driving analysis results based on the driving events, behaviors, and conditions (block 612), and then provide the driving analysis results to the driver scoring module (block 614).

Figure 7:
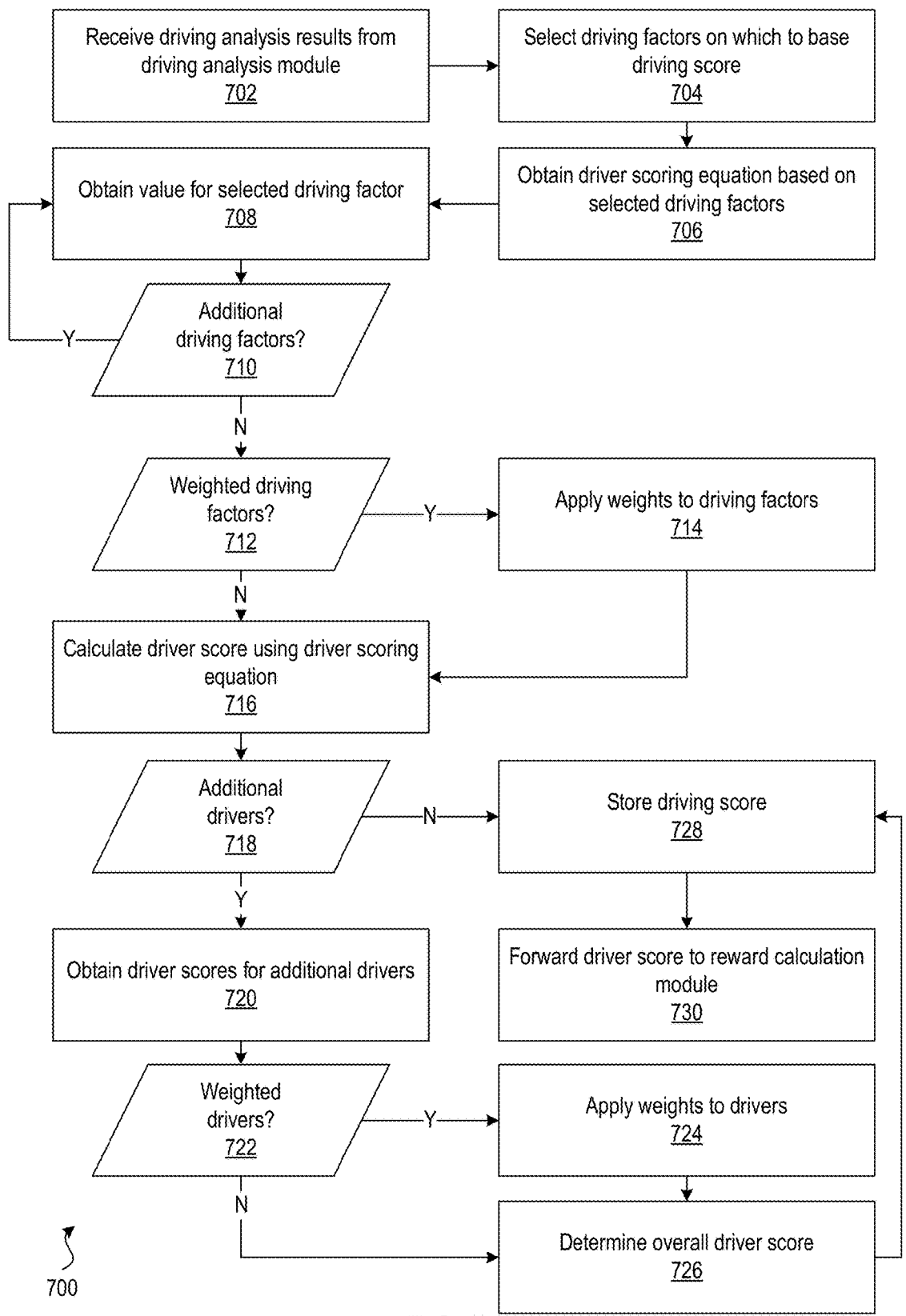
FIG. 7 is a flowchart of example method steps for determining a driver score.

Referring to FIG. 7, a flowchart 700 of example method steps for determining a driver score is shown. The driver scoring module may receive the driving analysis results from the driving analysis module (block 702). The driver scoring module may select a set of driving factors upon which to base the driver score (block 704). As described above, some driving factors may be more relevant to the driving analysis results than others. Accordingly, the set of driving factors used to determine the driver score may be based on the driving analysis results received. In other instances, a uniform set of driving factors may be employed to determine the driving score.

The driver scoring module may obtain a driving equation that includes the selected driving factors (block 706). As described above, the driving equation may, in some examples, vary between driving scores depending on which driving factors are selected. In other examples, a uniform driving equation using the same set of driving factors may be employed to determine the driving score. The driver scoring module may obtain the value for a selected driving factor to include in the driver scoring equation (block 708). If there are additional factors in the driver scoring equation (block 710:Y), then the driver scoring module may select the respective values for those driving factors as well (block 708). If there are no additional driving factor values to obtain (block 710:N), the driving scoring module may determine whether the driving scoring equation uses weighted driving factors. If the selected driving equation utilizes weights for the driving factors (block 712:Y), then the driver scoring module may apply the respective weights to the driving factors in the driving equation (block 714). As noted above, however, some example driver scoring equations that may be employed may not utilize weights for the driving factors (block 712:N).

The driver scoring module may calculate a driver score using the selected driver scoring equation (block 716). If the insurance policy associated with the driver covers additional drivers (block 718:Y), then the driver scoring module may obtain driver scores for the additional drivers (block 720). If the driver scoring module uses weighted drivers (block 722:Y), the driver scoring module may apply respective weights to the driver scores for each driver (block 724). As noted above, however, the drivers may not be weighted (block 722:N), and the driver scores for those drivers may contribute to the overall driver score. The driver scoring module may then obtain an overall driver score using the individual driver scores for the drivers and the respective weights associated with the driver scores (block 726). As described above, the driver scoring module may average the individual driver scores in order to obtain the overall driver score. Having obtained the driver score, the driver scoring module may store the driver score (block 728) in one of the data repositories of the data analysis system and associate the driver score with the drivers and/or the insurance policy. The driver scoring module may then forward the driver score to the reward calculation module (block 730), and the reward calculation module may determine whether to issue a driver reward.

6. Driver Rewards

Figure 8:
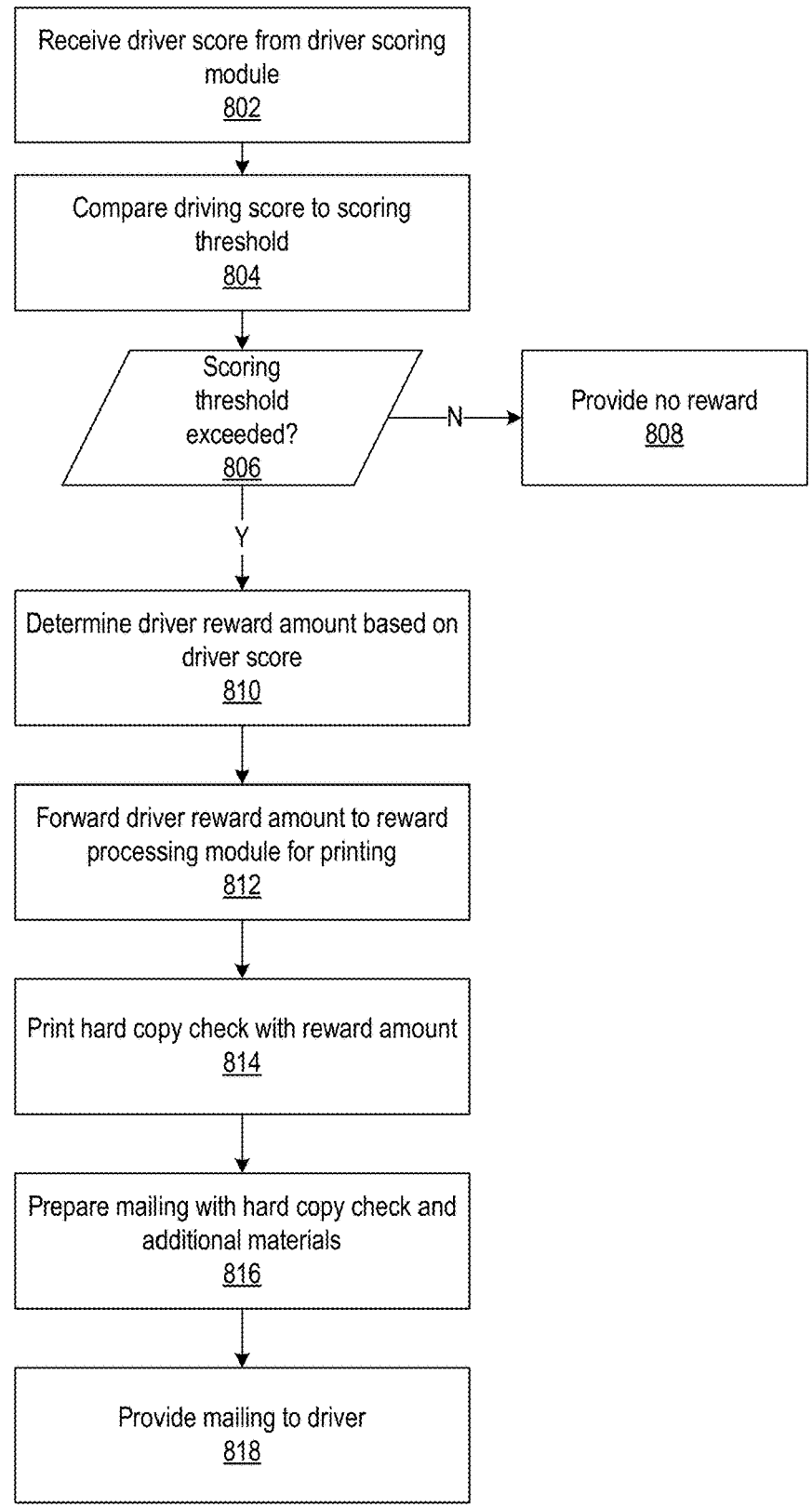
FIG. 8 is a flowchart of example method steps for calculating and processing a driver reward.

Referring to FIG. 8, a flowchart 800 of example method steps for determining a driver reward based on the driver score is shown. The reward calculation module may receive a driver score to initiate the process of determining whether to issue a driver award and, if so, the amount of the driver reward. The reward calculation module may receive the driver score from the driver scoring module (block 802) or retrieve a stored driver reward from one of the data repositories of the driving analysis and reward system. The reward calculation module may compare the driver score to a scoring threshold (block 804). If the driver score does not exceed the scoring threshold (block 806:N), then the reward calculation module may determine not to issue a driver reward (block 808).

If the driver score does exceed the scoring threshold (block 806:Y), the reward calculation module may determine an reward amount for the driver reward (block 810). As described above, the driver reward may depend on the driver score such that higher driver scores result in higher reward amounts. Having determined the reward amount, the reward calculation module may forward the reward amount to the reward processing system (block 812). As noted above, the driving analysis and reward system may provide the driver reward as a hard copy check or an electronic check (block 814). The reward processing module may utilize a printing system to print the hard copy check (block 816) and prepare a mailing for the driver (block 818). As noted above, the driving analysis and reward system may include additional materials in the mailing along with the hard copy check. The reward system may thus issue the mailing to the driver thereby completing the reward process.

Figure 9:
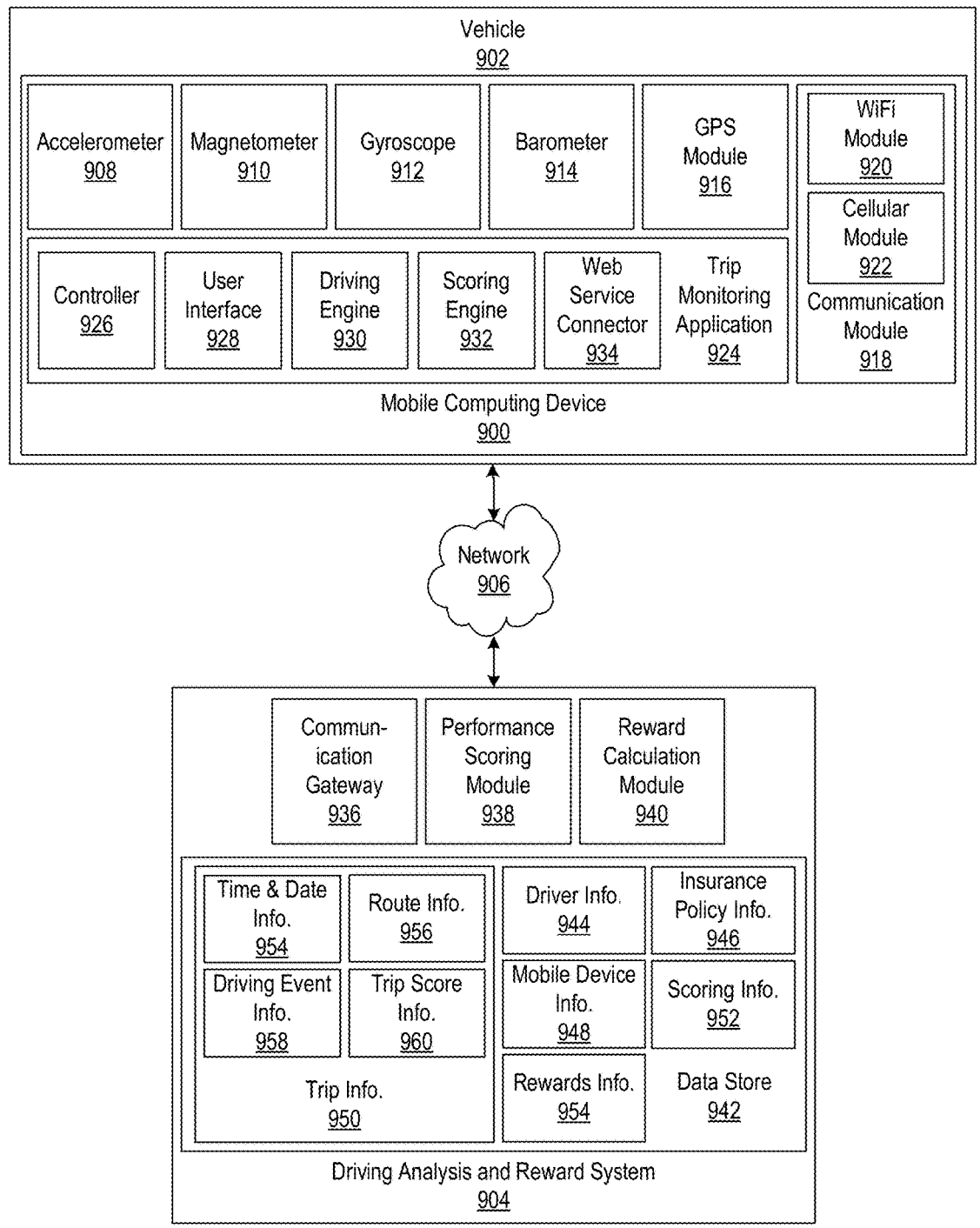
FIG. 9 is an example of an alternative implementation of a driving analysis and reward system.

7. Detecting Driving Behaviors at a Mobile Device and Providing Driving Performance Rewards As noted above, a trip monitoring device may be a mobile computing device such as a mobile cellular telephone or a tablet computing device that is configured to collect driving behavior data during a trip. FIG. 9 illustrates an example of an implementation in which driving behaviors are detected at a mobile computing device rather than at a telematics device installed in or connected to a vehicle. A user may carry a mobile computing device 900 such as, e.g., a mobile cellular telephone, a palmtop computing device, or a tablet computing device while traveling in a vehicle 902. The mobile computing device 900 may be in signal communication with a driving analysis and reward system 904 via a network 906. The network 906 may be, for example, a wired network such as the Internet, a wireless network such as a cellular network, or a combination of wired and wireless networks.

The mobile computing device 900 may include various modules used to collect information while the user operates the vehicle 902 during a trip and to communicate with the driving analysis and reward system 904. The mobile computing device 900 shown by way of example in FIG. 9 includes an accelerometer 908, a magnetometer 910, a gyroscope 912, a barometer 914, a GPS module 916, and a communication module 918. The communication module 918 may include a WiFi module for wirelessly communicating over an IP-based network using the 802.11 protocol and a cellular module 922 for communicating over a cellular network. The mobile communication device may also be configured with a trip monitoring application 924. The trip monitoring application 924 may be similar to the driving analysis application 220 described above with reference to FIG. 2. As described in further detail below, the trip monitoring application 924 may be configured to: detect when a trip has started and stopped; collect information from the various modules 908-916 during the trip; process the collected information to derive additional information about the trip; determine trip-related scores for the trip; transmit the collected information to the driving analysis and reward system 904, receive trip-related information from the driving analysis and reward system; selectively present portions of the trip-related information in response to receipt of user selections; and toggle the trip detection mode based on various criteria.

By using a mobile computing device 900 to collect the trip information for a trip, the driving analysis and reward system 904 may advantageously leverage the hardware already available at mobile computing devices. When using a mobile computing device such as mobile computing device 900, a user may simply need to configure the mobile computing device with a trip monitoring application such as trip monitoring application 924. The trip monitoring application 924 may be uploaded to one or more of the well-known mobile application distribution platforms. Once uploaded a user may connect to the mobile application distribution platform from the mobile computing device 900, download the trip monitoring application 924, and install the trip monitoring application at the mobile computing device. Having downloaded and installed the trip monitoring application 924, the mobile computing device 900 may thus be configured detect and monitor trips taken by the user.

The trip monitoring application 924 may register with an operating system at the mobile computing device 900 to request and receive information from the various modules 908-916. The modules may include sensors and other types of hardware that detect physical changes occurring at or around the mobile computing device 900. The accelerometer 908, magnetometer 910, and gyroscope 912 may be used to determine, for example, changes in acceleration, deceleration, angular momentum, rotation, and orientation during a trip. This information may thus be used to detect when a trip has started and stopped, the speed of the vehicle during a trip, acceleration and deceleration that occur during a trip, turns that occur during the trip, and so forth. This information may also be used to determine the magnitude of acceleration, deceleration, and turns that occur during the trip. The barometer 914 may be used to detect changes in pressure that occur in the environment surrounding the mobile computing device 900. Information from the barometer 914 may thus be used to determine that a trip has begun based on the change in pressure that occurs when a user enters a vehicle and closes the door. The GPS module 916 may monitor the location of the mobile computing device 900 during a trip by collecting location coordinates (e.g., latitude and longitude coordinates) throughout the trip. Information from the GPS module 916 may thus be used to determine the route taken by the driver during the trip as well as the speed throughout the trip, e.g., based on the distance between two points along the route and the time at which the driver was at those points.

The trip monitoring application 924 may receive information from the modules 908-916 throughout the duration of the trip. The trip monitoring application 924 may transmit the information to the driving analysis and reward system 904 via the communication module 918. The trip monitoring application 924 may transmit the information as it is received from the modules 908-916, may transmit the information periodically at regular intervals throughout the trip, or may cache the information at the mobile computing device 900 and transmit the information once the trip is complete. For example, the trip monitoring application 924 may be configured to determine whether a data connection is available to upload the trip information to the driving analysis and reward system 904. If a data connection is not available, the trip monitoring application 924 may add the trip information to a queue trip information waiting to be uploaded. Once a data connection becomes available, the trip monitoring application 924 may upload the individual sets of trip information one-at-a-time to the driving analysis and reward system 904.

The trip monitoring application 924 may include various modules 926-934 that facilitate trip monitoring, the collection of trip-related information, scoring trips, and presenting trip-related information at the mobile computing device 900. The example mobile computing device 900 shown by way of example in FIG. 9 includes: a controller 926; a user interface 928; a driving engine 930; a scoring engine 932; and a web service connector 934.

The controller 926 may be configured to manage the other modules and invokes the functionality of those modules when appropriate to carry out the various tasks associated with monitoring trips, scoring trips, and presenting trip-related information at the mobile computing device 900. The controller 926 may also be configured to manage communications to and from the trip monitoring application 924 via the network 906. The controller 926 may additionally be configured to automatically toggle the trip detection mode of the trip monitoring application 924 based on various criteria which will be discussed in further detail below.

The user interface 928 may include a collection of interface screens that allow a user to view and browse trip-related information at the trip monitoring application 924 on the mobile computing device 900. Examples of interface screens of the user interface 928 include an "activation" screen, a "trip in progress" screen, a "recent trips" screen, a "trip detail" screen, a "trip history" screen, a "performance" screen, and various details screens respectively relating to various driving performance metrics. These example screens will be discussed in further detail below. The screens of the user interface 928 may include user interface elements that are configured to display trip-related information to the user as well as user interface elements configured to receive selections from the user. Through the user interface 928, a user may, for example, select a previous trip taken by the user in order to view the trip details for the selected trip as well as select a driving performance metric to view details for the selected driving performance metric. Additional examples will be appreciated with the benefit of this disclosure.

The driving engine 930 may perform the trip detection and trip monitoring by communicating with the various modules of the mobile computing device 900, e.g., the accelerometer 908, the GPS module 916, and so forth. The driving engine 930 may process and analyze the information collected from the modules to derive additional trip information. The driving engine 930 may also retrieve and utilize configurable parameters related to driving performance, e.g., a speed threshold for trip initiation, a minimum distance for trip qualification, a minimum duration for trip qualification, "snooze" and "sleep" time periods, a minimum battery percentage threshold for initiating the trip monitoring feature, a minimum battery percentage threshold for interrupting a trip, a speed threshold for identifying speed violations, braking and acceleration thresholds for recording braking and acceleration events, time of day risk bands, and so forth.

The driving engine 930 may be configured to determine when a trip has started. The driving engine 930 may attempt to determine whether a trip has started when the trip detection feature is active. As described in further detail below, the controller 926 may toggle activation of the trip detection feature in certain situations. As described above various approaches may be employed to determine that a trip has started. In one example approach, the driving engine 930 may determine that a trip has started when an observed speed exceeds a predetermined speed threshold. The speed threshold for determining that a trip has begun may range from about 10 mph to about 30 mph and in some example implementations may be about 15 mph, 20 mph, or 25 mph. When the driving engine 930 determines that a trip has begun, the driving engine 930 may initiate monitoring of the trip as described above. In some example implementations, the driving engine 930 may be configured to determine that the user is traveling in a high-speed train or an airplane if the observed speed exceeds a maximum speed threshold. The maximum speed threshold may range from about 120-250 mph, and in some example implementations may be 150 about mph, 175 mph, 200 mph, or 225 mph. If the driving engine 930 determines the currently observed speed exceeds the maximum speed threshold, then the driving engine may refrain from initiating or cancel trip monitoring.

The driving engine 930 and the controller 926 may also be configured to automatically termination trip monitoring if various trip monitoring conditions are satisfied. Trip termination conditions include: the battery percentage of the mobile computing device 900 drops below a battery percentage threshold; location services are disabled at the mobile computing device; the user force closes the trip monitoring application 924; the observed speed remains below a minimum speed threshold (e.g., 10 mph, 15 mph, 20 mph, or 25 mph) for a predetermined duration (e.g., 10 min., 15 min., 20 min., or 25 min.); the observed speed exceeds a maximum speed threshold; the distance between successive GPS points is above a predetermined distance threshold (e.g., 5 mi., 10 mi., 15 mi., 20 mi., or 25 mi.); the local system time is changed at the mobile computing device; the available memory at the mobile computing device drops below a memory threshold (e.g., 5 MB, 10 MB, 15 MB, 25 MB, or 30 MB); a GPS update is not received for a predetermined duration; the "snooze" mode is activated at the trip monitoring application; the "sleep" mode is activated at the trip monitoring application; a maximum trip distance is reached; a maximum trip duration is reached; and selection of an "end trip" button at the trip monitoring application. Additional termination criteria will be appreciated with the benefit of this disclosure and selectively employed. If a trip is terminated, the trip information collected up to the point of termination may be used to determine whether the trip satisfies the trip qualification criteria. If a terminated trip satisfies the set of trip qualification criteria, then the trip information may nonetheless be saved at the mobile computing device 900, uploaded to the data analysis system 904, and used to determine performance rewards.

In order to preserve the battery life of the mobile computing device 900, the controller 926 of the trip monitoring application 924 may be configured to deactivate the trip detection feature of the trip monitoring application. The driving engine 930 may also be configured to terminate monitoring of a current trip if the battery percentage of the mobile computing device 900 drops below the battery percentage threshold. The battery percentage threshold may range from about 20-30% and in some example implementations be about 22%, 24%, 26%, or 28%. Stated differently, the trip monitoring application 924 may utilize a minimum battery level to detect and start monitoring a trip. The controller 926 may periodically check the battery level of the mobile computing device 900 to determine whether the battery percentage has risen above the battery percentage threshold. The controller 926 may keep the trip detection feature deactivated while the battery level of the mobile computing device 900 remains below the battery percentage threshold. Once the battery percentage of the mobile computing device 900 rises above the battery percentage threshold, however, the controller may reactivate the trip detection feature such that the driving engine 930 may initiate trip monitoring if a new trip is determined to have begun.

The driving engine 930 may be configured to process and analyze the information respectively collected from the various modules 908-916 of the mobile computing device 900 in order to identify various types of driving events that occurred during a trip. Driving events may include, for example, speeding events, acceleration events, and braking events. A speeding event refers to an instance during a trip in which the vehicle speed exceeded a speed threshold, e.g., 80 mph. For speeding events, the driving engine 930 may be configured to determine the number of miles traveled during the speeding event. The threshold for a speeding event may be a configurable parameter at the trip monitoring application 924. An acceleration event refers to an instance during a trip in which the vehicle acceleration exceeded an acceleration threshold. A braking event refers to an instance during a trip in which vehicle deceleration exceeded a deceleration threshold. The driving engine 930 may also be configured to process acceleration data and positioning data to count the number of speeding events, acceleration events, and braking events that occurred during the trip. The driving engine 930 may utilize multiple acceleration and deceleration thresholds to define multiple acceleration and deceleration bands. The count of acceleration and braking events may thus include individual counts of acceleration and braking events in each of the acceleration and deceleration bands. Acceleration bands and deceleration bands may include, for example: 7.1-8.0 mph/s, 8.1-9.0 mph/s, 9.1-10.0 mph/s, 10.1-17 mph/s, 17+ mph/s. The acceleration and deceleration bands may also be configurable parameters at the trip monitoring application 924.

In some example implementations, the driving engine 930 may be configured to employ acceleration and deceleration thresholds for registering and recording acceleration and braking events. The acceleration threshold for recording an acceleration event may range from about 1-5 meters/second ($m/s^2$), and in some example implementations may be 2 $m/s^2$, 3 $m/s^2$, or 4 $m/s^2$. The deceleration threshold for recording a braking event may similarly range from about $-1$ to $-5$ $m/s^2$ and in some example implementations may be about $-2$ $m/s^2$, $-3$ $m/s^2$, or $-4$ $m/s^2$. The acceleration and deceleration threshold used to determine whether to record an acceleration or deceleration event may also be configurable parameters at the trip monitoring application. In addition, the trip monitoring application may be configured to only record the most severe braking or acceleration event that occurs in a 10 second timeframe.

In some example implementations, the driving engine 930 may use information received from the accelerometer in order to detect driving events such as acceleration events, braking events, and cornering events. In other example implementations, the GPS module 916 may be configured to detect and determine the acceleration, braking, and driving events. The GPS module 916 may thus include information about such driving events to the trip monitoring application 924. Accordingly the driving engine 930, in some example implementations, may determine whether various types of driving events occurred during a trip based on the information received from the GPS module.

The driving engine 930 may further be configured to derive other types of trip-related information including: a date of trip; a trip start time; a trip end time; a trip duration; a maximum speed during the trip; an average speed during the trip; total idle time during the trip (e.g., where vehicle speed is 0 mph); a trip start location; a trip end location; and the total number of miles traveled. The trip monitoring application 924 may also defines various time-of-day bands, and the driving engine 930 may be further configured to determine what portion of a trip occurred in each time-of-day band, e.g., the total number of miles traveled in each time-of-day band. Example time-of-day bands include: i) weekends between 5:00 AM and 11:00 PM; ii) weekdays between 4:00 AM and 12:00 PM; iii) weekdays between 12:00 PM and 11:00 PM; iv) weekdays between 11:00 PM and 4:00 AM; and v) weekends between 11:00 PM and 5:00 AM. The time-of-day bands may likewise be configurable parameters at the trip monitoring application 924.

The driving engine 930 may write the trip-related information collected and derived for a trip to a data store at the mobile computing device 900, e.g., as one or more flat files. For each trip taken by the user, the driving engine 930 may, for example, create a folder at a data store of the mobile computing device 900 where the folder contains the trip-related information. The name of the folder may include a prefix (e.g., "DW"), a timestamp of when the trip began (e.g., year, month, day, hour, minute, seconds), a unique identifier for the user, and a sequence number. The driving engine 930 may store the trip-related information in the folder as separate text files (e.g., using .txt file extension). The text files may have a REST/JSON or CSV format, and each file may correspond to a particular aspect of the trip. For example the driving engine 930 may create a separate text file may GPS information, acceleration information, and trip summary information. Because GPS and acceleration information may continue to accumulate during the trip, the driving engine 930 may create multiple GPS or acceleration files if a file size of a file exceeds a predetermined size threshold (e.g., 2 megabytes). The GPS and acceleration files may following a similar naming convention as the folder. A GPS filename may include, for example, a prefix (e.g., "GPS"), a timestamp, a unique user identifier, a sequence number, and an index number that increments if additional GPS files are created. The GPS file may store the following GPS information: timestamp, altitude, course, horizontal accuracy, latitude, longitude, raw speed, vehicle speed in mph, vertical accuracy, a braking flag, and a speeding flag. The acceleration filename may similarly include a prefix (e.g., "Acc"), a timestamp, a unique user identifier, a sequence number, and an index number that increments if additional acceleration files are created. The acceleration file may include the following information: a timestamp, an x-coordinate value, a y-coordinate value, and a z-coordinate value. The driving engine 930 may utilize individual file handlers configured to respectively handle the write operations for trip information, GPS information, and acceleration information. The files created for a trip may also be compressed and archived as a single archive file (e.g., using the .zip file extension) once the trip is complete. The trip monitoring application 924 may thus also utilize a file compressor (not shown) to compress the files for a trip. The trip monitoring application 924 may thus utilize a file uploader (not shown) to upload the archive of compressed files for a trip to the driving analysis and reward system 904, e.g., via an FTP server (not shown) of the driving analysis and reward system.

In some example implementations, the driving engine 930 may be configured to determine whether a trip satisfies a set of trip qualification criteria. In these example implementations, the driving engine 930 may not store or upload the information related to the trip if the trip does not satisfy the set of trip qualification criteria. Trip qualification criteria may include, for example, a minimum trip distance and a minimum trip duration. The minimum trip distance for trip qualification may range from about 100-1000 meters (m), and in some example implementations may be about 100 m, 200 m, 300 m, 400 m, or 500 m. The minimum duration for trip qualification may range from about 1-10 minutes (min.), and in some example implementations may be about 1 min., 2 min., 3 min., 4 min., or 5 min. The minimum trip distance and minimum trip duration may also be configurable parameters at the trip monitoring application 924.

The driving engine 930 may also be configured to determine whether a trip has reached a maximum trip duration or a maximum trip distance. If the driving engine 930 determines that the maximum trip distance or maximum trip duration has been reached, then the driving engine may cease collection of trip information for the trip or exclude any trip information collected beyond the maximum trip distance or duration from the trip information stored and uploaded for the trip. The maximum trip distance may range from about 100-1000 miles (mi.), and in some example implementations may be about 100 mi., 200 mi., 300 mi., 400 mi., or 500 mi. The maximum duration for trip qualification may range from about 90-300 min., and in some example implementations may be about 90 min., 120 min., 150 min., or 180 min. The maximum trip distance and maximum trip duration may also be configurable parameters at the trip monitoring application 924.

The trip monitoring application 924 shown by way of example in FIG. 9 is configured to determine a score for a completed trip. Accordingly the trip monitoring application 924, in this example, includes a scoring engine 932. It will be appreciated, however, that in some example implementations the driving analysis and reward system 904 may be configured to score a trip and determine the various trip scores for the trip using the example approaches described below. The scoring engine 932 may be configured to determine an overall trip score and individual scores for multiple driving performance metrics. The driving performance metrics include braking, time-of-day, and speed. The scoring engine 932 may determine the overall and individuals scores based on the trip data. The braking score may be based on the total number of "hard" deceleration events (e.g., braking events associated with deceleration of 8.0-10 mph/s) and the total number of "extreme" braking events (e.g., braking events associated with deceleration of 10+ mph/s). The time-of-day score may be based on the time-of-day band the trip occurred in. The speed score may be based on the total number of miles traveled at or above a speed threshold, e.g., 80 mph. The overall trip score may be based on the individual scores for the driving performance metrics. For example, the overall trip score may be an average or weighted average of the individual scores for the driving performance metrics. The scoring engine 932 may be configured to utilize respective weights for the individual scores of the driving performance metrics, and such weights may be configurable at the scoring engine. The scoring engine 932 may be configured to determine the trip scores in response to a determination that a trip is complete. The trip information may be provided as input to the scoring engine 932, and the scoring engine may provide a set of scores as output in response. The scoring engine 932 may determine a numerical score which may then be mapped to a letter grade.

The scoring engine 932 may be configured to aggregate individual scores for various driving performance metrics in order to determine an overall trip score for the trip. Aggregating multiple scores to obtain an aggregate score may include determining an average of the multiple scores (e.g., the arithmetic mean) or a weighted average of the multiple scores. The trip score may be based on various aggregations of individual scores of driving performance metrics, e.g., the number of speeding events during the trip, the number of miles traveled during the speeding events, the total number of various types of acceleration events during the trip, the total number of various types of braking events during the trip, the total number of miles driven during the trip, the total number of miles driven in each time-of-day band, the number of various types of cornering events during the trip. In one example implementation the trip score may be based on an aggregation of individual scores for i) the total number of miles driven during the trip, ii) the total number of each type of acceleration event during the trip, and iii) the total number of each type of braking event during the trip. In another example implementation, the trip score may be based on an aggregation of individual scores for i) the number of each type of braking event during the trip, ii) the total number of miles driven in each time-of-day band, and iii) the total number of miles driven during speeding events. In a further example implementation, the trip score may be based on an aggregation of i) the total number of miles driven during the trip, ii) the total number of each type of acceleration event during the trip, and iii) the total number of each type of braking event during the trip. Additional and alternative aggregations of individual scores will be appreciated with the benefit of this disclosure and may be selectively employed to determine a trip score for the trip.

In some example implementations, the trip monitoring application 924 may be configured to communicate with the driving analysis and reward system 904 via the network 906 using various web services (not shown). Accordingly the trip monitoring application 924, in this example, includes a web services connector 934. The web services connector 934 manages communications between the trip monitoring application 924 and the various web services. The web services may further utilize and communicate various types of middleware (not shown) during communications between the trip monitoring application 924 and the driving analysis and reward system. Example web services may include: an activation web service; a status check web service; a trip information upload service; a trip history service; and a performance web service.

The trip monitoring application 924 may invoke the activation web service to validate an activation code input by the user. Through the activation web service, the trip monitoring application 924 may provide the activation code to the driving analysis and reward system 904 and in response receive a unique user identifier to in order for subsequent communications. The trip monitoring application 924 may invoke the status check web service to determine the status of the user. Through the status check web service, the trip monitoring application 924 may provide the unique identifier to the backend system and in response receives the status of the user associated with that unique identifier. The trip monitoring application 924 may perform a status check whenever the application launches and at least once every 24 hours in order to ensure the trip monitoring application has the most recent status of the user. The trip monitoring application 924 may invoke the trip information upload web service to upload the trip information collected and derived for a trip taken by the user. Through the trip information upload web service, the trip monitoring application 924 may upload the trip data to a remote storage location. In some example implementations, the remote storage location may be located at a staging area that stores the trip information before it is moved to a data warehouse at the driving analysis and reward system 904. Uploading trip information will be discussed in further detail below.

The trip monitoring application 924 may invoke the trip history service to obtain trip information for trips taken by the user within a specified date range. Through the trip history web service, the trip monitoring application 924 may provide a date range to the driving analysis and reward system 904 and receive in response trip information for trips taken by the user within the specified date range. The trip monitoring application 924 may invoke the trip history service when the trip information for trips within the selected date range is not cached at the mobile computing device 900. The trip monitoring application 924 may invoke the performance web service to obtain the aggregated performance information for the user. Through the performance web service, the trip monitoring application 924 may provide the unique user identifier to the driving analysis and reward system 904 and receive in response aggregated performance information for the user associated with that unique user identifier. The trip monitoring application 924 may invoke the performance web service whenever the user navigates to the "performance" screen of the trip monitoring application and a data connection is available.

The driving analysis and reward system 904 may be similar to the driving analysis and reward system 202 described above in reference to FIG. 2 and thus include similar components, possess similar features, and perform similar operations as that driving analysis and reward system. The driving analysis and reward system 904 shown by way of example in FIG. 9 includes a communication gateway 936, a performance scoring module 938, a reward calculation module 940, and a data store 942. The data store 942 may store information related to drivers, insurance policies for those drivers, trips taken by the drivers, and rewards earned by the drivers. The data store 942 may thus include various one or more databases configured to store information utilized in determining rewards for drivers based on driving behaviors observed during trips taken by those drivers. Information stored at the data store 942 may include, for example: driver information 944; insurance policy information 946; mobile device information 948; trip information 950; scoring information 952; and rewards information 954. The trip information 950 may include information related to trips taken by a driver including, for example: time and date information 954; route information 956; driving event information 958; and trip score information 960. As noted above, driving events may include speeding events, braking events, and acceleration events. Accordingly driving event information 958 may include information for speeding events, braking events, and acceleration events. It will be appreciated that the data store 932 may store additional and alternative types of information associated with monitoring driving performance, determining a driver score based on driving performance, and providing a reward based on the driver score.

The data store 942 may implement one or more data models that define entities and relationships related to drivers, insurance policies, mobile computing devices, trips, and rewards. The data store 942 may store such information in respective database records that are interrelated according to the data models. In some example data models, a driver may be associated with one insurance policy, and an insurance policy may be associated with multiple drivers. A trip may be associated with one driver and a driver may be associated with multiple trips. An individual driving event may be associated with an individual trip, and a trip may be associated with multiple driving events. Multiple individuals named on an insurance policy may thus be associated with each other through their association with the insurance policy. By extension the multiple individuals named on an insurance policy may be associated with the trips taken by the other individuals named on an insurance policy and may be associated with other information related to those individuals, e.g., vehicles associated with those individuals, mobile computing devices associated with those individuals, and other types of information associated with those individuals that will be appreciated with the benefit of this disclosure.

Driver information 944 may include information associated with the individuals registered for the rewards program. In some example implementations, driver information 944 may include: a unique user identifier; the date on which the user completed the first qualifying trip; the effective start and end date of participation in the rewards program; the status of the user; the user type on the insurance policy (e.g., primary, secondary); the first, middle, and last name of the user; an email for the user; a communication preference for the user (e.g., text, email, both); a phone number for the user; a phone type of the user (e.g., OS type or manufacturer); an activation code and corresponding expiration date; a data of birth; and a language preference. User status may be, e.g., "pending," "activated," "enrolled," or "suspended." A "pending" status may indicate the user has signed up for the rewards program but has not yet activated the trip monitoring application 924. An "activated" status may indicate the user has activated the trip monitoring application 924, but has not yet completed a qualifying trip. An "enrolled" status may indicate that the user has completed at least one qualifying trip. A "suspended" status may indicate the user has registered for the rewards program but is not eligible to receive rewards (e.g., if the mobile computing device used to collect trip data is lost, stolen, or damaged and cannot be used to obtain trip information). Additional information associated with the individuals registered for the rewards program will be appreciated with the benefit of this disclosure.

Insurance policy information 946 may include information associated with insurance policies for the drivers. In some example implementations, insurance policy information 946 may include information identifying one or more drivers covered by the insurance policy; effective dates of the insurance policy; and an insurance policy premium. Additional information associated with insurance policies for the drivers will be appreciated with the benefit of this disclosure.

Mobile device information 948 may include information related to the respective mobile computing devices of the drivers having the trip monitoring application 924 and used to obtain the trip information for trips taken by the drivers. In some example implementations, mobile device information 948 may include: a unique device identifier; a device type; a phone number associated with the mobile computing device; an activation code associated with the mobile computing device; an effective start an end date of activation; a device status (e.g., active, inactive, suspended); a device make; a device model; an operating system version; the version of the trip monitoring application 924 installed; a network country; and a device token. Mobile device information 948 may also include information describing the current location of a mobile computing device, for example: latitude and longitude coordinates; a local time zone; a local date; a local time; a network connection type; and a network type. Additional information related to the respective mobile computing devices of the drivers will be appreciated with the benefit of this disclosure.

Trip information 950 may include information related to trips taken by a driver as noted above and include, for example: a unique trip identifier, the battery level of the mobile computing device 900 during the trip; the status of the WiFi module 920 during the trip; the uptime of the mobile computing device during the trip; an average speed for the trip; a maximum speed for the trip; distance covered during the trip; the duration of the trip; total idle time for the trip; the total number of miles driven at or above a speed threshold; the total number of miles traveled in the various time-of-day bands; the total number of speeding, braking, and acceleration events including individual counts of the total number of acceleration and braking events within each of the acceleration and deceleration intervals; a flag indicating whether the trip has been removed; an identifier indicating the reason for trip removal; an identifier indicating the reason for trip termination; and a challenge indicator to indicate whether the driver has disputed the correctness of the trip information. The time and date information 954 may indicate the date a trip was taken; a start time for the trip (e.g., a local start time); an end time for the trip (e.g., a local end time). The route information 956 may include latitude and longitude coordinates for both a starting point and an ending point of the trip. The route information 956 may also include a trail of GPS points collected during the trip, and for each GPS point collected, the route information may include: a timestamp; a latitude position; a longitude position; a speed; and a challenge indicator to indicate whether the driver has challenged the route information. The route information 956 may also include information indicating the type of roads taken during the trip (e.g., surface streets, highways, or freeways), traffic conditions during the trip (e.g., light, medium, or heavy), weather conditions during the trip (e.g., clear, overcast, icy, raining, or snowing), and other types of environmental conditions observed for the trip route (e.g., school zones, construction zones, speed limits, and accidents). The driving event information 958 may include information related to speeding events, acceleration events, and braking events identified for a trip. For each driving event, the driving event information 958 may include, for example: a driving event type identifier, a driving event duration; starting and ending latitude and longitude coordinates for the driving event; a start time and an end time for the driving event; an indicator that indicates which module of the mobile computing device 900 provided the information used to identify the driving event; the GPS signal strength during the event; a speed variation during the driving event; and a challenge indicator to indicate whether the driver has challenged the driving event. Trip score information 960 may include information related to the various scores determined for a trip. In some example implementations, the trip score information 960 may include: a numerical overall trip score and corresponding letter grade; a numerical braking score and corresponding letter grade; a numerical acceleration score and corresponding letter grade; a numerical time-of-day score and corresponding letter grade; and a numerical mileage score and corresponding letter grade. The information collected and derived for a trip may be collectively be referred to as trip summary information. Additional information related to trips taken by a driver will be appreciated with the benefit of this disclosure.

Scoring information 952 may include information utilized to determine trip scores. In some example implementations, the scoring information may include information utilized to determine the individual driving performance metric scores, e.g., the time-of-day score, the braking score, the speed score, and the acceleration score. As noted above the individuals scores for the driving performance metrics may be based on a count of driving events of a particular type, a count of the number of miles driven during a driving event, and so forth. The scoring information 952 may thus include, for example: a minimum value and a maximum value that define a range for the driving performance metric; a factor associated with that range and that is used to calculate the score for that driving performance metric; and a letter grade associated with that factor. As an example, the scoring information 952 may define a first "hard" braking event range as 0-2 hard braking events having an associated factor of 0.1 and having an associated grade of "A," may define a second "hard" braking event range as 3-5 hard braking events having an associated factor of 0.2 and having an associated grade of "B," and may define a third range as 6+ hard braking events having an associated factor of 0.3 and an associated grade of "C." Additional examples will be appreciated with the benefit of this disclosure. The scoring information 952 may also include scoring information related to an overall trip score for a trip and include similar information related to minimum and maximum trip score ranges, factors, and grades. The range values, factors, and grades may be configurable at the driving analysis and reward system 904. Additional and alternative types of information utilized to determine trip scores will be appreciated with the benefit of this disclosure.

Reward information 954 may include information related to rewards earned and potential rewards for an insurance policy. As described in further detail below, rewards may be provided at the insurance policy level or at an individual driver level. Rewards provided at the insurance policy level may be based on a pool of trips respectively taken by each driver on an insurance policy. Reward information may include, for example: a previous reward amount earned for an insurance policy or individual driver; a projected performance score for an insurance policy or individual driver; a date on which the projected performance score was determined; and the total number of trips taken, the total number of miles driven, the total count of each type of braking event, the total count of acceleration events, and the total count of speeding events as of the date the projected performance score was determined. Reward information 954 may also include information utilized to determine a reward amount for an insurance policy or individual driver, e.g., one or more groups associated with various ranges of performance scores, and reward percentages respectively associated with those groups. As described in further detail below, the reward percentage and an insurance premium may be utilized to determine a reward amount for an insurance policy or individual driver. Additional information related to rewards earned or potential rewards will be appreciated with the benefit of this disclosure.

The communication gateway 926 may handle communications to and from the driving analysis and reward system 904. The communication gateway 926 may be configured to distribute the received information to the appropriate modules for storage, processing, or analysis. The communication gateway 926 may, for example, receive the trip information upload from the trip monitoring application 924 via the trip upload web service and direct the uploaded trip information to the date store 942 for storage. The communication gateway 926 may also receive the requests for trip information from the trip monitoring application 924 and provide the responses that include the trip information. The communication gateway 926 may be configured to communicate with the trip monitoring application 924 through the middleware and web services described above. Communications may be in the form of HTTP (HyperText Transfer Protocol) requests and responses.

The performance scoring module 938 may be configured to determine an overall performance score for an insurance policy or an individual driver. As noted above, a reward may be provided at an individual driver level or at an insurance policy level based on the trips taken by each driver on that insurance policy. Accordingly the performance score may be based on the trips taken by an individual driver or based on a pool of trips for one or more drivers on an insurance policy. The performance score for an individual driver or an insurance policy may be based on trips taken during a previous predetermined timeframe, e.g., the previous 6 months, 12 months, 18 months, 24 months, and so forth.

Like trip scores, a performance score may be based on an aggregation of individual scores for driving performance metrics. may be based on various aggregations of individual scores of driving performance metrics for trips taken during the previous timeframe, e.g., the aggregate number of speeding events during the trips, the aggregate number of miles traveled during the speeding events of the trips, the aggregate total number of various types of acceleration events of the trips, the aggregate total number of various types of braking events during the trips, the aggregate total number of miles driven during the trips, the aggregate total number of miles driven in each time-of-day band, the number of various types of cornering events during the trips. In one example implementation the performance score may be based on an aggregation of individual scores for i) the aggregate total number of miles driven for trips taken during the previous timeframe, ii) the aggregate total number of each type of acceleration event for trips taken during the previous timeframe, and iii) the aggregate total number of each type of braking event for trips taken during the previous timeframe. In another example implementation, the performance score may be based on an aggregation of individual scores for i) the aggregate number of each type of braking event for the trips taken during the previous timeframe, ii) the aggregate total number of miles driven in each time-of-day band during the previous timeframe, and iii) the aggregate total number of miles driven during speeding events for trips taken during the previous timeframe. In a further example implementation, the performance score may be based on an aggregation of i) the aggregate total number of miles driven during the trip, ii) the aggregate total number of each type of acceleration event during the trip, and iii) the aggregate total number of each type of braking event during the trip. Additional and alternative aggregations of individual scores will be appreciated with the benefit of this disclosure and may be selectively employed to determine a performance score for trips taken during the previous timeframe.

As described above, the performance scoring module 938 may be configured to aggregate driving scores for an insurance policy based on a pool of trips respectively taken drivers on that insurance policy. In some example implementations, the performance scoring module 938 may be configured to aggregate driving scores based on additional or alternative criteria including, for example: an aggregate driving score for a particular day, week, or month based on the individual driving scores for trips that occurred on that day, week, or month; an aggregate driving metric score for a particular driving performance metric such as braking, mileage, time of day, and speed based on individual driving metric scores of that driving performance metric for a set of trips; and combinations of such. One example of a combination aggregate driving score may be, for example, an aggregate braking score for an insurance policy based on individual braking scores of each driver covered by the insurance policy. Another example of a combination aggregate driving score may be a weekly driving score for an insurance policy based on the individual trip scores for trips taken by each driver covered by the insurance policy during that week. Additional and alternative aggregate driving scores and combination aggregate driving scores will be appreciated with the benefit of this disclosure.

The reward calculation module 940 may calculate rewards for an individual driver or an insurance policy. As noted above, an insurance company may provide the rewards to an individual driver based on the performance score of that individual driver or to an insurance policy based on the aggregate performance scores of multiple drivers covered by the insurance policy. The insurance company may provide rewards at periodic intervals once drivers have registered for the rewards program. In some example implementations, an insurance company may provide a driver with a reward upon enrollment in the rewards program. Enrollment may be defined as successfully completing one qualifying trip, e.g., a trip that exceeds the minimum distance and minimum duration threshold. An enrollment reward may be a percentage of the total insurance policy premium at the time the enrollment reward is calculated. The percentage for the enrollment reward may range between about 1-25% of the insurance premium, and in some example implementations be about 5%, 10%, or 15% of the insurance premium. The reward calculation module 940 may apply the enrollment reward percentage to the insurance premium in order to calculate the enrollment reward amount, e.g., a dollar amount. The insurance company may provide the enrollment reward amount in the form of a check to the primary individual named on the insurance policy.

The reward calculation module 940 may also calculate a performance reward for an individual driver or an insurance policy. As noted above, the performance reward may be based on the performance score for an individual driver or an aggregation of multiple performance scores of the drivers covered by an insurance policy. Performance rewards may be provided at periodic intervals, e.g., every six months following enrollment. The interval at which performance rewards are provided may be referred to as the reward period. The reward calculation module 940 may also be configured to determine if an individual driver or an insurance policy is eligible to receive a performance reward. A driver may not be eligible to receive a performance reward until the driver has enrolled in the rewards program, i.e., has completed at least one qualifying trip. After enrollment in the rewards program, the driver may be then eligible to receive performance rewards if the driver satisfies a set of rewards criteria. The reward calculation module 940 may also be configured to determine whether a driver satisfies the set of rewards criteria. The rewards criteria may, for example, specify that a driver must complete a minimum number of qualifying trips during the current reward period, e.g., about 40, 50, or 60 trips during the previous six months. Additional and alternative reward criteria may be selectively employed to determine whether a driver is eligible to receive a performance reward. In some example implementations, the reward calculation module 940 may use the trips taken in the previous twelve months to determine the performance reward for the current reward period. If twelve months' worth of trips have not yet been accumulated—for instance in the first reward period following enrollment—then the reward calculation module 940 may use trips taken during that first reward period to determine the performance reward for the first reward period.

If an individual driver or at least one driver on an insurance policy is eligible to receive a performance reward, the reward calculation module 940 may calculate a performance reward amount. As noted above an insurance company may provide a performance reward to an individual driver (a driver performance reward) or for an insurance policy (a policy performance reward). A policy performance reward may be based on the qualifying trips taken by each qualifying driver covered by the insurance policy. Accordingly the qualifying trips taken by those qualifying drivers may be pooled to determine an aggregate performance score for the insurance policy as described above with reference to the performance scoring module 938. The policy performance score may, in some example implementations, range from about 100 to 1000. The reward calculation module 940 may be configured to determine which policy group the policy performance score is associated with. As noted above policy groups may correspond to ranges of policy scores in predetermined increments, e.g., increments of fifty. At fifty point increments policy performance scores from 100 to 1000 may result in twenty-nine policy groups: group 1 for a policy score of 100-150, group 2 for a policy score of 151-200, . . . , group 28 for a policy score of 901-950, and group 29 for a policy score of 951-1000. The policy score group may also be associated with a predetermined policy performance reward percent. In some example implementations, the policy performance reward percent may range from about 0% to about 50%, and in some example implementations may be about 0% for policy groups 15-29 and gradually increase about 1-2% between policy group 14 to policy group 1 such that policy group 14 is associated with a reward percent of about 1-2%, policy group 7 is associated with a reward percent of about 11-12%, and policy group 1 is associated with a reward percent of about 29-30%. Additional and alternative reward percentages may be selectively employed. The ranges of policy performance scores for policy groups and the policy performance reward percentages may be configurable parameters at the driving analysis and reward system 904.

The reward calculation module 940 may calculate a performance reward amount using the following formula:

$$P_r = R_{\%} \times (Q_d \div T_d) \times I_p$$

where $P_r$ is the performance reward amount in dollars, $R_{\%}$ is the reward percentage associated with the determined policy group, $Q_d$ is the number of qualifying drivers covered by the insurance policy, $T_d$ is the total number of drivers covered by the insurance policy, and $I_p$ is the insurance premium at the time of issuing the performance reward. As noted above the reward percentage may be based on the policy group, the policy group may be based on the policy performance score, and the policy performance score is based on the aggregated driving performance scores of trips taken by the qualifying drivers covered by the insurance policy.

If a driver on an insurance policy has not accumulated the minimum number of trips to qualify for the current reward period, then the trips taken by that driver during the current reward period may not be included in the trip pool used to determine the policy performance score. Furthermore in some example implementations, the number of trips removed by the user may determine whether the user qualifies for a reward. For example, if the number of trips removed or the percentage of trips removed during the current rewards period exceeds a predetermined threshold, then the user may not qualify for a reward for that rewards period.

Figure 10B:
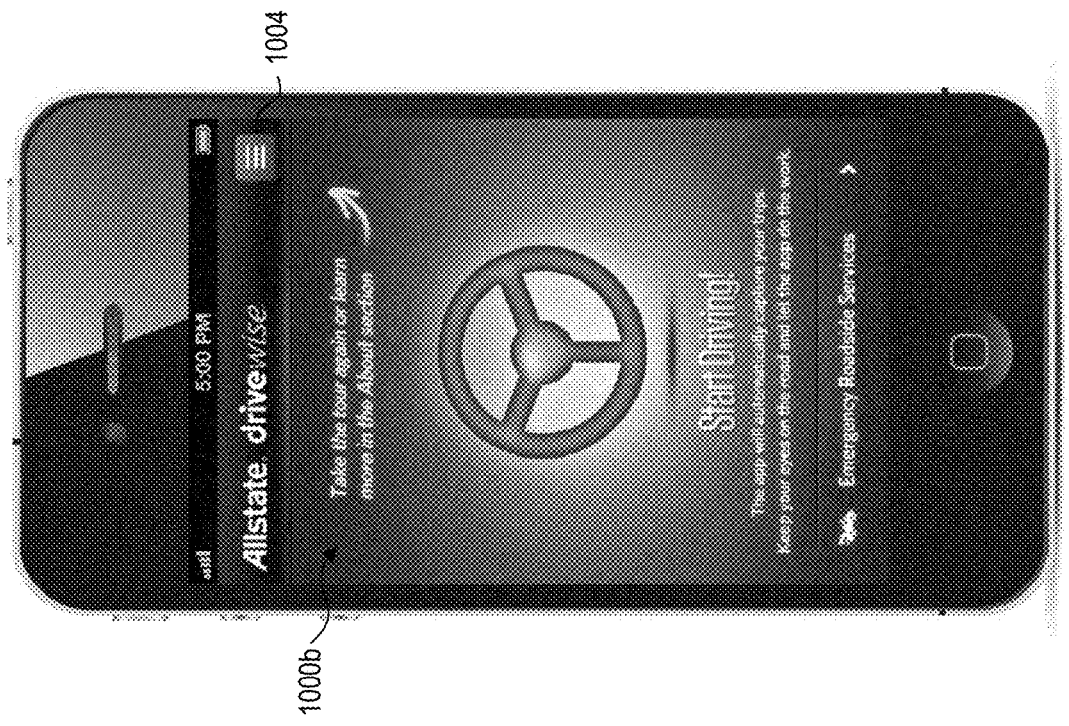
FIGS. 10A-10N are example implementations of interface displays of a driving monitoring application.
Figure 10A:
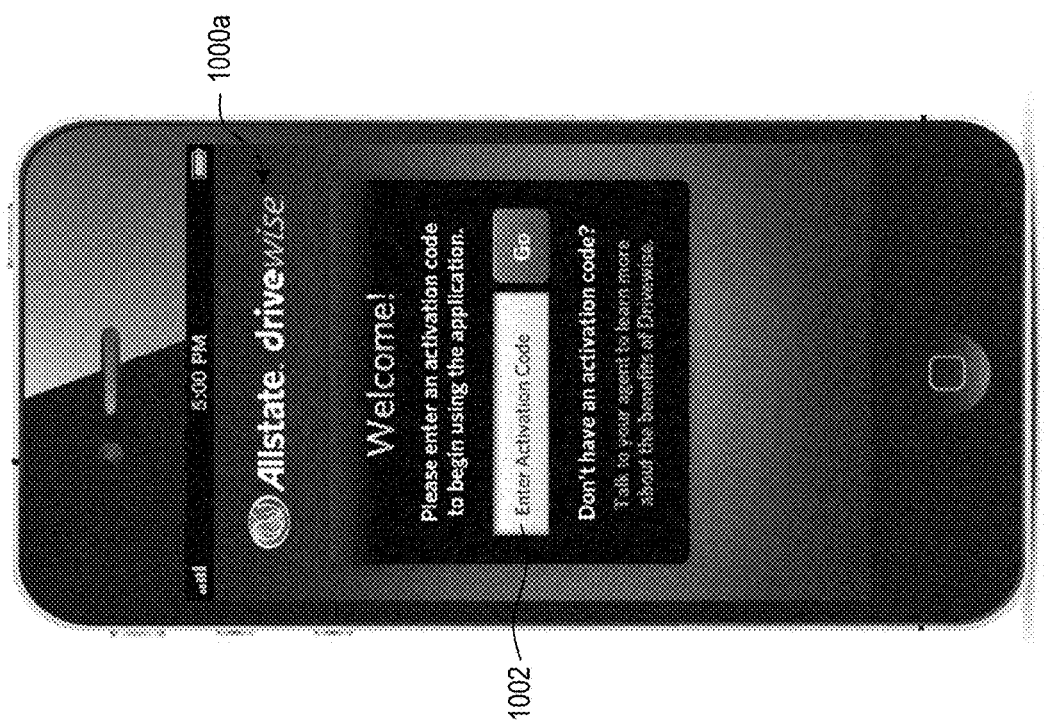

Referring now to FIGS. 10A-N, various implementations of interface displays of a trip monitoring application such as trip monitoring application 924 are shown. The interface displays shown by way of example in FIGS. 10A-N illustrate how a user may activate the trip monitoring application, initiate monitoring of driving performance during a trip, cancel monitoring of driving performance that has been initiated, browse menu items, view previous trips, view trip details, remove trips, view route maps, toggle a sleep mode, and view driving performance information. Each of these activities will be described in further detail below.

In FIG. 10A an example interface display 1000a of a trip monitoring application is shown. The interface display 1000a in FIG. 10A may be presented at the mobile computing device when the trip monitoring application is first launched at the mobile computing device. As noted above, a user may need to register for the driver rewards program in order to receive an activation code that activates the trip monitoring application at the mobile computing device. The interface display 1000a includes an input element 1002 for receiving the activation code. A user may provide the activation code received at the input element 1002 and submit the activation code. The trip monitoring application may attempt to validate the activation code with the driving analysis and reward system. If the activation code is valid, the driving analysis and reward system may transmit an instruction to the trip monitoring application to unlock and allow the user to use the trip monitoring application. If the activation code is not valid or if the driving analysis and reward system cannot validate the activation code, then the driving analysis and reward system may transmit an instruction to the trip monitoring application that causes the trip monitoring application to notify the user the trip monitoring application could not be unlocked. The user may thus reattempt activation with the same or a different activation code.

In FIG. 10B another example interface display 1000b of a trip monitoring application is shown. The interface display 1000b in FIG. 10B may be presented at the mobile computing device when the trip monitoring application is unlocked. As seen in FIG. 10B, the trip monitoring application may allow the user to initiate a tour of the application or start driving. The user may initiate a tour of the application by making the appropriate selection at a menu displayable by selecting a menu button 1004 at the interface display 1000b. Upon launch of the trip monitoring application, the trip detection feature may be activated. The trip detection feature monitors information received from the various modules of the mobile computing device (e.g., the accelerometer, gyroscope, etc.) and determines whether a trip has begun based on this information. If the trip monitoring application detects the start of a trip, the trip monitoring application may activate the trip monitoring feature in order to detect and monitor driving behaviors during the trip. The trip detection feature and trip monitoring feature will be discussed in further detail below.

Figure 10D:
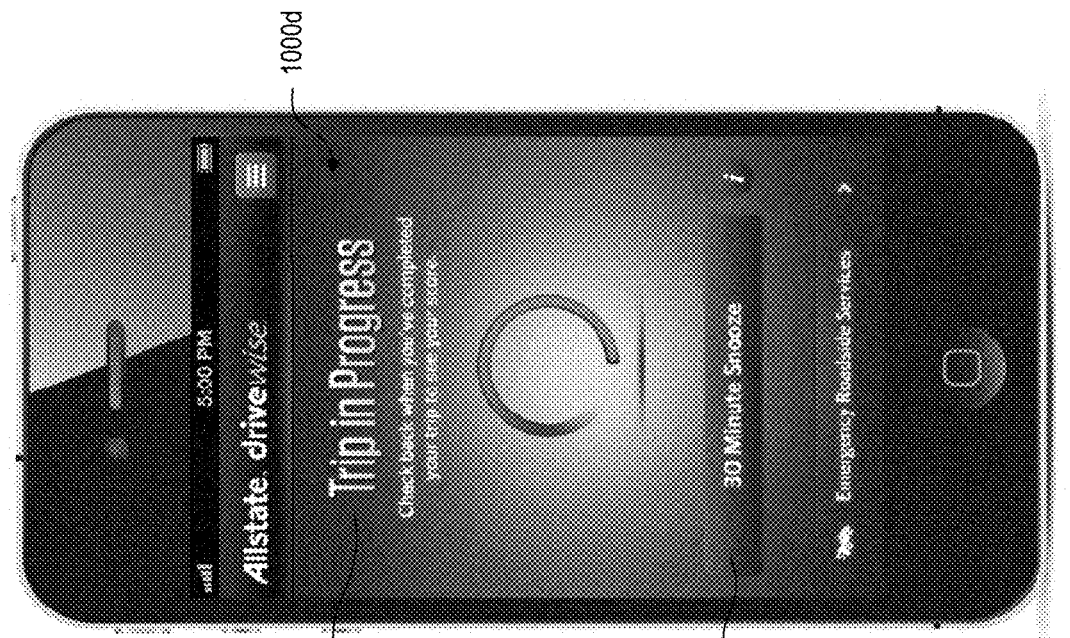
Figure 10C:
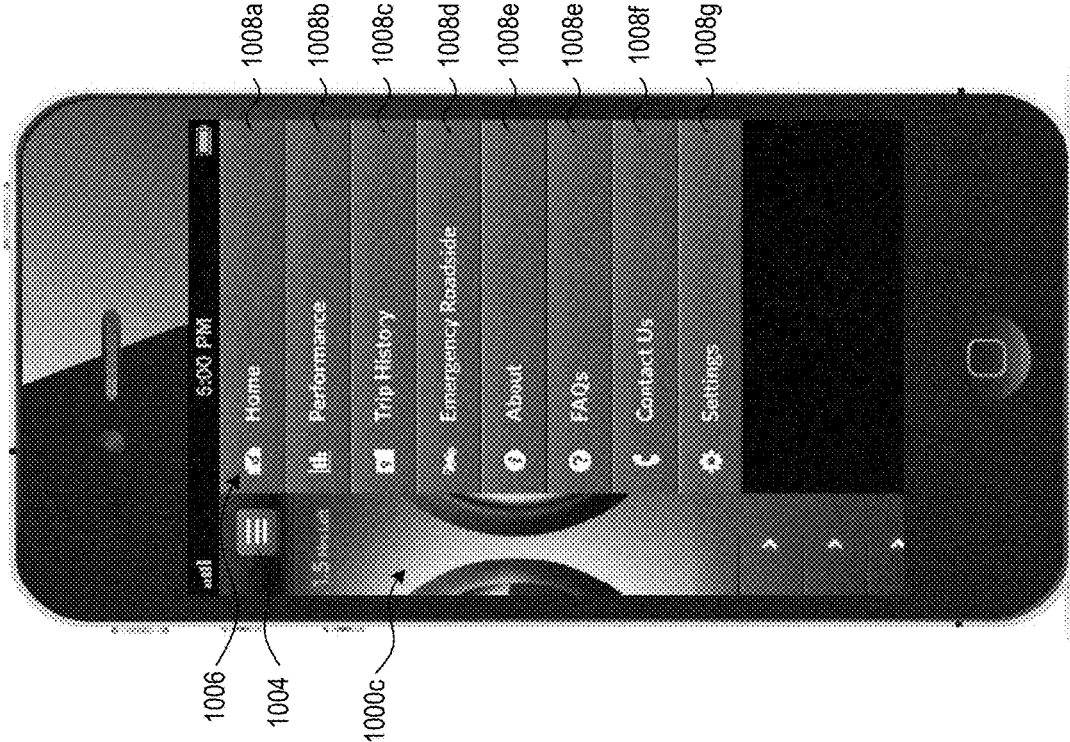

In FIG. 10C another example interface display 1000c of a trip monitoring application is shown. The interface display 1000c in FIG. 10C presents an example menu 1006 for the trip monitoring application in response to selection of the menu button 1004. The menu 1006, in this example, includes various options 1008a-g for navigating the trip monitoring application. The options provided by the menu 1006, in this example, include: an option 1008a for navigating to a dashboard of the trip monitoring application; an option 1008b for viewing driving performance information; an option 1008c for viewing a list of trips taken by the user; an option 1008d for requesting emergency roadside assistance; an option 1008e for viewing information about the trip; an option 1008f for contacting the provider of the trip monitoring application and rewards program; and an option 1008g for viewing various settings associated with the trip monitoring application.

In FIG. 10D, another example of an interface display 1000d of a trip monitoring application is shown. The interface display 1000d may be presented at the mobile computing device when the trip detection feature determines a trip has begun and the trip monitoring feature is activated. When the trip monitoring feature is activated and the trip monitoring application is collecting driving performance information for a trip, the interface display 1000d may include an indicator such as indicator 1010 informing the user that the trip monitoring application is currently collecting driving performance information. The interface display 1000d may also include a snooze button 1012 to cancel current trip monitoring and deactivate the trip detection feature for a predetermined period of time, e.g., 30 minutes. The snooze button 1012 may thus allow a user to cancel monitoring of a trip where, for example, the user is a passenger in a vehicle. upon expiration of the snooze time period, the trip monitoring application may reactivate the trip detection feature such in order to activate the trip monitoring feature when subsequent trips are detected.

When the trip detection feature is activated the trip monitoring application may continually analyze information received from the various modules of the mobile computing device in order to determine whether a trip has begun. The trip monitoring application may determine that a trip has begun based on one or more of changes in acceleration or geospatial location that are consistent with or similar to observed changes in acceleration or geospatial location associated with vehicle travel. Vehicle travel, for example, may be associated with a relatively high rate of change in acceleration or geospatial location, and the trip monitoring application may be configured to determine that a trip has begun when the rate of change in acceleration or geospatial location exceeds a predetermined threshold rate. The trip monitoring application may also determine that a trip has begun based on changes in pressure that are consistent with entering a vehicle and closing the door. The trip monitoring application may also determine that a trip has begun based on an observed speed determined by analyzing location information received from the GPS. In some example implementations, the trip monitoring application may be configured to determine that a trip has begun based on a combination of such information, e.g., when a change in pressure consistent with entering a vehicle is observed followed by observing a relatively high rate of change in acceleration followed by observed speeds above a speed threshold (e.g., 20 mph). Speeds above the predetermined threshold may be referred to as driving-level speeds. The trip monitoring application may be configured to detect the end of a trip in a similar fashion based on observed deceleration, lack of changes in geospatial location, and pressure changes consistent with exiting a vehicle. In some implementations, for example, the trip monitoring application may be configured to determine that a trip has ended upon observing deceleration to a speed of zero, followed by a pressure change consistent with exiting a vehicle. In other example implementations, the trip monitoring application may be configured to determine that a trip has ended upon observing deceleration to a speed of zero and failing to subsequently observe a relatively high rate of acceleration or driving-level speeds for a predetermined time period (e.g., 20 minutes). The trip monitoring application may also include a button that allows a user to manually end the trip instead of waiting for the end of the trip to be automatically detected. When the trip detection feature is not active (i.e., has been deactivated), the trip monitoring application may refrain from analyzing information provided by the modules of the mobile computing device in an attempt to determine whether a trip has started. When the trip monitoring feature is active the trip monitoring application may collect information from the various modules of the computing device such as the accelerometer, gyroscope, and GPS module. The trip monitoring feature may be inactive while the trip detection feature is active. It will be appreciated that continually collecting and analyzing such information may drain the battery of the mobile computing device relatively quickly. The trip monitoring application may thus be configured with various features to address battery drain. These features will be discussed in further detail below.

In FIG. 10E, another example of an interface display 1000e of a trip monitoring application is shown. The interface display 1000e may present a dashboard 1014 at the mobile computing device. The dashboard 1014 may include a scrollable list of trips 1016 the user has taken. The user may scroll through the list of trips 1016 to display trip information 1018 for the currently selected trip. As shown by way of example in FIG. 10E, the trip information 1018 presented for a selected trip may include the date and time 1020 of the trip and an overall score 1022 for the trip. The dashboard 1014 may also include various buttons to navigate to other interface displays of the trip monitoring application, e.g., a button 1024 to navigate to an overall driving performance summary and a button 1026 to navigate to a list of all trips taken by then user. As described in further detail below, the trip monitoring application may include a feature for putting the trip monitoring application into a sleep mode in which the trip detection feature is deactivated for a predetermined time period. The dashboard 1014 may include an indicator 1028 informing the user when the sleep timer will expire. The user may also select the trip currently presented at the dashboard 1014 in order to view further trip details for the selected trip.

In FIG. 10F, another example of an interface display 1000f of a trip monitoring application is shown. The interface 1000f may present the trip details of a trip selected by the user. The trip monitoring application may request the trip details for the selected trip from the driving analysis and reward system, and in response the driving analysis and reward system may query the data store for the trip details associated with the selected trip and transmit the trip details to trip monitoring application for presentation at the computing device. As shown by way of example in FIG. 10F, the trip details presented to the user may include the date and time 1030 of the trip, the duration of the trip (e.g., in minutes and hours), the total distance 1034 of the trip (e.g., in miles), a miniature route map 1036 illustrating the route 1038 taken during the trip, an overall score 1040 for the trip, and individual driving performance scores 1042a-d for individual driving performance metrics (e.g., braking, mileage, time of day, and speed). The user may select the miniature route map 1036 to view the route on an enlarged route map which the user may pinch open and pinch close to zoom out and zoom in. The interface display 1000f may also present one or more driving tips 1044 at the mobile computing device as well as a button 1046 to remove the trip. The driving analysis and reward system may automatically select one or more driving tips based on the score determined for a driving performance metric and transmit the selected driving tip to the trip performance. For example, if a driver received a relatively low braking score, then the driving analysis module may select a driving tip that informs the user how to improve the braking score, e.g., by decreasing speed in order to avoid hard braking events. Removing a trip will be discussed in further detail below. Driving tips may also be related to braking, speed, safe times of the day to drive, miles driven, tire pressure, and so forth.

Figure 10H:
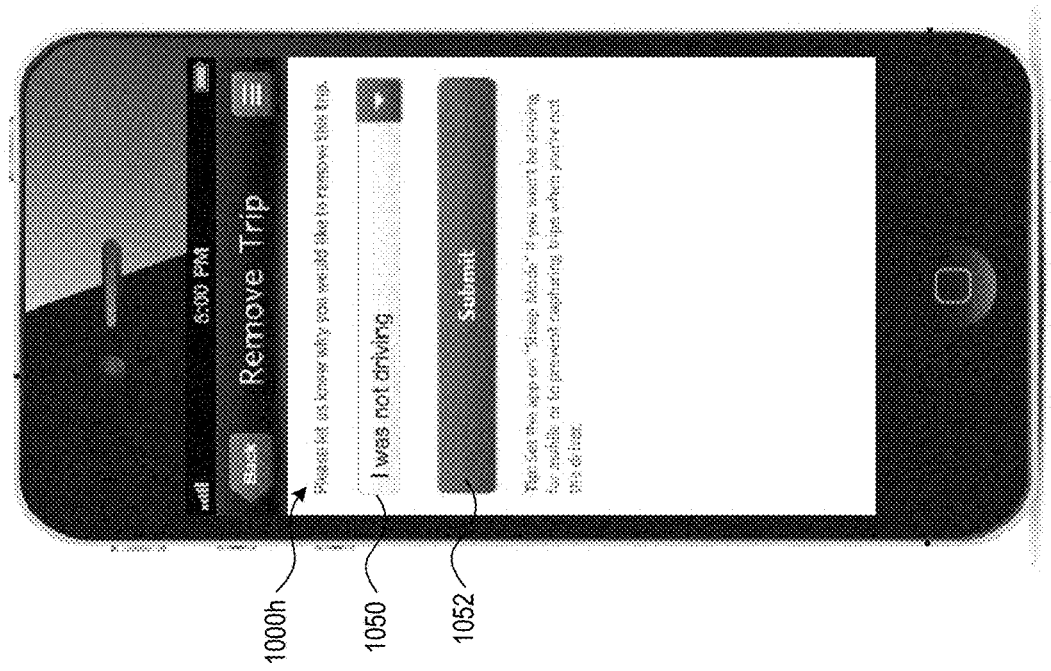
Figure 10G:
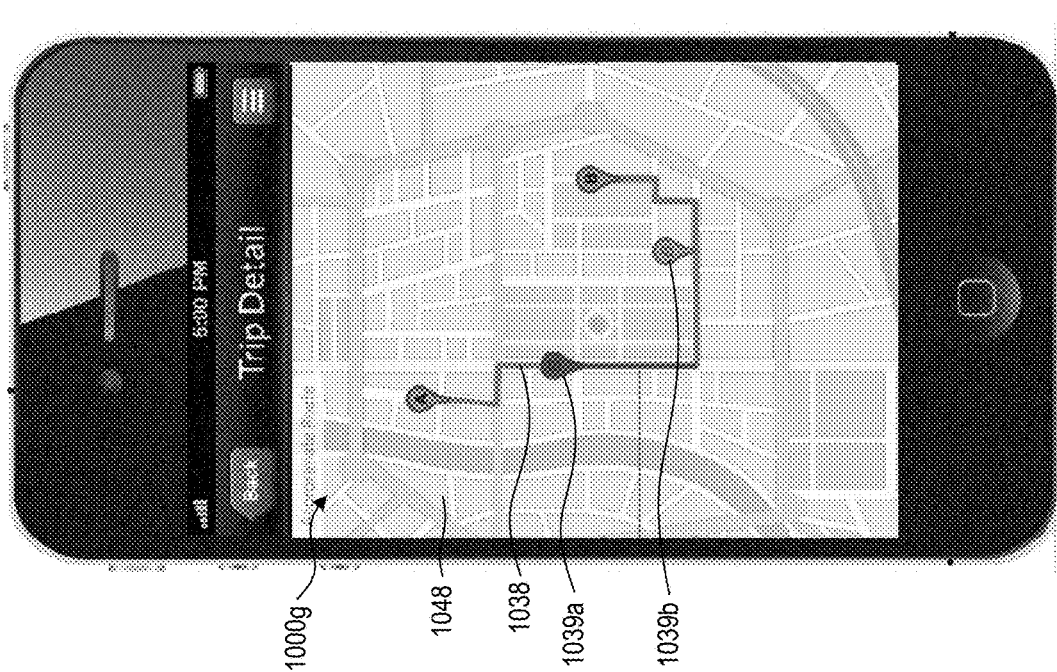

In FIG. 10G, another example of an interface display 1000g of a trip monitoring application is shown. The interface 1000g may present an enlarged route map 1048 in response to selection of the miniature route map described above in reference to FIG. 10F. The enlarged route map 1048 may similarly illustrate the route 1038 taken during the trip. The route 1038 may also include various segments in which various driving events occurred (e.g., a speeding event, a braking event, or an acceleration event) and a score for that driving event. As seen in FIG. 10G, the route 1038 includes two driving events 1039a and 1039b which respectively correspond to a speeding event (e.g., at or above 80 mph) that occurred during the trip and a braking event (e.g., an extreme braking event) that occurred during the trip.

In FIG. 10H, another example of an interface display 1000h of a trip monitoring application is shown. As noted above, a user may wish to remove a trip in some circumstances. A user may wish to remove a trip where, for example, the user was traveling in a vehicle as a passenger and thus not driving, the trip monitoring feature was incorrectly activated, where the trip details are incorrect, or for various other reasons. The interface display 1000h may thus include a list of reasons 1050 why the user is requesting removal of the trip and a button 1052 to submit the selected reason to the driving analysis and reward system. When a trip is removed, the driving analysis and reward system may delete from the data store all information associated with that trip or simply flag the trip as having been removed while retaining the data for the trip. The data analysis module may also store the reason for removing the trip at the data store.

Figures 10I, 10J:
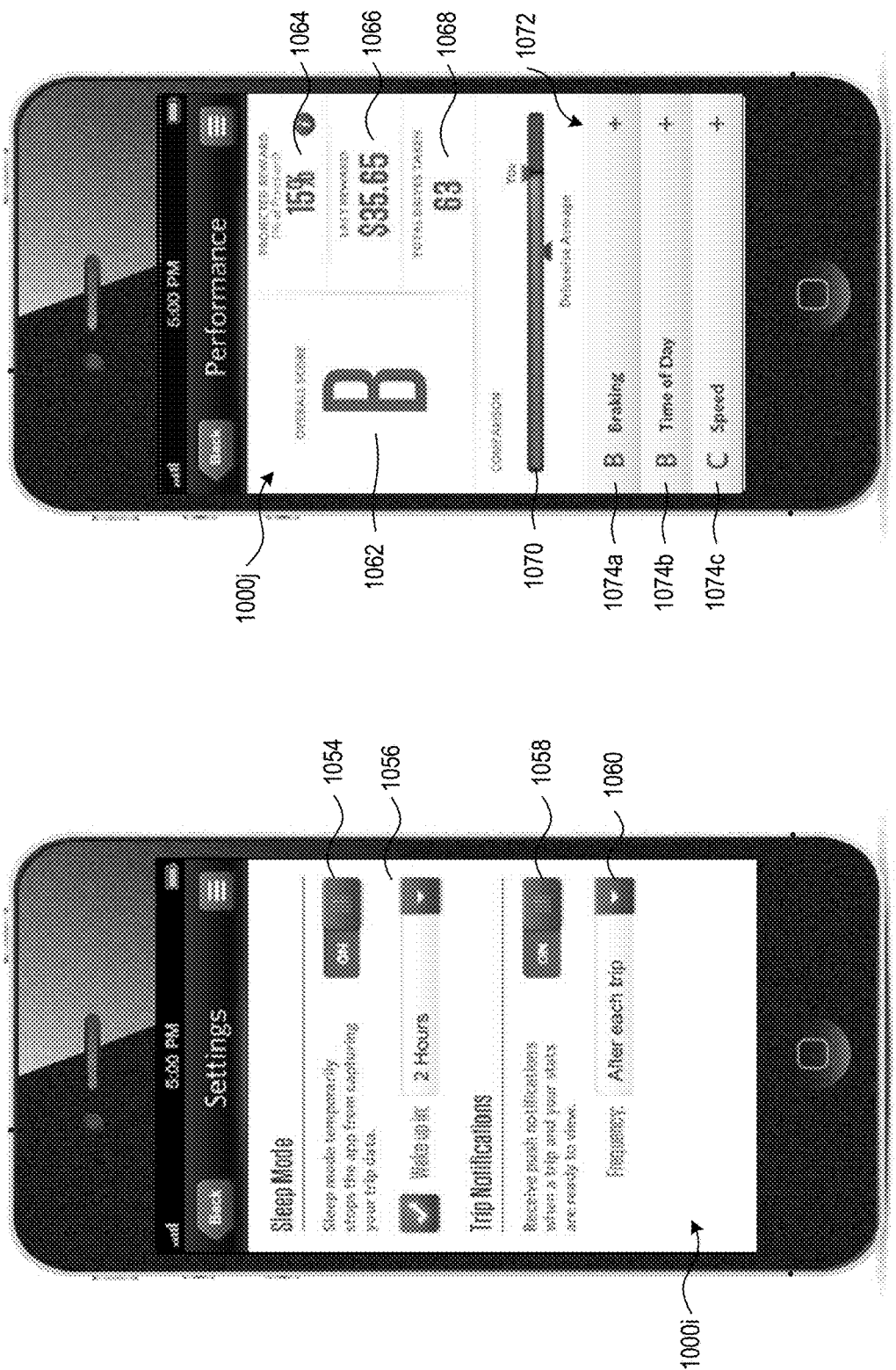

In FIG. 10I another example of an interface display 1000i of a trip monitoring application is shown. The interface 1000i may present various user-adjustable settings. The user-adjustable settings, in this example, include sleep mode settings and trip notification settings. The interface display 1000i may include a toggle button 1054 to toggle activation of the sleep mode as well as an input element 1056 for setting a sleep duration. Upon activation of the sleep mode, a sleep timer will start that is set to the selected sleep duration. While the sleep mode is active, the trip detection feature of the trip monitoring application may be deactivated. Upon expiration of the sleep timer, the trip monitoring application will reactivate the trip detection feature such that the trip monitoring application will again initiate trip monitoring upon detection of a trip. A user may activate the sleep mode to prevent trip monitoring during time periods when the user will not be driving. The interface display 1000i may also include a toggle button 1058 to toggle activation of push notifications as well as an input element 1060 for setting a push notification frequency. In some example implementations, the driving analysis and reward system may be configured to push trip performance results to the mobile computing device upon completion of a trip. Activating the push notification feature allows the trip monitoring application to receive trip performance information without explicitly requesting it from the driving analysis and reward system. When the push notification feature is deactivated, the driving analysis and reward system may not provide trip performance information to the trip monitoring application unless the trip monitoring application submits a request for it. The user may also be able to set the frequency for how often the driving analysis and reward system may push notifications to the trip monitoring application, e.g., at the completion of each trip, at the end of the day, and so forth. The driving analysis and reward system may maintain a queue of notifications to push to the trip monitoring application and transmit the queued notifications at the beginning of the next frequency period.

In FIG. 10J another example of an interface display 1000j of a trip monitoring application is shown. The interface display 1000j may present overall trip performance information at the mobile computing device. As shown by way of example in FIG. 10J, the overall trip performance information may include an overall score 1062 for the driver, an estimated reward 1064 for the current reward period, a previous reward 1066 for the previous reward period, a total number of trips 1068 taken by the user, an overall score comparison 1070 between the user and other drivers, and a list of driving performance metric summaries 1072. The overall score 1062 for the user may be an aggregate score based on the individual trip scores for trips taken by the user. The overall score comparison 1070 may thus be a comparison of the overall score 1062 of the user to an average overall score for the other drivers in the rewards program. The overall score comparison 1070 may illustrate how the user compares to the other drivers based on their overall scores. The list of driving performance metric summaries 1072 may include individual summaries 1074a-c for the individual driving performance metrics used to calculate the driver scores. Each driving performance metric summaries 1074a-c may indicate the respective score for that driving performance metric. The user may select one of the driving performance metric summaries 1074a-c to view the performance information for the selected driving performance metric. Additional and alternative trip performance information may be presented at the interface display 1000j.

Figure 10L:
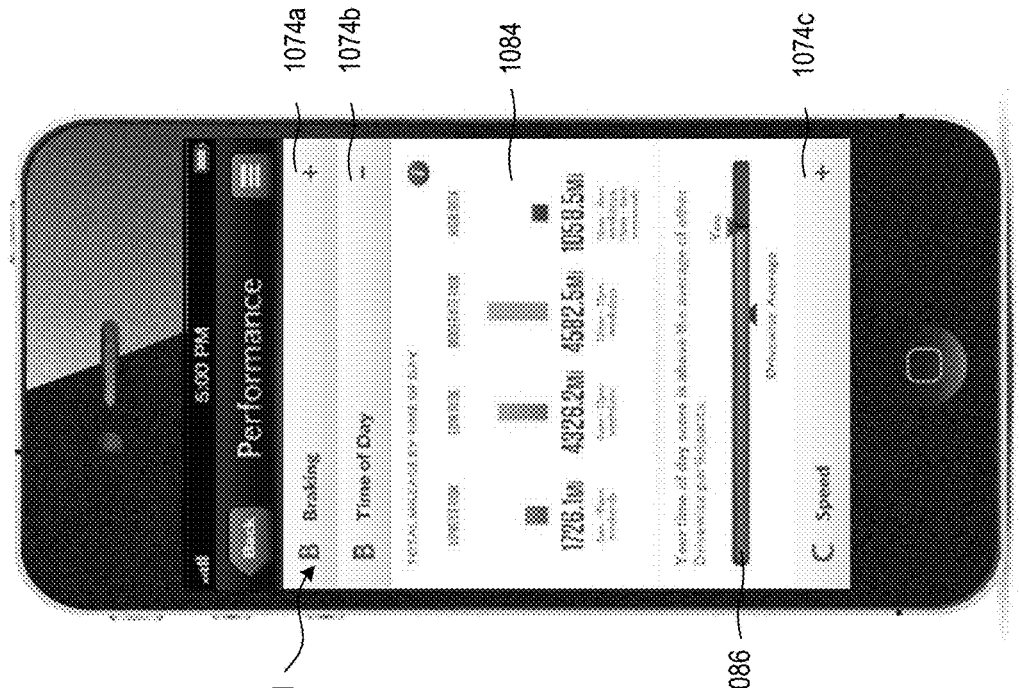
Figure 10K:
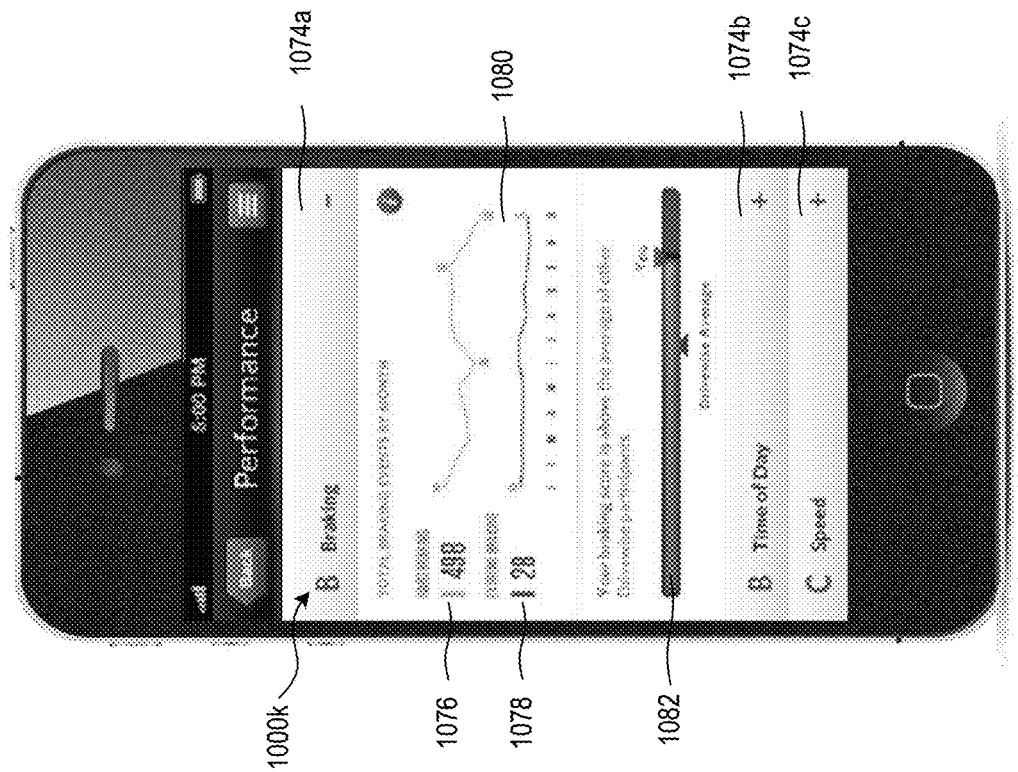

In FIG. 10K another example of an interface display 1000k of a trip monitoring application is shown. The interface display 1000k may expand the driving performance metric summary 1074a which, in this example, summarizes the braking performance of the user. The braking performance summary may include the total number of hard braking events 1076, the total number of extreme braking events 1078, and a graph 1080 illustrating the total number of braking events for a particular time period. The graph 1080, in this example, is a line graph illustrates the total number of hard braking events and extreme braking events by month for the current year. The braking performance summary may also include a comparison 1082 that illustrates how the braking performance score of the user compares to an average braking performance score of all drivers in the rewards program. Additional and alternative braking performance information may be presented at the interface display 1000k.

In FIG. 10L another example of an interface display 1000l of a trip monitoring application is shown. The interface display 1000l may also expand the driving performance metric summary 1074b which, in this example, summarizes the time of day performance of the user. The time of day performance summary may include a graph 1084 (e.g., a bar graph) illustrating the total mileage driven by the user during each time of day risk period. The time of day performance summary may also include a comparison 1086 that illustrates how the time of day performance score of the user compares to an average time of day performance score for all drivers in the rewards program. Additional and alternative time of day performance information may be presented at the interface display 1000l.

In FIG. 10M another example of an interface display 1000m of a trip monitoring application is shown. The interface display 1000m may expand the driving performance metric summary 1074c which, in this example, summarizes the speed performance of the user. The speed performance summary may include a graph 1088 (e.g., a pie graph) that illustrates the total mileage driven by the user below 80 mph and the total mileage driven by the user at or above 80 mph. The speed performance summary may also include a comparison 1088 that illustrates how the s peed performance score of the user compares to an average speed performance score for all drivers in the rewards program. Additional and alternative speed performance information may be presented at the interface display 1000m.

In FIG. 10N another example of an interface display 1000n of a trip monitoring application is shown. The interface display 1000n may present a driving history at the mobile computing device. The trip history may include a selectable timeline 1092, e.g., by week, month, year, and so forth. The timeline 1092 in shown by way of example in FIG. 10N is a weekly timeline of trips taken by the user during a selected week. The user may move forward or backward along the timeline 1092 to select subsequent or previous time periods, e.g., the subsequent week or the previous week. The timeline 1092 may include selectable cells corresponding to individual units of the timeline. For the weekly timeline 1092 in FIG. 10N, each selectable cell represents a day of the selected week. As seen in FIG. 10N, each day of the week for the timeline 1092 includes an aggregate driving score for that day based on the individual driving scores of trips taken that day. The user may select one of the days on the timeline 1092, and the interface display 1000n may present trip information for the selected day. Trip information for the selected day 1094 may include the date and total number of trips taken on the selected day, the total driving time 1096 for the selected day, the total distance driven on the selected day 1098, and a list of trips 1101 taken on the selected day. The list of trips 1101 may list the individual trips 1103a-d taken on the selected day as well as, e.g., the start time of the trip, the distance traveled during the trip, and a driving score for the trip. An individual trip listed may also include a symbol or icon indicating whether or not a driving event was recorded during the trip, e.g., a checkmark to indicate that no driving events were recorded and an exclamation point to indicate that at least one driving event was recorded during the trip. A user may select one of the trips 1103a-d to view detailed trip information for the selected trip, e.g., at a trip detail interface display such as the one described above with reference to FIG. 10F. The trip monitoring application may cache four weeks of trips at the mobile computing device. The user may request trips outside of this four week window, but if a trip that is not cached at the mobile computing device, the trip monitoring application may need to submit to the driving analysis and reward system a request for the trip information associated with the selected trip. Additional and alternative trip history information may be presented at the interface display 1000*n*.

Figure 11:
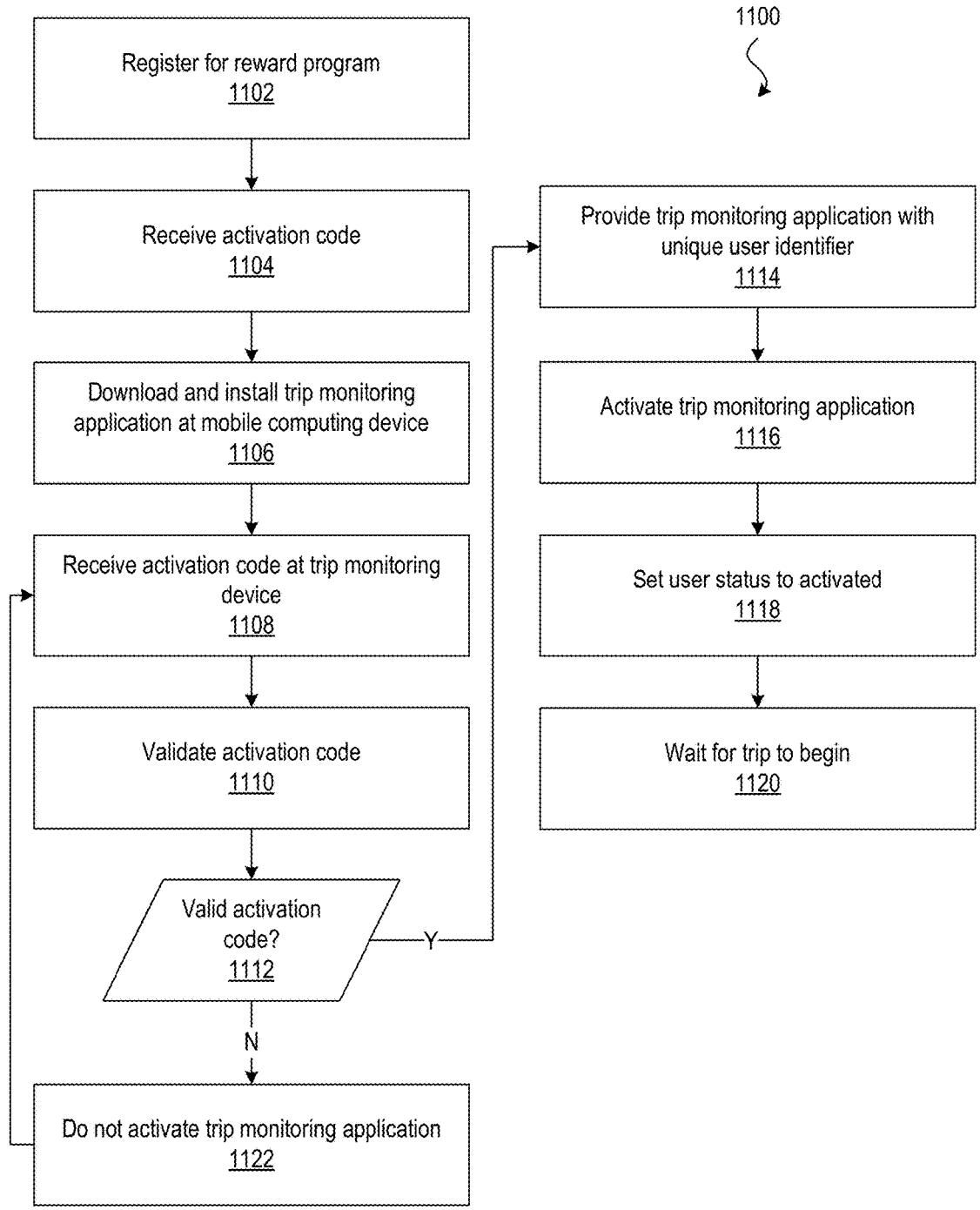
FIG. 11 is a flowchart of example method steps for activating a trip monitoring application at a mobile computing device.

In FIG. 11, a flowchart 1100 of example method steps for activating and launching the trip monitoring application is shown. A user may register for the reward program using, for example a web portal over the Internet (block 1102) and receive an activation code in response (block 1104). The user may then download the trip monitoring application from an application distribution platform and install the trip monitoring application on a mobile computing device (block 1106), e.g., a smartphone or a tablet computer. Once installed the trip monitoring application may prompt the user to input the activation code upon the first launch of the application. The user may input the activation code provided (block 1108), and the trip monitoring application may transmit the activation code to the driving analysis and reward system for validation (block 1110). If the activation code is valid (block 1112:Y), then the driving analysis and reward system may generate a token (e.g., a unique user identifier) for the trip monitoring application and provide the token to the trip monitoring application in response (block 1114). The trip monitoring application may utilize the token whenever the trip monitoring application communicates with the driving analysis and reward system such that the driving analysis and reward system can authenticate the mobile computing device and the user. The token may thus be a combination of one or more of the activation code, a unique user identifier, and a unique device identifier.

Having received the unique user identifier, the trip monitoring application may be activated (block 1116). Once activated the trip monitoring application may be ready to begin detecting and monitoring trips taken by the user. The status of the user may also be set to, e.g., "activated" once the user provides a valid activation code (block 1118). After the trip monitoring application is activated, the trip monitoring application may wait for a trip to being (block 1120). If the activation code is not valid (block 1112:N), then the trip monitoring application may not be activated (block 1122), and the user may subsequently reattempt activation (block 1108).

Figure 12:
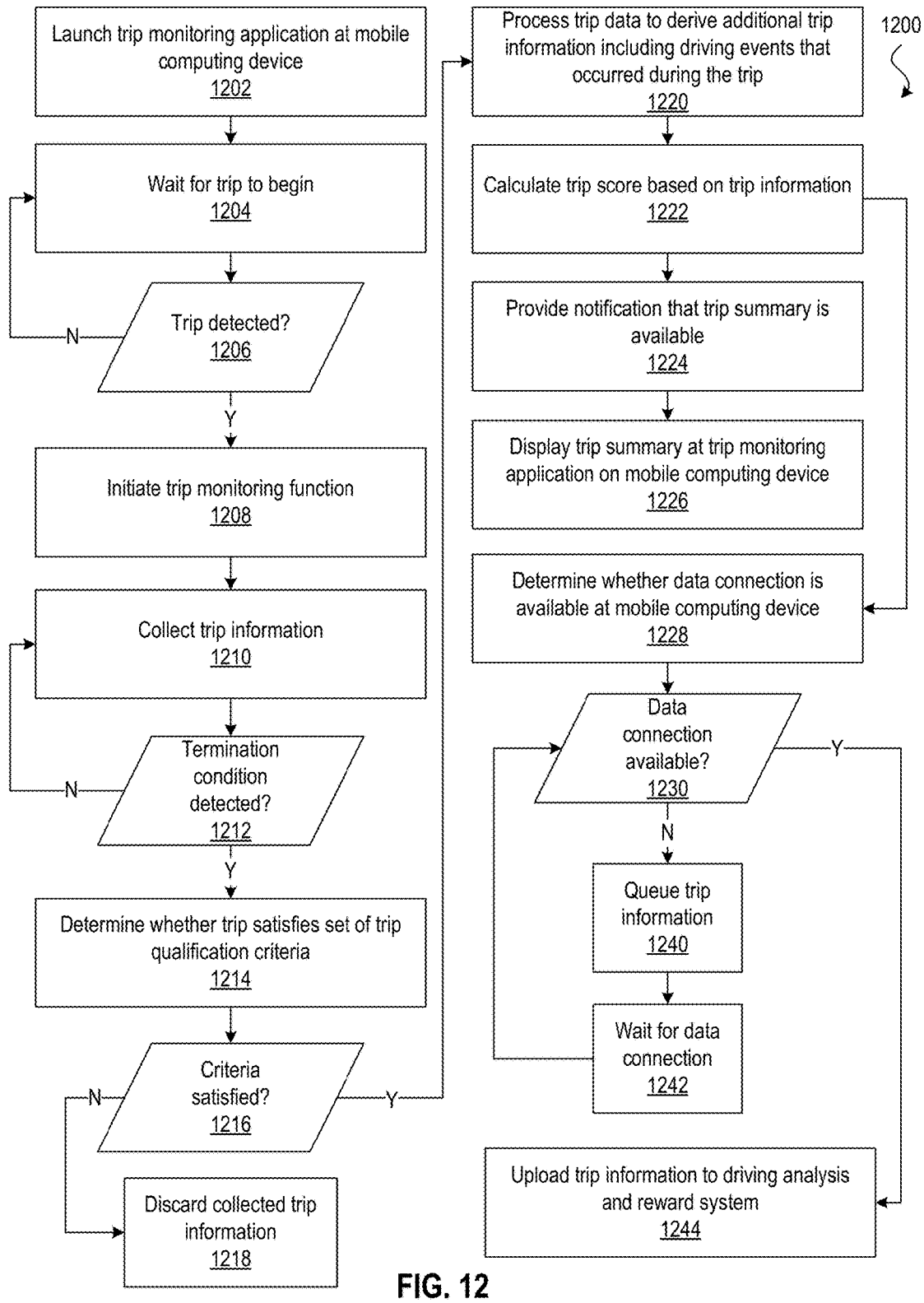
FIG. 12 is a flowchart of example method steps for monitoring a trip using a trip monitoring application at a mobile computing device.

In FIG. 12 a flowchart 1200 of example method steps for monitoring a trip using a trip monitoring application at a mobile computing device is shown. The user may launch the trip monitoring application at the mobile computing device (block 1202), which may wait for a trip to begin (block 1204). The trip monitoring application may determine whether a trip has begun when running in either the foreground or the background at the mobile computing device. The trip monitoring application may also collect trip information while running in either the foreground or the background at the mobile computing device. If the trip monitoring application does not detect that a trip has begun (block 1206:N), then the trip monitoring application may continue to wait (block 1204).

Once the trip monitoring application has detected that a trip has begun (block 1206:Y), the trip monitoring application may initiate the trip monitoring function (block 1208) and collect trip information during the trip (block 1210). During the trip the trip monitoring application may periodically determine whether a trip termination condition has occurred. Examples of trip termination conditions are described above. If the trip monitoring application does not detect a trip termination condition (block 1212:N), then the trip monitoring application may continue to collect trip information (block 1210). If the trip monitoring application detects a trip termination condition (block 1212:Y), then the trip monitoring application may determine whether the trip satisfies a set of trip qualification criteria (block 1214). Examples of trip qualification criteria are described above. If the trip does not satisfy the trip qualification criteria (block 1216:N), then the trip monitoring application may discard the trip information collected for the trip (block 1218), e.g., delete the trip information collected from the mobile computing device.

As noted above, the trip monitoring application may collect information from the GPS of the mobile computing device while the trip is in progress. The GPS module may, for example, determine the current location of the mobile computing device once or even multiple times a second. In some example implementations, the trip monitoring application may not record or store each GPS point potentially available from the GPS module. Instead the trip monitoring application in these example implementations may only store a portion of the GPS points potentially available from the GPS module, e.g., the portion of GPS points that may be utilized to adequately represent the trip route on a map subsequently presented at the trip monitoring application. The trip monitoring application may, for example, determine whether to store a GPS point based on the detected heading of the mobile computing device. The GPS module may be configured to determine the heading of the mobile computing device and include the heading information in the set of GPS-based information provided to the trip monitoring application. The heading information may be, for example, a value indicating an offset from magnetic north or true north, e.g., where a value of 0 indicates a northward heading, a value of 90 indicates an eastward heading, a value of 180 indicates a southward heading, and a value of 270 indicates a westward heading. The trip monitoring application may utilize this heading information to determine whether or not the heading is currently changing. The trip monitoring application may determine that the heading is changing at a mobile device when a heading value and a subsequent heading value received from the GPS module differ by a predetermined threshold (e.g., a 3, 5, 7, 9, or 11 degrees difference). If the trip monitoring application determines that the heading is not changing, then the trip monitoring application may record a GPS point every x meters traveled; and if the trip monitoring application determines that the heading is changing, then the trip monitoring application may record a GPS point for every y meters traveled where y<x. The value of x may range between 10-100 meters, and in some example implementations x may be 10, 15, 20, 25, 30, 35, 40, or 50 meters. The value of y may range between 0.5-10 meters, and in some example implementations y may be 0.5, 1, 3, 5, or 7 meters. In this way, the trip monitoring application advantageously reduces the amount of storage used to store the GPS points while collecting enough GPS points to accurately depict the trip route at a map once the trip is complete.

If, however, the trip does satisfy the set of trip qualification criteria (block 1216:Y), then the trip monitoring application may process the trip data collected in order to derive additional trip data (block 1220). Examples of derived trip data are described above and include driving events that occurred during the trip, e.g., speeding events and braking events. Upon termination of the trip, the trip monitoring application may also calculate a trip score for the trip (block 1222) based, at least in part, on the trip information collected or the trip information derived from the trip information collected. The trip monitoring application may also provide a notification that a trip summary for the trip is available (block 1224), e.g., for display at a user interface of the trip monitoring application. When the user selects the recently completed trip and navigates to a "trip detail" screen of the trip monitoring application, for example, the trip monitoring application may display the trip summary for the selected trip at the mobile computing device (block 1226).

As also described above a driver may wish to remove a trip for various reasons. The trip monitoring application may receive a request to remove the selected trip (e.g., at a "remove trip" button on the "trip detail" screen) and prompt the user to select a reason for removing the trip. The trip monitoring application may receive a selected reason from the user and transmit a request to the driving analysis and reward system to remove the trip. The request to remove the trip may include the reason for removal selected by the user. As noted above, the driving analysis and reward system may flag the trip record for the trip as removed or remove the trip record completely. As also mentioned above, the determination of a reward may depend on how many trips a user has removed.

Upon completion of a trip, the trip monitoring application may determine whether a data connection is available at the mobile computing device (block 1228) in order to upload the collected and derived trip information to the driving analysis and reward system. If a data connection is not available at the mobile computing device (block 1230:N), then the trip monitoring application may queue the trip information (block 1240) and wait for a data connection to become available (block 1242). Once a data connection becomes available (block 1230:Y), the trip monitoring application may upload the trip information waiting in the queue (block 1244), which may include trip information associated with other trips taken by the driver that have not yet been uploaded.

Uploading the trip information from the mobile computing device to the driving analysis and reward system may include first uploading the trip information to one or more staging tables. Web services or other middleware may then perform extract, transform, and load (ETL) processes on the trip information stored in the staging tables in order to move the trip data into a data warehouse at the data analysis and reward system. The ETL processes may include data validation, data cleansing, business rule application, key assignment, referential integrity checks, and error checking. The ETL processes may be performed periodically throughout the day, e.g., three times a day at regular intervals.

Figure 13:
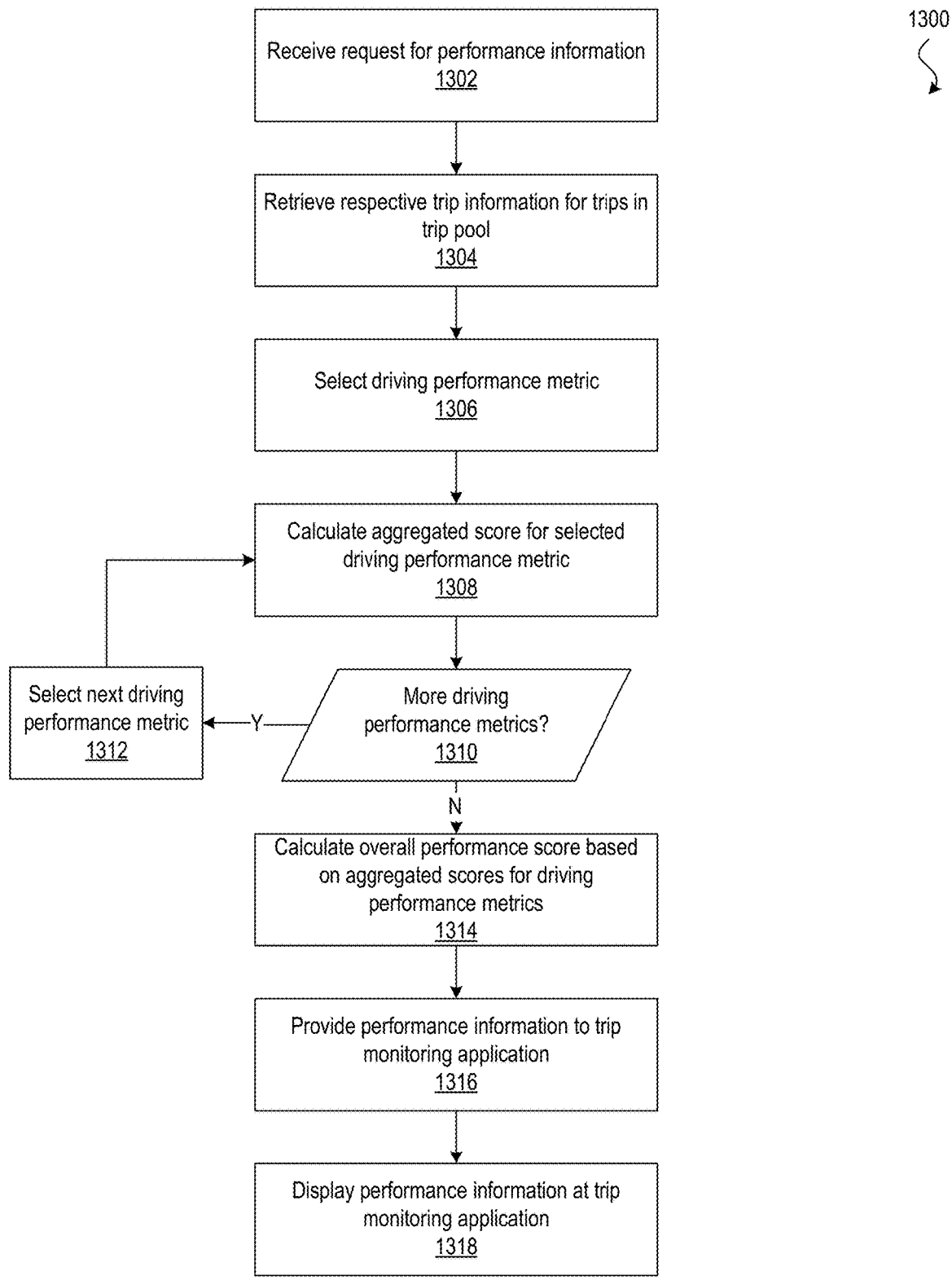
FIG. 13 is a flowchart of example method steps for determining performance information based on trips taken by one or more drivers.

In FIG. 13 a flowchart 1300 of example method steps for determining performance information based on trips taken by one or more drivers is shown. The example steps shown in FIG. 13 may be performed to determine a performance information for an individual driver or multiple drivers associated with the same insurance policy. Performance information may include an overall performance score or individual performance scores for driving performance metrics.

The performance scoring module of the driving analysis and reward system may receive a request from the trip monitoring application for performance information (block 1302). In response to the request the performance scoring module may retrieve the respective trip information for the trips in the trip pool used to determine the performance information (block 1304). The trip pool may be a collection of trips taken by an individual driver or a collection of trips respectively taken by multiple drivers associated with the same insurance policy. For the driving performance metrics, the performance scoring module may select a driving performance metric (block 1306) and calculate an aggregated score for the selected driving performance metric (block 1308) as described above. If there are additional driving performance metrics to score (block 1310:Y), then the performance scoring module may select the next driving performance metric (block 1312) and calculate an aggregated score for the next selected driving performance metric (block 1308). If no driving performance metrics remain to be scored (block 1310:N), then the performance scoring module may calculate an overall performance scored based on the aggregated driving performance metric scores (block 1314). The performance scoring module may provide the performance information to the trip monitoring application (block 1316), and the trip monitoring application may display the performance information at a user interface at the mobile computing device (block 1318), e.g., at a "performance" screen of the trip monitoring application.

Figure 14:
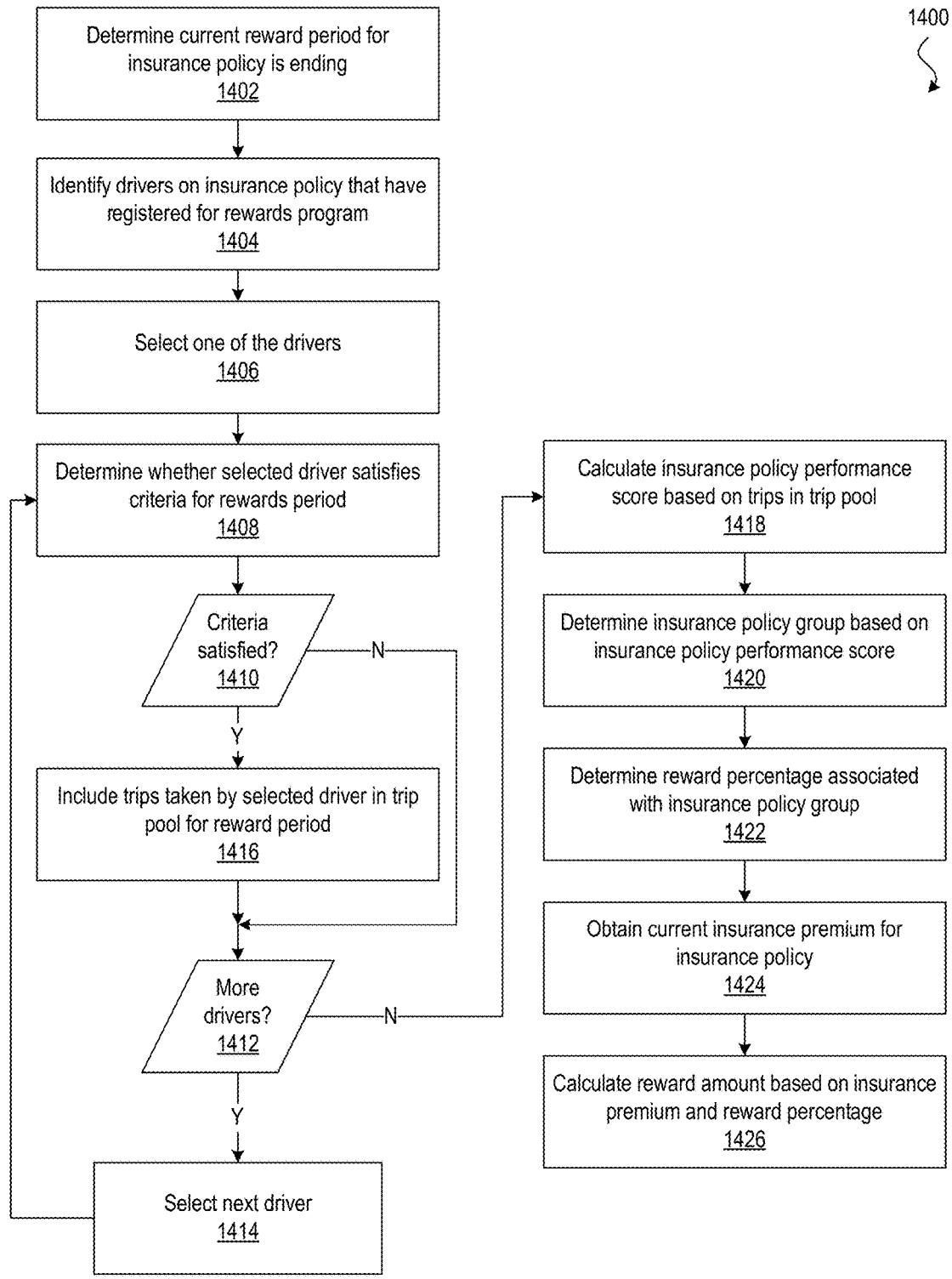
FIG. 14 is a flowchart of example method steps for calculating a reward for an insurance policy based on the trips taken by drivers on the insurance policy.

In FIG. 14 a flowchart 1400 of example method steps for calculating a reward for an insurance policy based on the trips taken by drivers on the insurance policy is shown. The example steps shown in FIG. 14 may be performed to provide cash rewards at an insurance policy level as described above. Similar steps may be performed in order to provide cash rewards at an individual driver level. The reward calculation module of the driving analysis and reward system may determine that the current reward period for an insurance policy is ending (block 1402). The reward calculation module may thus identify the drivers on the insurance policy that have registered for the rewards program (block 1404) and select one of the drivers (block 1406). The reward calculation module may determine whether the selected driver satisfies a set of reward criteria for receiving a reward (block 1408), e.g., whether the driver has successfully completed the minimum number of qualifying trips during the current reward period.

If the selected driver has not satisfied the criteria for receiving a reward (block 1410:N), then the reward calculation module may determine whether there are any additional drivers associated with the insurance policy and if so (block 1412:Y), select the next driver (block 1414) and determine whether the next selected driver has satisfied the set of reward criteria (block 1408). If a driver satisfies the set of reward criteria for receiving a reward (block 1410:Y), then the reward calculation module may include the trips taken by that driver in the pool of trips for the current reward period (block 1416). If no drivers of the insurance policy remain to be assessed (block 1412:N), then the reward calculation module may request that the performance scoring module score the trip pool for the current reward period (block 1418) in order to obtain a policy performance score for the current reward period.

The reward calculation module may then determine an insurance policy group based on the insurance policy performance score (block 1420) as described above. The reward calculation module may then determine a reward percentage associated with the insurance policy group (block 1422) as also described above. The reward calculation module may then obtain the current insurance premium for the insurance policy (block 1424) and calculate the cash reward amount using the insurance premium and the reward percentage (block 1426) in the example reward formula set forth above. The insurance company may then issue the cash reward amount may then be issued to the individual identified as the primary insured on the insurance policy in the form of a check.

Figure 15:
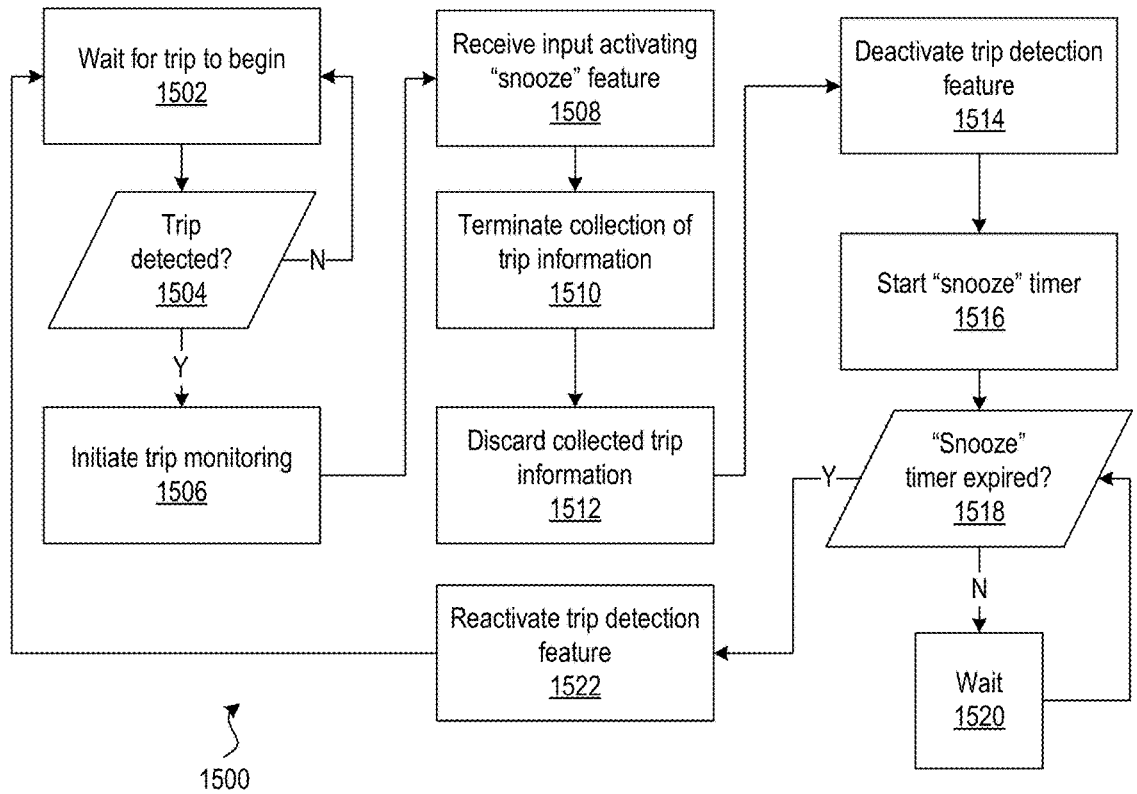
FIG. 15 is a flowchart of example method steps for activating a "snooze" mode at a trip monitoring application.

In FIG. 15 a flowchart 1500 of example method steps for activating a "snooze" mode at a trip monitoring application is shown. As noted above, the trip monitoring application may be configured with a "snooze" feature to terminate collection of trip information and deactivate the trip detection feature for a predetermined "snooze" time period. Upon launch, the trip monitoring application may activate the trip detection feature and wait for a trip to begin (block 1502). If the trip monitoring application does not detect a trip (block 1504:N), then the trip monitoring application may continue to wait (block 1502). When the trip monitoring application detects that a trip has begun (block 1504:Y), the trip monitoring application may initiate monitoring of the trip (block 1506). A "trip in progress" screen at the trip monitoring application may include a "snooze" button. Upon receipt of input activating the "snooze" feature (block 1508), the trip monitoring application may terminate collection of trip information (block 1510), discard the trip information collected up to that point (block 1512), and deactivate the trip detection feature (block 1514). The trip monitoring application may also start a "snooze" timer (block 1516), e.g., 30 min., and wait for the "snooze" timer to expire. If the "snooze" timer has not yet expired (block 1518:N), the trip monitoring application may continue to wait (block 1520). Once the "snooze" timer expires (block 1518:Y), the trip monitoring application may reactivate the trip detection feature (block 1522) such that the trip monitoring application is again available to detect when trips have begun. With the trip detection feature reactivated, the trip monitoring application may again wait for a trip to begin (block 1502).

Figure 16:
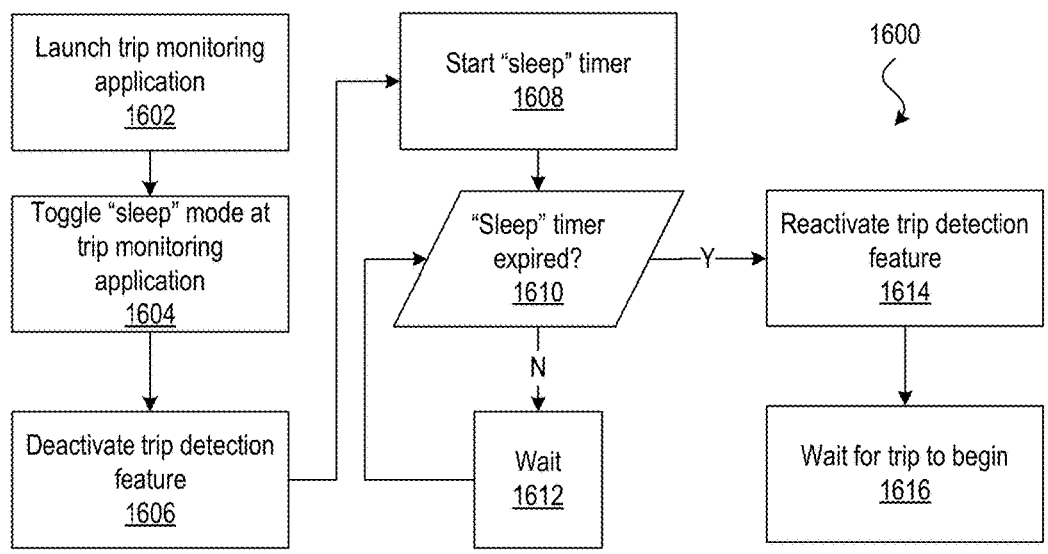
FIG. 16 is a flowchart of example method steps for activating a "sleep" mode at a trip monitoring application.

In FIG. 16 a flowchart 1600 of example method steps for activating a "sleep" mode at a trip monitoring application is shown. The "sleep" feature may be similar to the "snooze" feature, but the user may activate the "sleep" mode when the trip monitoring application is not currently monitoring a trip in progress. After launching the trip monitoring application at the mobile computing device (block 1602), the user may toggle activation of the "sleep" feature from a "settings" screen at the trip monitoring application (block 1604). When the "sleep" mode is toggled on, the trip monitoring application may deactivate the trip detection feature (block 1606) and start a "sleep" timer (block 1608). If the "sleep" timer has not yet expired (block 1610:N), then the trip monitoring application may continue to wait (block 1612). Once the "sleep" timer expires (block 1610:Y)), the trip monitoring application may automatically reactivate the trip detection feature (block 1614) such that the trip monitoring application is again available to detect trips. With the trip detection feature reactivated, the trip monitoring application may again wait for a trip to begin (block 1616).

Figure 17:
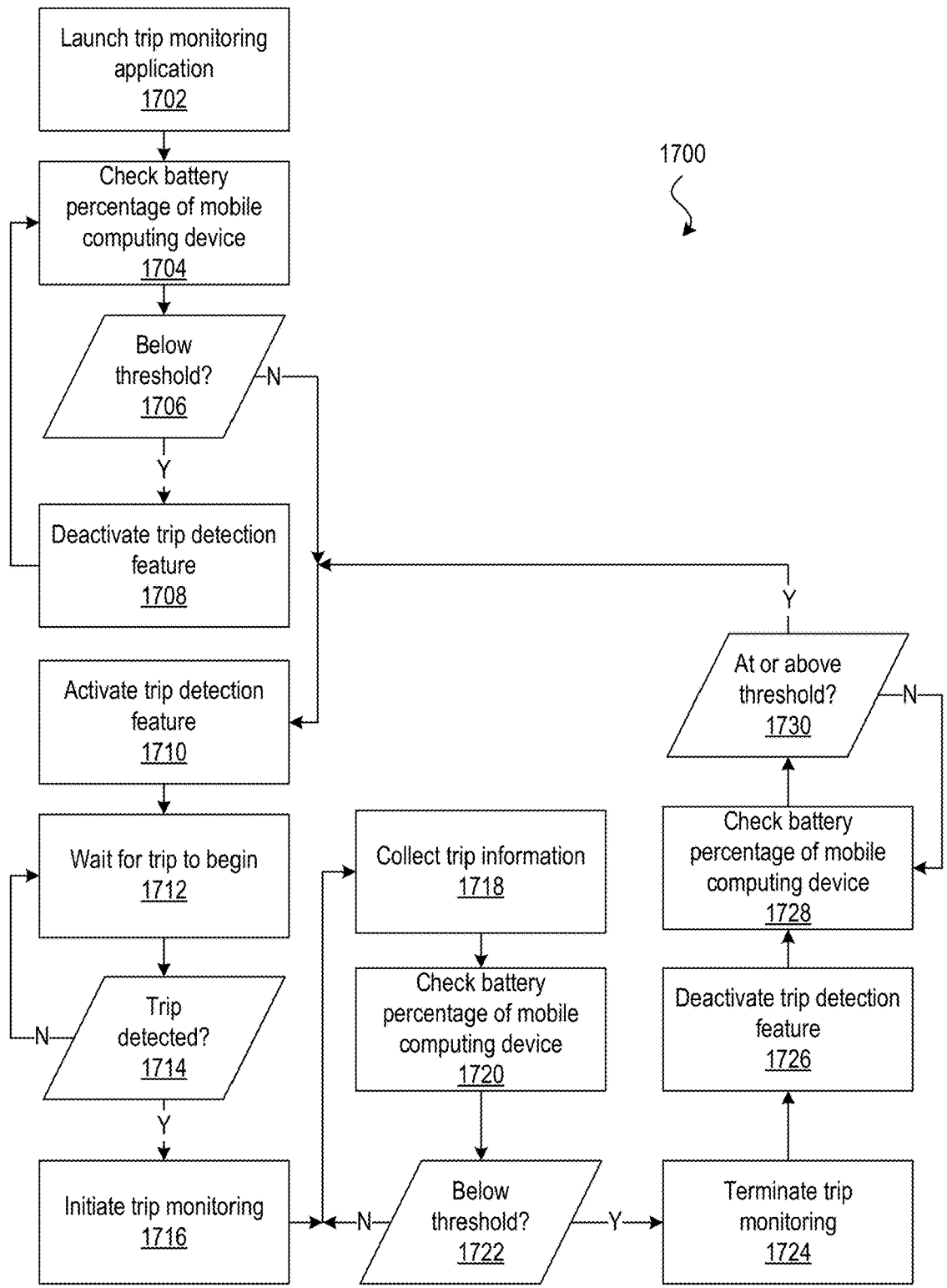
FIG. 17 is a flowchart of example method steps for monitoring a battery level of a mobile computing device from a trip monitoring application.

In FIG. 17 a flowchart 1700 of example method steps for monitoring a battery level of a mobile computing device from a trip monitoring application is shown. As noted above, the trip monitoring application may be configured to terminate collection of trip information and deactivate trip detection and trip monitoring whenever the battery percentage of the battery at the mobile computing device drops below a predetermined battery percentage threshold.

Accordingly upon launch of the trip monitoring application (block 1702), the trip monitoring application may check the battery percentage of the battery of the mobile computing device (block 1704). If the battery percentage is below the battery percentage threshold (block 1706:Y), then the trip monitoring application may deactivate the trip detection feature (block 1708) such that the trip monitoring application is not available to detect when a trip has begun. The trip monitoring application may then periodically check the battery percentage of the battery of the mobile computing device (block 1704) in order to determine if the battery percentage is still below the battery percentage threshold. If, however, the battery percentage is above the battery percentage threshold (block 1706:N), then the trip monitoring application may activate the trip detection feature (block 1710) such that the trip monitoring application is available to detect when a trip has begun. With the trip detection feature activated, the trip monitoring application may wait for a trip to begin (block 1712). If a trip is not detected (block 1714: N), the trip monitoring application may continue to wait (block 1712).

Upon detection of a trip (block 1714:Y), the trip monitoring application may initiate trip monitoring (block 1716) and collect trip information for the trip (block 1718). While the trip monitoring is in progress, the trip monitoring application may periodically check the battery percentage of the batter at the mobile computing device (block 1720). If the battery percentage has not dropped below the battery percentage threshold (block 1722:N), then the trip monitoring application may continue to collect trip information for the trip (block 1718). If, however, the battery percentage drops below the battery percentage threshold while the trip is in progress (block 1722:Y), then the trip monitoring application may terminate trip monitoring (block 1724) and deactivate the trip detection feature (block 1726). The trip monitoring application may then determine whether the battery percentage has risen to be at or above the battery percentage threshold (block 1728). If the battery percentage is not yet at or above the battery percentage threshold (block 1730:N), then the trip monitoring application may periodically check the battery percentage (block 1728) until it does rise above the battery percentage threshold. When the battery percentage is at or above the battery percentage threshold (block 1730:Y), the trip monitoring application may activate the trip detection feature (block 1710) such that the trip monitoring application is again available to detect and monitor trips. The approach described above advantageously ensures that the trip monitoring application is not the cause of excessive drain on the battery of the mobile computing device.

8. Conclusion

It will be appreciated that the disclosures provided in this disclosure are applicable to and may be practiced by other entities, enterprises, and organizations in addition to insurance companies. Such entities, enterprises, and organizations may include any in which employees are engaged in vehicle operation and encouraging safe driving is desired, e.g., shipping companies, delivery companies, etc. As described herein, such enterprises may issue cash rewards to employees for engaging in safe driving behaviors observed during vehicle operation.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method of encouraging safe driving behaviors comprising:
   configuring by a mobile computing device, a trip monitoring application, wherein the configuring comprises downloading the trip monitoring application to the mobile computing device;
   detecting, by the mobile computing device, that the mobile computing device is traveling in a vehicle based on the trip monitoring application detecting that the mobile computing device is traveling at a detected speed above a first minimum speed threshold associated with a first class of vehicle;
   detecting, by the mobile computing device, that the mobile computing device is traveling in the first class of vehicle based on determining that the detected speed is below a maximum speed threshold associated with a second class of vehicle;
   determining, by the mobile computing device and based on the detecting that the mobile computing device is traveling in the first class of vehicle, that a trip in a vehicle corresponding to the first class of vehicle has begun;
   receiving, by the mobile computing device from a telematics device located in the vehicle, vehicle information related to the vehicle during the trip;
   collecting, by the mobile computing device, trip information using the trip monitoring application during the trip;
   deriving, upon termination of the trip, additional trip information based on the trip information;
   determining whether to provide a cash reward comprising one of a first cash reward corresponding to a first threshold and a second cash reward corresponding to a second threshold, wherein the determining whether to provide the cash reward is based, at least in part, on at least one of the vehicle information, the trip information, and the additional trip information; and
   providing a cash reward amount corresponding to the cash reward to an individual associated with the mobile computing device.

2. The method of claim 1 further comprising:
   determining a trip score for the trip upon termination of the trip wherein the trip score is based, at least in part, on the additional trip information derived from the trip information collected; and
   automatically displaying the trip score on the mobile computing device at a user interface of the trip monitoring application.

3. The method of claim 2 wherein determining the trip score includes:
   obtaining a set of driving performance metric scores based on a set of driving performance metrics associated with the trip; and
   aggregating the set of driving performance metric scores to obtain the trip score.

4. The method of claim 3 wherein the set of driving performance metrics includes i) a total number of miles traveled during the trip in at least one predetermined time-of-day range, ii) a total number of instances of deceleration above a predetermined deceleration threshold, and iii) a total number of miles traveled above a predetermined speed threshold.

5. The method of claim 1 wherein the trip is one of a set of trips monitored by the trip monitoring application at the mobile computing device and further comprising:
   determining a performance score based, at least in part, on the additional trip information respectively derived for each trip in the set of trips from the trip information respectively collected for each trip in the set of trips.

6. The method of claim 5 wherein determining whether to provide the cash reward comprises:
   identifying a reward percentage based on the performance score corresponding to the first threshold or the second threshold;
   obtaining an insurance premium of an insurance policy associated with the mobile computing device; and
   applying the reward percentage to the insurance premium to obtain the cash reward amount.

7. The method of claim 1 further comprising:
   determining whether a trip termination condition has been satisfied during the trip; and
   automatically terminating collection of trip information responsive to determining that the trip termination condition has been satisfied.

8. The method of claim 7 wherein the trip termination condition is a drop of a battery percentage of a battery of the mobile computing device below a predetermined battery percentage threshold and further comprising:
   deactivating a trip detection capability of the trip monitoring application responsive to determining that the battery percentage of the battery is below the predetermined battery percentage threshold; and
   reactivating the trip detection capability responsive to determining that the battery percentage of the battery has risen to be at or above the predetermined battery percentage threshold.

9. The method of claim 1 wherein deriving additional trip information includes:
   determining a total number of miles traveled during the trip in at least one predetermined time-of-day range;
   determining a total number of instances of deceleration above a predetermined deceleration threshold; and
   determining a total number of miles traveled above a predetermined speed threshold.

10. A system for encouraging safe driving behaviors comprising:
   a mobile computing device comprising a memory and a processor configured to:
      configure a trip monitoring application, wherein the configuring comprises downloading the trip monitoring application,
      detect that the mobile computing device is traveling in a vehicle based on the trip monitoring application detecting that the mobile computing device is traveling at a detected speed above a first minimum speed threshold associated with a first class of vehicle;
      detect that the mobile computing device is traveling in the first class of vehicle based on determining that the detected speed is below a maximum speed threshold associated with a second class of vehicle;
      determine, based on the detecting that the mobile computing device is traveling in the first class of vehicle, that a trip in a vehicle corresponding to the first class of vehicle has begun,
      receive, from a telematics device located in the vehicle, vehicle information related to the vehicle during the trip,
      collect trip information during the trip, and
      determine additional trip information based on the trip information collected upon termination of the trip;

a computing apparatus comprising a memory and processor, the memory storing computer-executable instructions that, when executed by the processor, cause the computing apparatus to:
  determine a performance score based on at least one of the vehicle information, the trip information, and the additional trip information; and
  determine whether to provide a cash reward comprising at least one of a first cash reward corresponding to a first threshold, a second cash reward corresponding to a second threshold, and no cash reward corresponding to a third threshold, wherein the determining whether to provide the cash reward is based, at least in part, on the performance score.

11. The system of claim 10 wherein:
the mobile computing device is further configured to:
  determine a trip score for the trip upon termination of the trip wherein the trip score is based, at least in part, on the additional trip information derived from the trip information collected; and
  automatically display the trip score at a user interface on the mobile computing device.

12. The system of claim 11 wherein:
the mobile computing device is further configured to:
obtain a set of driving performance metric scores based on a set of driving performance metrics associated with the trip and aggregate the set of driving performance metric scores to obtain the trip score.

13. The system of claim 12 wherein:
the set of driving performance metrics includes i) a total number of miles traveled during the trip in at least one predetermined time-of-day range, ii) a total number of instances of deceleration above a predetermined deceleration threshold, and iii) a total number of miles traveled above a predetermined speed threshold.

14. The system of claim 12 wherein:
the mobile computing device is further configured to:
  display a trip summary at a user interface on the mobile computing device, wherein the trip summary includes i) the trip score, ii) the set of driving performance metric scores, iii) a total distance traveled during the trip, iv) a total duration of the trip, v) a start time and an end time for the trip, vi) a date the trip occurred, and vii) a map illustrating a route taken during the trip.

15. The system of claim 10 wherein:
the trip is one of a set of trips that includes one or more trips monitored by the trip monitoring application; and
the instructions, when executed, further cause the computing apparatus to:
  determine the performance score based on the additional trip information respectively derived for each trip in the set of trips from the trip information respectively collected for each trip in the set of trips.

16. The system of claim 10 wherein the instructions, when executed, further cause the computing apparatus to:
  identify a reward percentage associated based on the performance score corresponding to the first threshold, the second threshold, or the third threshold,
  obtain an insurance premium of an insurance policy associated with the mobile computing device, and
  apply the reward percentage to the insurance premium to obtain an amount corresponding to the cash reward.

17. The system of claim 10 wherein:
the mobile computing device is further configured to:
  determine whether a trip termination condition has been satisfied during the trip, and automatically terminating collection of trip information responsive to determining that the trip termination condition has been satisfied.

18. The system of claim 17 wherein:
the trip termination condition is a drop of a battery percentage of a battery of the mobile computing device below a predetermined battery percentage threshold; and
the trip monitoring application is further configured to, in operation, deactivate a trip detection capability of the trip monitoring application responsive to determining that the battery percentage of the battery is below the predetermined battery percentage threshold and reactivate the trip detection capability responsive to determining that the battery percentage of the battery has risen to be at or above the predetermined battery percentage threshold.

19. The system of claim 10 wherein:
the mobile computing device is further configured to:
  determine a total number of miles traveled during the trip in at least one predetermined time-of-day range,
  determine a total number of instances of deceleration above a predetermined deceleration threshold, and
  determine a total number of miles traveled above a predetermined speed threshold in order to derive the additional trip information.

20. A system for encouraging safe driving behaviors comprising:
a mobile computing device configured to:
  configure a trip monitoring application;
  detect that the mobile computing device is traveling in a class of vehicle based on the trip monitoring application detecting that the mobile computing device is traveling at a detected speed above a first minimum speed threshold associated with a first class of vehicle;
  detect that the mobile computing device is traveling in the first class of vehicle based on determining that the detected speed is below a maximum speed threshold associated with a second class of vehicle;
  determine, based on the detecting that the mobile computing device is traveling in the first class of vehicle, that a trip in a vehicle corresponding to the first class of vehicle has begun,
  collect trip information during the trip wherein the trip information includes speed information and location information from a GPS module of the mobile computing device,
  derive additional trip information based on the trip information collected wherein the additional trip information includes i) a total number of miles traveled during the trip in at least one predetermined time-of-day range, ii) a total number of instances of deceleration above a predetermined deceleration threshold, and iii) a total number of miles traveled above a predetermined speed threshold
  determine a trip score for the trip upon termination of the trip wherein the trip score is based, at least in part, on the additional trip information derived from the trip information collected,
  determine a set of driving performance metric scores based on at least a portion of the additional trip information derived from the trip information collected during the trip, and
  display a trip summary at a user interface on the mobile computing device wherein the trip summary includes the trip score, the set of driving performance metric scores, a total distance traveled during the trip, a total duration of the trip, a start time and an end time for the trip, a date the trip occurred, and a map illustrating a route taken during the trip; and a computing apparatus located remotely relative to the mobile computing device and in signal communication with the mobile computing device wherein the computing apparatus comprises memory storing computer-executable instructions that, when executed by a processor of the computing apparatus, cause the computing apparatus to:

determine a performance score based, at least in part, on the additional trip information derived from the trip information collected during the trip, and identify a reward percentage based on the performance score corresponding to one of a first threshold, a second threshold, and a third threshold, obtain an insurance premium of an insurance policy associated with the mobile computing device, and apply the reward percentage to the insurance premium to obtain a cash reward amount.

\* \* \* \* \*

UNITED STATES PATENT AND TRADEMARK OFFICE
CERTIFICATE OF CORRECTION

| | |
|---|---|
| PATENT NO. | : 10,445,758 B1 |
| APPLICATION NO. | : 14/188046 |
| DATED | : October 15, 2019 |
| INVENTOR(S) | : Bryer et al. |

It is certified that error appears in the above-identified patent and that said Letters Patent is hereby corrected as shown below:

In the Specification

Column 7, Detailed Description, Line 61:
Delete "210" and insert --214--

Column 7, Detailed Description, Line 66:
Delete "210" and insert --214--

Column 10, Detailed Description, Line 31:
Delete "240" and insert --204--

Column 10, Detailed Description, Line 40:
Delete "240" and insert --204--

Column 13, Detailed Description, Line 10:
Delete "240" and insert --204--

Column 13, Detailed Description, Line 25:
Delete "28" and insert --228--

Column 14, Detailed Description, Line 29:
Delete "230" and insert --232--

Column 17, Detailed Description, Line 37:
Delete "230" and insert --232--

Column 20, Detailed Description, Line 13:
Delete "total drivers" and insert --total_drivers--

Signed and Sealed this
First Day of December, 2020

Andrei Iancu
*Director of the United States Patent and Trademark Office*

CERTIFICATE OF CORRECTION (continued)
U.S. Pat. No. 10,445,758 B1

Column 23, Detailed Description, Line 33:
Delete "234" and insert --236--

Column 23, Detailed Description, Line 35:
Delete "234" and insert --236--

Column 23, Detailed Description, Line 51:
Delete "234" and insert --236--

Column 23, Detailed Description, Line 53:
Delete "234" and insert --236--

Column 23, Detailed Description, Line 55:
Delete "234" and insert --236--

Column 32, Detailed Description, Line 46:
Delete "meters/second" and insert --meters/second$^2$--

Column 36, Detailed Description, Line 61:
Delete "932" and insert --942--

Column 39, Detailed Description, Line 65:
Delete "926" and insert --936--

Column 39, Detailed Description, Line 67:
Delete "926" and insert --936--

Column 40, Detailed Description, Line 3:
Delete "926" and insert --936--

Column 40, Detailed Description, Line 6:
Delete "date" and insert --data--

Column 40, Detailed Description, Line 7:
Delete "926" and insert --936--

Column 40, Detailed Description, Line 10:
Delete "926" and insert --936--

Column 48, Detailed Description, Line 5:
Delete "10001" and insert --1000|--

Column 48, Detailed Description, Line 6:
Delete "10001" and insert --1000|--

Column 48, Detailed Description, Line 17:
Delete "10001" and insert --1000|--

Column 48, Detailed Description, Line 27:
Delete "s peed" and insert --speed--

Column 53, Detailed Description, Line 59:
After "threshold.", delete "¶"

In the Claims

Column 58, Line 56:
In Claim 20, after "threshold", insert --,--